US009857863B2

(12) United States Patent
Kobayashi

(10) Patent No.: US 9,857,863 B2
(45) Date of Patent: Jan. 2, 2018

(54) DISPLAY APPARATUS, CONTROL METHOD FOR DISPLAY APPARATUS, AND PROGRAM THAT CAN SWITCH AN OPERATION MODE OF A DISPLAY APPARATUS FROM A NORMAL OPERATION MODE TO A BATTERY REPLACEMENT MODE

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 70 days.

(21) Appl. No.: 14/871,175

(22) Filed: Sep. 30, 2015

(65) Prior Publication Data
US 2016/0109931 A1    Apr. 21, 2016

(30) Foreign Application Priority Data

Oct. 20, 2014  (JP) ................................ 2014-213602
Oct. 27, 2014  (JP) ................................ 2014-218583
Jun. 19, 2015  (JP) ................................ 2015-123469

(51) Int. Cl.
*G06F 3/038*       (2013.01)
*G09G 5/00*        (2006.01)
(Continued)

(52) U.S. Cl.
CPC ......... *G06F 1/3265* (2013.01); *G02B 27/017* (2013.01); *G06F 1/163* (2013.01);
(Continued)

(58) Field of Classification Search
None
See application file for complete search history.

(56) References Cited

U.S. PATENT DOCUMENTS 5,021,983 A * 6/1991 Nguyen ................ G06F 1/3228
                                                713/321
5,684,384 A * 11/1997 Barkat ...................... G06F 1/26
                                                  307/66

(Continued)

FOREIGN PATENT DOCUMENTS

EP   0688082 A1 * 12/1995 ............ H02J 7/0024
JP   H089002 A     1/1996

*Primary Examiner* — Ilana Spar
*Assistant Examiner* — Kirk Hermann
(74) *Attorney, Agent, or Firm* — Oliff PLC

(57) ABSTRACT

A display apparatus includes an image display unit that enables a user to visually recognize an image and transmits external scenery therethrough, a first battery, a second battery, a communication unit, and a control unit that switches a power source between the first battery and the second battery. The control unit causes an operation mode of the display apparatus to transition from a normal operation mode to a battery replacement mode in which power consumption of the image display unit and the communication unit is lower than that in the normal operation mode in a case where the power source is changed from the first battery to the second battery. The communication unit is maintained in a communicable state in the battery replacement mode.

28 Claims, 15 Drawing Sheets

(51) Int. Cl.
  *G06F 1/32* (2006.01)
  *G06F 1/16* (2006.01)
  *G02B 27/01* (2006.01)
(52) U.S. Cl.
  CPC ...... *G06F 1/1635* (2013.01); *G02B 2027/014* (2013.01); *G02B 2027/0134* (2013.01); *G02B 2027/0138* (2013.01)

(56) References Cited

U.S. PATENT DOCUMENTS

| | | | | |
|---|---|---|---|---|
| 5,825,100 | A * | 10/1998 | Kim | G06F 1/263 307/150 |
| 2001/0017532 | A1* | 8/2001 | Han | H04W 52/0296 320/114 |
| 2002/0186212 | A1* | 12/2002 | Matsumoto | G06F 3/14 345/204 |
| 2012/0295574 | A1* | 11/2012 | Chen | H02J 1/14 455/404.1 |
| 2012/0322431 | A1* | 12/2012 | Kil | H02J 9/06 455/418 |
| 2013/0111241 | A1* | 5/2013 | Ha | H04W 52/029 713/322 |
| 2014/0092140 | A1* | 4/2014 | Wadhwa | G09G 3/20 345/660 |
| 2015/0293644 | A1* | 10/2015 | Watanabe | G06F 3/0426 345/168 |
| 2015/0297192 | A1* | 10/2015 | Chamberlain | A61B 8/56 600/443 |

* cited by examiner

| STATE | USER'S OPERATION | BATTERY RESIDUAL QUANTITY DISPLAY | BATTERY (1) RESIDUAL QUANTITY | LED (1) | BATTERY (2) RESIDUAL QUANTITY | LED (2) | OPERATION OF SYSTEM SIDE | AR DISPLAY |
|---|---|---|---|---|---|---|---|---|
| 1 | NORMAL WORK | LEVEL 10 | 100 % | | 100 % | | NORMAL OPERATION | NO |
| 2 | " | " | " | | " | | " | NO |
| 3 | " | " | " | | " | | " | NO |
| 4 | NORMAL WORK | LEVEL 1 | 20 % | | 20 % | | DISPLAY BATTERY MARK OF INFORMATION DISPLAY UNIT IN BLINKING MANNER | NO |
| 5 | NORMAL WORK | LEVEL 0 | 10 % | RED BLINKING | | RED LIGHTING | DISPLAY GUIDANCE ON BATTERY EXCHANGE | |
| 6 | SELECT REPLACEMENT MODE | LEVEL 0 | | RED BLINKING | | RED | DISPLAY ANIMATION OF EXPLANATION OF BATTERY REPLACEMENT OPERATION | AR DISPLAY MESSAGE SO AS TO OVERLAP BATTERY TO BE REPLACED |
| 7 | REPLACE BATTERY (1) | LEVEL 5 | 100 % | GREEN LIGHTING | | RED BLINKING | DISPLAY ANIMATION OF EXPLANATION OF BATTERY REPLACEMENT OPERATION | DISPLAY GUIDANCE ON REPLACEMENT FOR BATTERY TO BE REPLACED, AND DISPLAY MESSAGE SO AS TO OVERLAP BATTERY TO BE REPLACED |
| 8 | REPLACE BATTERY (2) | LEVEL 10 | 100 % | GREEN LIGHTING | 100 % | GREEN LIGHTING | FINISH BATTERY REPLACEMENT MODE | DISPLAY GUIDANCE ON COMPLETION OF REPLACEMENT FOR NEW BATTERY |
| 9 | NORMAL WORK | LEVEL 10 | 100 % | TURNED-OFF | 100 % | TURNED-OFF | NORMAL OPERATION | NO |

FIG. 9

| APPARATUS ID | ABC - 123 |
|---|---|
| ACCOUNT NAME | UYTR |
| AUTHENTICATION INFORMATION | 123 - 456 - 789 |
| PROGRESS INFORMATION | 2014 / 9 / 12  A313 PROCESSED<br>2014 / 9 / 13  C365 PROCESSED<br>⋮ |
| ACCOUNT NAME | LKUT |
| AUTHENTICATION INFORMATION | 000 - 654 - 987 |
| PROGRESS INFORMATION | 2014 / 9 / 11  B202 PROCESSED<br>2014 / 9 / 14  D456 PROCESSED<br>⋮ |
| BATTERY RESIDUAL CAPACITY | 78 % |
| ... | ... |
| APPARATUS ID | EFG - 111 |
| ACCOUNT NAME | TGHN |
| AUTHENTICATION INFORMATION | 111 - 222 - 333 |
| ⋮ | ⋮ |

FIG.14

DISPLAY APPARATUS, CONTROL METHOD FOR DISPLAY APPARATUS, AND PROGRAM THAT CAN SWITCH AN OPERATION MODE OF A DISPLAY APPARATUS FROM A NORMAL OPERATION MODE TO A BATTERY REPLACEMENT MODE

BACKGROUND

1. Technical Field

The present invention relates to a display apparatus, a control method for the display apparatus, and a program.

2. Related Art

In an apparatus provided with a battery, a preliminary battery is mounted in the apparatus, and the apparatus is supplied with power from the preliminary battery when batteries are exchanged (for example, refer to JP-A-8-9002). JP-A-8-9002 discloses a mobile phone which includes a main battery and a subsidiary battery as a countermeasure for a problem that lines fail due to power trouble when a power storage quantity is small, and power is supplied from the subsidiary battery when the main battery is replaced.

However, in an apparatus having a large amount of power consumption such as a display apparatus, the apparatus is required to be stopped when batteries are exchanged. For example, even if a battery is prepared separately from a power source which is mainly used, such as the subsidiary battery disclosed in JP-A-8-9002, increasing a capacity of such a battery is not realistic from the viewpoint of increases in a size of the battery, a weight thereof, and cost. For this reason, it is not realistic to provide power from the subsidiary battery or the like to the display apparatus while batteries are exchanged.

SUMMARY

As advantage of some aspects of the invention is to enable a battery to be replaced without stopping an operation of a display apparatus which is driven with the battery.

A display apparatus according to an aspect of the invention includes a display unit that enables a user to visually recognize an image and transmits external scenery therethrough; a first battery and a second battery; a communication unit; and a control unit that controls the display unit and the communication unit, in which the control unit can switch an operation mode of the display apparatus between a normal operation mode and a battery replacement mode for replacing at least one of the first battery and the second battery, and maintains the communication unit in a communicable state by using one of the first and second batteries as a power source in the battery replacement mode.

According to the aspect of the invention, it is possible to replace the batteries without stopping an operation of the apparatus by efficiently using the plurality of batteries.

In the display apparatus, the control unit may maintain the supply of power to the communication unit by using the first battery and/or the second battery in the battery replacement mode.

According to the aspect of the invention with this configuration, the supply of power to the communication unit is maintained by using the battery, and thus an operation can be continuously performed without stopping or interrupting communication. For this reason, since there is a high possibility of preventing interruption or disconnection due to a decrease in a capacity of the battery, it is possible to save time and effort to perform authentication again when communication is resumed and thus to reduce a work burden or downtime of the work.

In the display apparatus, in the battery replacement mode, the control unit may reduce an amount of power consumption of a supply destination which consumes power of the first battery and/or the second battery, and maintain the supply of power to the communication unit.

According to the aspect of the invention with this configuration, since power of the battery is supplied to the communication unit, and an amount of power consumption of other supply destinations is reduced, an operation can be continuously performed for a longer period of time without stopping or interrupting communication.

A display apparatus according to another aspect of the invention includes a display unit that enables a user to visually recognize an image and transmits external scenery therethrough; a first battery and a second battery; a communication unit; and a control unit that switches a power source between the first battery and the second battery, in which, in a case where the power source is switched from the first battery to the second battery, the control unit causes a display mode of the display apparatus to transition from a normal operation mode to a battery replacement mode in which an amount of power consumption of the display unit and the communication unit is smaller than an amount of power consumption in the normal operation mode, and the communication unit is maintained in a communicable state in the battery replacement mode.

According to the aspect of the invention, it is possible to replace the batteries without stopping an operation of the apparatus by efficiently using the plurality of batteries.

In the display apparatus, the display unit may include a first display portion that displays an image so as to correspond to the left eye of the user; and a second display portion that displays an image so as to correspond to the right eye of the user, and in the battery replacement mode, the control unit may stop one of the first display portion and the second display portion from performing display.

According to the aspect of the invention with this configuration, it is possible to reduce power consumption of the display unit and to provide sufficient power from the second battery during replacement of the first battery.

In the display apparatus, the control unit may reduce a frame rate of an image displayed on the display unit in the battery replacement mode more than a frame rate of an image displayed on the display unit in the normal operation mode.

According to the aspect of the invention with this configuration, it is possible to further reduce power consumption during replacement of the first battery and to supply power from the second battery.

In the display apparatus, the control unit may reduce a display region of the display unit in the battery replacement mode more than a display region of the display unit in the normal operation mode.

According to the aspect of the invention with this configuration, it is possible to further reduce power consumption during replacement of the first battery and to supply power from the second battery.

In the display apparatus, the control unit may maintain the communication unit in a communicable state in the battery replacement mode so that the communication unit can start communication without performing authentication when the operation mode of the display apparatus transitions from the battery replacement mode to the normal operation mode.

According to the aspect of the invention with this configuration, it is possible to start communication without performing authentication when the operation mode transitions from the battery replacement mode to the normal operation mode.

In the display apparatus, in the battery replacement mode, the control unit may cause an operation state of the communication unit to be switched to a state in which power consumption of the communication unit is lower than power consumption in the normal operation mode.

According to the aspect of the invention with this configuration, since power consumption of the communication unit is reduced, an operation can be continuously performed for a longer period of time without stopping or interrupting communication.

The display apparatus may further include a nonvolatile storage unit, in which the control unit may store data related to an operation of the control unit in the storage unit when the operation mode transitions to the battery replacement mode, and perform a process based on the data stored in the storage unit when the operation mode transitions from the battery replacement mode to the normal operation mode.

According to the aspect of the invention with this configuration, the control unit can return to a state before transition to the battery replacement mode when the operation mode transitions from the battery replacement mode to the normal operation mode.

In the display apparatus, in a case where the first battery is replaced with a new first battery, the control unit may perform display based on a residual capacity of the new first battery.

According to the aspect of the invention with this configuration, after replacement with the new first battery is performed, the user can check a residual capacity of the first battery.

In the display apparatus, in a case where a residual capacity of the first battery is equal to or more than a threshold value, the control unit may charge the second battery with power of the first battery.

According to the aspect of the invention with this configuration, a residual capacity of the second battery can be maintained in a favorable state.

In the display apparatus, in a case where a residual capacity of the first battery is equal to or less than a threshold value, the control unit may display a message for prompting replacement of the first battery on the display unit.

According to the aspect of the invention with this configuration, it is possible to prevent inconvenience caused by an insufficient residual capacity of the first battery by notifying the user that the residual capacity of the first battery is low.

The display apparatus may further include a lid that opens and closes a battery accommodation unit which attachably and detachably accommodates the first battery; and an opening/closing detection unit that detects opening and closing of the lid, in which in a case where the opening/closing detection unit detects opening of the lid, the control unit may switch the power source from the first battery to the second battery.

According to the aspect of the invention with this configuration, the power source can be rapidly switched to the second battery in response to an operation of replacing the first battery.

A display apparatus according to still another aspect of the invention includes a display unit that enables a user to visually recognize an image and transmits external scenery therethrough; a first battery and a second battery; and a control unit that switches a display mode of the display apparatus between a normal operation mode in which power is supplied from the first battery and a battery replacement mode in which power is supplied from the second battery, in which the control unit charges the second battery with power of the first battery after switching the operation mode from the battery replacement mode to the normal operation mode.

According to the aspect of the invention, the battery can be replaced without stopping an operation of the display apparatus which is driven by the battery, and thus it is possible to prevent the occurrence of a situation in which the battery replacement mode cannot be executed due to an insufficient capacity of the second battery.

In the display apparatus, in a case where it is detected that the first battery is replaced with a new first battery, the control unit may switch the operation mode to the normal operation mode when a residual capacity of the new first battery is equal to or more than a reference value which is set in advance.

According to the aspect of the invention with this configuration, it is possible to prevent the occurrence of inconvenience in the display apparatus due to an insufficient residual capacity of the new first battery.

In the display apparatus, the control unit may execute a finish sequence in a case where a residual capacity of the second battery corresponds to a condition which is set in advance during execution of the battery replacement mode.

According to the aspect of the invention with this configuration, for example, in a case where a capacity of the second battery is insufficient, it is possible to prevent data from being lost by executing the finish sequence.

In the display apparatus, as the finish sequence, the control unit may store information regarding an operation of the display apparatus in a storage unit and then turns off the power source.

According to the aspect of the invention with this configuration, it is possible to prevent the information regarding an operation state of the display apparatus from being lost.

In the display apparatus, the control unit may change the display mode of the display unit to a mode for reducing power consumption of the display apparatus in a case where a residual capacity of the second battery decreases to a preset first reference value or less during execution of the battery replacement mode, and the control unit may execute the finish sequence in a case where the residual capacity of the second battery decreases to a second reference value or less after the display mode is changed to the mode for reducing power consumption of the display apparatus.

According to the aspect of the invention with this configuration, it is possible to reduce power consumption of the display apparatus by changing the display mode to the mode for reducing power consumption when the residual capacity of the second battery decreases. In a case where the residual capacity of the second battery further decreases, it is possible to prevent data of the display apparatus from being lost by executing the finish sequence.

In the display apparatus, the control unit may perform display on the display unit based on the residual capacity of the second battery in a case where the residual capacity of the second battery decreases to the first reference value or less during execution of the battery replacement mode.

According to the aspect of the invention with this configuration, in a case where the residual capacity of the second battery decreases, the user is caused to recognize a message regarding the residual capacity of the second battery, and thus it is possible to notify the user of a state of the display apparatus.

In the display apparatus, the display unit may include a first display portion that displays an image so as to correspond to the left eye of the user; and a second display portion that displays an image so as to correspond to the right eye of the user, and in the battery replacement mode, the control unit may stop one of the first display portion and the second display portion from performing display.

According to the aspect of the invention with this configuration, a display function of the display apparatus can be maintained, power consumption can be efficiently reduced, and sufficient power can be supplied from the second battery during replacement of the first battery.

In the display apparatus, the control unit may reduce a frame rate of an image displayed on the display unit in the battery replacement mode more than a frame rate of an image displayed on the display unit in the normal operation mode.

According to the aspect of the invention with this configuration, it is possible to further reduce power consumption while power is supplied from the second battery.

In the display apparatus, the control unit may reduce a display region of the display unit in the battery replacement mode more than a display region of the display unit in the normal operation mode.

According to the aspect of the invention with this configuration, power consumption can be still further reduced during replacement of the first battery, and power can be supplied from the second battery.

In the display apparatus, in the battery replacement mode, the control unit may thin out image data which is displayed on the display unit and displays thinned-out image data on the display unit, or give an instruction for thinning out pixels used for display on the display unit.

According to the aspect of the invention with this configuration, it is possible to still further reduce power consumption while power is supplied from the second battery.

In the display apparatus, in the battery replacement mode, the control unit may display an image on a peripheral part of the display region of the display unit.

According to the aspect of the invention with this configuration, it is possible to improve visibility of external scenery during replacement of power using the second battery and thus to efficiently perform battery replacement work.

The display apparatus further includes a communication unit, and the control unit supplies power from the second battery to the communication unit so that the communication unit is maintained in a communicable state in the battery replacement mode.

According to the aspect of the invention with this configuration, when the operation mode is switched from the battery replacement mode to the normal operation mode, it is possible to save time and effort to set communication of the communication unit again.

In the display apparatus, the control unit may maintain the communication unit in a communicable state in the battery replacement mode so that the communication unit can start communication without performing authentication when the operation mode of the display apparatus transitions from the battery replacement mode to the normal operation mode.

According to the aspect of the invention with this configuration, it is possible to start communication without performing authentication when the operation mode transitions from the battery replacement mode to the normal operation mode.

In the display apparatus, in the battery replacement mode, the control unit may cause an operation state of the communication unit to be switched to a state in which power consumption of the communication unit is lower than power consumption in the normal operation mode.

According to the aspect of the invention with this configuration, since power consumption of the communication unit is reduced, an operation can be continuously performed for a longer period of time without stopping or interrupting communication.

A control method according to yet another aspect of the invention is a control method for a display apparatus including a display unit that enables a user to visually recognize an image and transmits external scenery therethrough, and a communication unit, the method including causing an operation mode of the display apparatus to transition from a normal operation mode to a battery replacement mode in which power consumption of the display unit and the communication unit is lower than power consumption in the normal operation mode in a case where a power source of the display apparatus is changed from a first battery to a second battery; and maintaining the communication unit in a communicable state in the battery replacement mode.

According to the aspect of the invention, it is possible to replace the batteries without stopping an operation of the apparatus by efficiently using the plurality of batteries.

A control method according to still yet another aspect of the invention is a control method for a display apparatus including a display unit that enables a user to visually recognize an image and transmits external scenery therethrough, a first battery, and a second battery, the method including switching the operation mode of the display apparatus from a normal operation mode in which power is supplied from the first battery to a battery replacement mode in which power is supplied from the second battery; and charging the second battery with power of the first battery after switching the operation mode from the battery replacement mode to the normal operation mode.

According to the aspect of the invention, the battery can be replaced without stopping an operation of the display apparatus which is driven by the battery, and thus it is possible to prevent the occurrence of a situation in which the battery replacement mode cannot be executed due to an insufficient capacity of the second battery.

A program according to further another aspect of the invention is a program which can be executed by a computer controlling a display apparatus including a display unit that enables a user to visually recognize an image and transmits external scenery therethrough, a first battery, and a second battery, the program causing the computer to function as a control unit that switches an operation mode of the display apparatus from a normal operation mode in which power is supplied from the first battery to a battery replacement mode in which power is supplied from the second battery; and charges the second battery with power of the first battery after switching the operation mode from the battery replacement mode to the normal operation mode.

According to the aspect of the invention, the battery can be replaced without stopping an operation of the display apparatus which is driven by the battery, and thus it is possible to prevent the occurrence of a situation in which the battery replacement mode cannot be executed due to an insufficient capacity of the second battery.

BRIEF DESCRIPTION OF THE DRAWINGS

The invention will be described with reference to the accompanying drawings, wherein like numbers reference like elements.

FIG. 9 is a diagram illustrating an example of state transition of the head mounted display.

FIG. 14 is a diagram illustrating a configuration example of a management table.

DESCRIPTION OF EXEMPLARY EMBODIMENTS

First Embodiment

Figure 1:
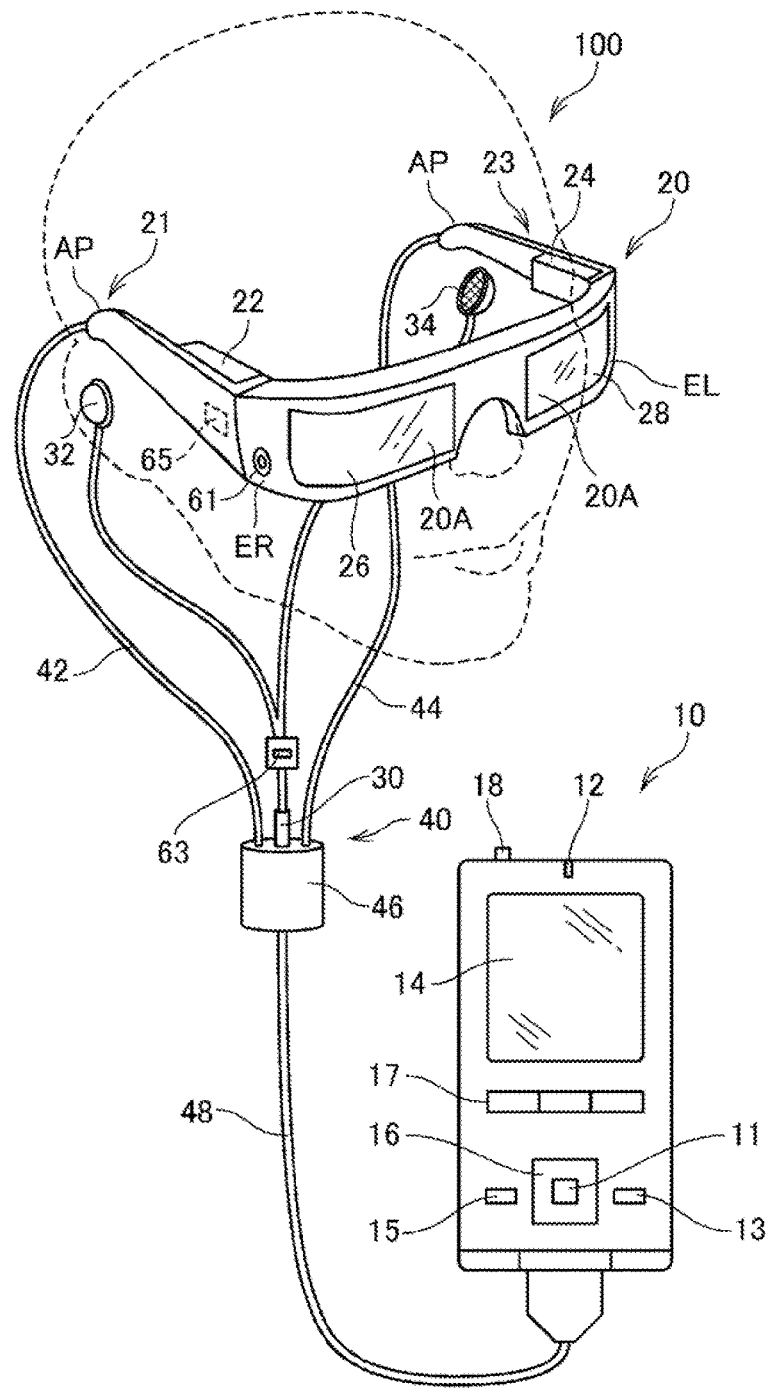
FIG. 1 is a diagram illustrating an exterior configuration of a head mounted display.

FIG. 1 is a diagram illustrating an exterior configuration of a head mounted display 100. The head mounted display 100 is a display mounted on the head, and is also simply referred to as an HMD. The head mounted display 100 is an optical transmission type head mounted display which allows a user to visually recognize a virtual image and also to directly visually recognize external scenery. In the present specification, for convenience, a virtual image which is displayed by the head mounted display 100 and is visually recognized by the user is also referred to as a "display image". In addition, emitting image light on the basis of image data is also referred to as "displaying an image".

The head mounted display 100 includes an image display section 20 which enables a user to visually recognize a virtual image in a state of being mounted on the head of the user, and a control device 10 which controls the image display section 20. The control device 10 also functions as a controller used for the user to operate the head mounted display 100.

The image display section 20 is a mounting body which is mounted on the head of the user, and has a spectacle shape in the present embodiment. The image display section 20 includes a right holding unit 21, a right display driving unit 22, a left holding unit 23, a left display driving unit 24, a right optical image display unit 26, a left optical image display unit 28, a camera 61, and a microphone 63. The right optical image display unit 26 and the left optical image display unit 28 are disposed so as to be respectively located in front of the right eye and the left eye of the user when the user wears the image display section 20. One end of the right optical image display unit 26 and one end of the left optical image display unit 28 are connected to each other at the position corresponding to the glabella of the user when the user wears the image display section 20.

The right holding unit 21 is a member which is provided so as to extend over a position corresponding to the temporal region of the user from the other end part ER which is the other end of the right optical image display unit 26 when the user wears the image display section 20. Similarly, the left holding unit 23 is a member which is provided so as to extend over a position corresponding to the temporal region of the user from the other end part EL of the left optical image display unit 28 when the user wears the image display section 20. The right holding unit 21 and the left holding unit 23 hold the image display section 20 on the head of the user in the same manner as temples of spectacles.

The right display driving unit 22 and the left display driving unit 24 are disposed on sides facing the head of the user when the user wears the image display section 20. The right display driving unit 22 and the left display driving unit 24 are collectively simply referred to as "display driving units", and the right optical image display unit 26 and the left optical image display unit 28 are collectively simply referred to as "optical image display units".

The display driving units 22 and 24 respectively include liquid crystal displays 241 and 242 (hereinafter, also referred to as "LCDs 241 and 242"), projection optical systems 251 and 252, and the like (refer to FIG. 2). Details of configurations of the display driving units 22 and 24 will be described later. The optical image display units 26 and 28 respectively include light guide plates 261 and 262 (refer to FIG. 2) and dimming plates 20A as optical members. The light guide plates 261 and 262 are made of a light-transmitting resin material or the like, and guide image light output from the display driving units 22 and 24 to the eyes of the user. Each of the dimming plates 20A is a thin plate-shaped optical element, and is disposed so as to cover a surface side of the image display section 20 which is an opposite side to the eye side of the user. As the dimming plate 20A, various dimming plates including one which has light transmittance of substantially 0, one which is substantially transparent, one which attenuates or reflects light with a specific wavelength, and the like. Optical characteristics (light transmittance and the like) of the dimming plates 20A are selected as appropriate in order to adjust an amount of external light entering the right optical image display unit 26 and the left optical image display unit 28, and thus an extent of visually recognizing a virtual image can be controlled. In the present embodiment, a description will be made of a case of using the dimming plates 20A which has light transmittance to an extent in which the user wearing the head mounted display 100 can visually recognize at least external scenery. The dimming plates 20A protect the right light guide plate 261 and the left light guide plate 262 so as to prevent the right light guide plate 261 and the left light guide plate 262 from being damaged, contaminated, or the like.

The dimming plates 20A may be attachable to and detachable from the right optical image display unit 26 and the left optical image display unit 28, may be attached by exchanging a plurality of dimming plates 20A, and may be omitted.

The camera 61 is disposed at the other end part ER of the right optical image display unit 26. The camera 61 images external scenery in a direction opposite to the eye side of the user so as to acquire an external scenery image. The camera 61 of the present embodiment illustrated in FIG. 1 is a monocular camera but may be stereo cameras.

An imaging direction of the camera 61, that is, an angle of view is a direction in which at least a part of external scenery is imaged in the surface side of the head mounted display 100, that is, in a visual line direction of the user in a state in which the user wears the head mounted display 100. A range of an angle of view of the camera 61 may be set as appropriate, but an imaging region of the camera 61 preferably includes the external world which is visually recognized by the user through the right optical image display unit 26 and the left optical image display unit 28. More preferably, an imaging region of the camera 61 is set to image the entire visual field of the user through the dimming plates 20A.

The image display section 20 further includes a coupling unit 40 that connects the image display section 20 to the control device 10. The coupling unit 40 includes a main cord 48 that is connected to the control device 10, right cord 42, a left cord 44, and a connecting member 46. The right cord 42 and the left cord 44 are two cords into the main cord 48 branches. The right cord 42 is inserted into a chassis of the right holding unit 21 from a tip portion AP in the extending direction of the right holding unit 21 and is connected to the right display driving unit 22. Similarly, the left cord 44 is inserted into a chassis of the left holding unit 23 from a tip portion AP in the extending direction of the left holding unit 23 and is connected to the left display driving unit 24.

The connecting member 46 is provided at a branching point of the main cord 48, the right cord 42, and the left cord 44, and includes a jack for connection to an earphone plug 30. A right earphone 32 and a left earphone 34 extend from the earphone plug 30. The microphone 63 is provided near the earphone plug 30. The earphone plug 30 and the microphone 63 are put together in a single cord, and cords into which the cord from the microphone 63 branches are respectively connected to the right earphone 32 and the left earphone 34.

For example, as illustrated in FIG. 1, a sound collecting unit of the microphone 63 is disposed so as to be directed in the visual line direction of the user, and the microphone 63 collects sound and outputs an audio signal to a sound processing unit 190. For example, the microphone 63 may be a monaural microphone, a stereo microphone, a directive microphone, or a non-directive microphone.

The right cord 42 and the left cord 44 may be collected as a single cord. Specifically, an inner conductive wire of the right cord 42 may be introduced into the left holding unit 23 side via the inside of the main body of the image display section 20 and may be coated with a resin along with an inner conductive wire of the left cord 44 so as to be collected as a single cord.

The image display section 20 and the control device 10 transmit various signals via the coupling unit 40. An end portion of the main cord 48 opposite to the connecting member 46 and the control device 10 are provided with connectors (not illustrated) engaging with each other, respectively. The control device 10 and the image display section 20 are connected to or disconnected from each other by engagement or disengagement between the connector of the main cord 48 and the connector of the control device 10. The right cord 42, the left cord 44, and the main cord 48 can employ, for example, a metal cable or an optical fiber.

The control device 10 is a device which controls the head mounted display 100. The control device 10 is provided with switches including a determination key 11, a lighting unit 12, a display change key 13, a luminance change key 15, a direction key 16, a menu key 17, and a power switch 18. The control device 10 also includes a track pad 14 on which the user performs a touch operation with the user's finger.

The determination key 11 detects a pressing operation and outputs a signal for determining content which is operated in the control device 10. The lighting unit 12 performs a notification of an operation state of the head mounted display 100 by using its light emitting state. The operation state of the head mounted display 100 includes, for example, ON and OFF states of the supply of power. As the lighting unit 12, for example, a light emitting diode (LED) is used. The display change key 13 detects a pressing operation and outputs a signal for changing a content moving image display mode between 3D and 2D.

The track pad 14 detects an operation of the user's finger on an operation surface of the track pad 14 and outputs a signal corresponding to detected content. As the track pad 14, various types track pads such as an electrostatic type track pad, a pressure detection type track pad, and an optical type track pad may be employed. The luminance change key 15 detects a pressing operation and outputs a signal for changing luminance of the image display section 20. The direction key 16 detects a pressing operation on a key corresponding to upper, lower, left, and right directions, and outputs a signal corresponding to detected content. The power switch 18 detects a sliding operation of the switch, and changes a power supply state of the head mounted display 100.

Figure 2:
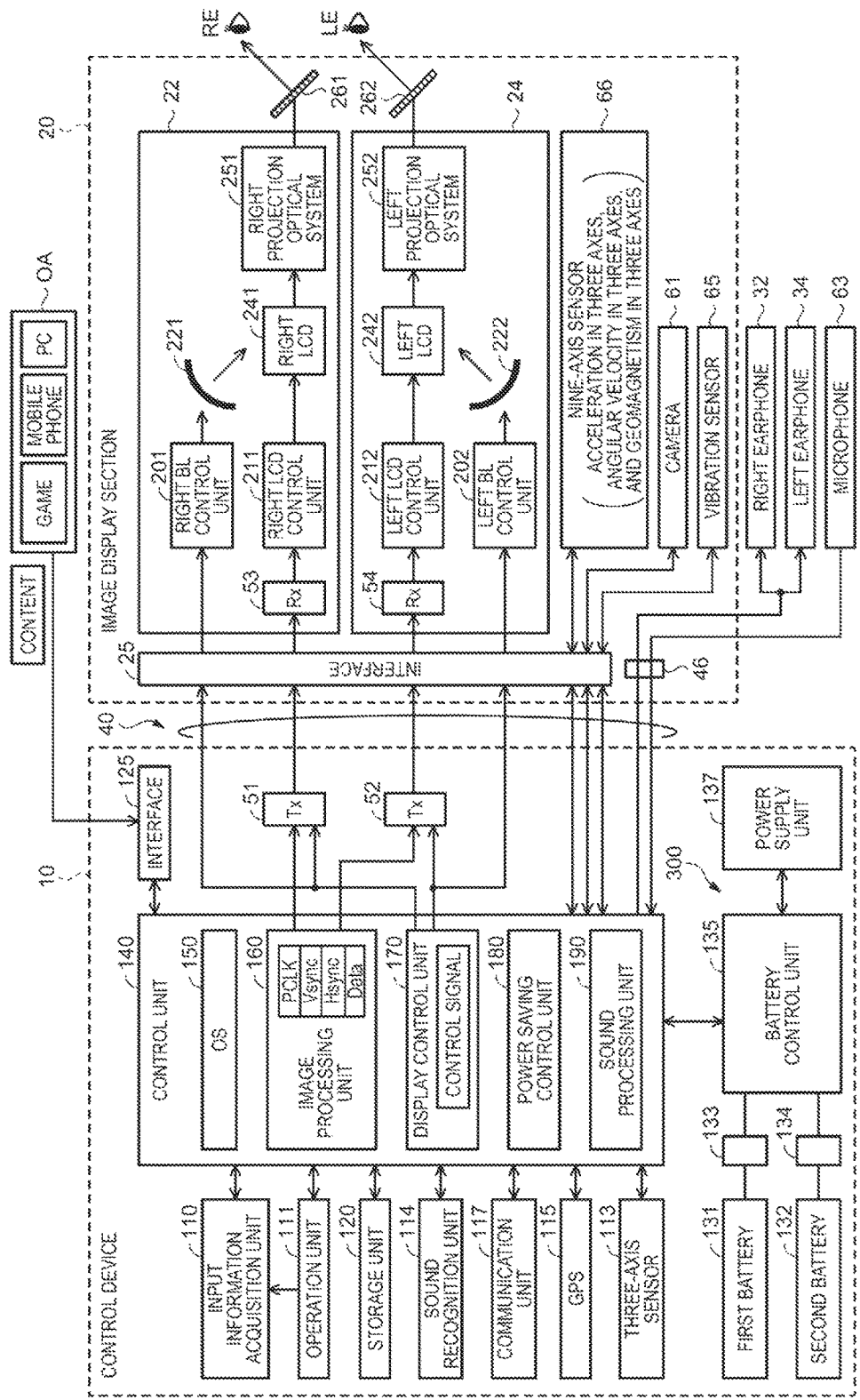
FIG. 2 is a functional block diagram of each section constituting the head mounted display.

FIG. 2 is a functional block diagram of the respective sections constituting the head mounted display 100.

As illustrated in FIG. 2, the head mounted display 100 is connected to external apparatuses OA via an interface 125. The interface 125 is an interface which connects the control device 10 to the various external apparatuses OA which are content supply sources. As the interface 125, for example, an interface associated with wired connection, such as a USB interface, a micro-USB interface, or a memory card interface may be used.

The external apparatuses OA are image supply apparatuses which supply images to the head mounted display 100, and include, for example, a personal computer (PC), a mobile phone, and a game terminal.

The control device 10 of the head mounted display 100 includes a control unit 140, an operation unit 111, an input information acquisition unit 110, a storage unit 120, a transmission unit (Tx) 51, and a transmission unit (Tx) 52.

The operation unit 111 detects a user's operation. The operation unit 111 includes the respective constituent elements such as the determination key 11, the display change key 13, the track pad 14, the luminance change key 15, the direction key 16, the menu key 17, and the power switch 18 illustrated in FIG. 1.

The input information acquisition unit 110 acquires a signal corresponding to an input operation from the user. The signal corresponding to an input operation includes, for example, input operations on the track pad 14, the direction key 16, and the power switch 18.

The storage unit 120 is a nonvolatile storage device, and stores various computer programs. The storage unit 120 may store image data which is displayed on the image display section 20 of the head mounted display 100.

The control unit 140 is connected to a three-axis sensor 113, a GPS 115, a communication unit 117, and a sound recognition unit 114. The three-axis sensor 113 is a three-axis acceleration sensor, and the control unit 140 can acquire a value detected by the three-axis sensor 113. The GPS 115 is provided with an antenna (not illustrated), and receives a global positioning system (GPS) signal so as to obtain the present position of the control device 10. The GPS 115 outputs the present position which is obtained on the basis of the GPS signal, or the present time to the control unit 140. The GPS 115 may have a function of acquiring the present time on the basis of information included in the GPS signal, and of correcting the time measured by the control unit 140 of the control device 10.

The communication unit 117 performs wireless data communication conforming to a wireless communication standard such as a wireless LAN (WiFi (registered trademark)) or Miracast (registered trademark). The communication unit 117 may perform wireless data communication conforming to near field communication such as Bluetooth (registered trademark), Bluetooth Low Energy, Bluetooth Smart, iBeacon (registered trademark), RFID, or Felica (registered trademark). In a case where communication is performed by using Bluetooth, the communication unit 117 may function as a master device, and may be function as a slave device.

In a case where the external apparatuses OA are wirelessly connected to the communication unit 117, the control unit 140 performs control for acquiring content data from the communication unit 117 and displaying an image on the image display section 20. On the other hand, in a case where the external apparatuses OA are connected to the interface 125 in a wired manner, the control unit 140 performs control for acquiring content data from the interface 125 and displaying an image on the image display section 20. Therefore, the communication unit 117 and the interface 125 are hereinafter collectively referred to as a data acquisition unit DA.

The data acquisition unit DA acquires content data from the external apparatuses OA. The data acquisition unit DA acquires data (also referred to as "display image data") regarding an image displayed on the head mounted display 100 from the external apparatuses OA.

The communication unit 117 may perform wireless communication according to a plurality of types of communication methods of the above-described wireless communication and near field communication conforming to the various standards. For example, the communication unit 117 may perform communication by both WiFi and Bluetooth together or in a switching manner. In this case, while performing communication based on either one of the communication methods with an apparatus of a communication partner, communication unit 117 may switch the communication with the apparatus of the same communication partner to communication based on the other communication method. For example, while communication based on WiFi is being performed with a personal computer (not illustrated) as the external apparatus OA, the communication with the personal computer may be switched to communication based on Bluetooth. In this case, preferably, the communication with the PC is maintained, and authentication using a user ID or password can be omitted when WiFi is switched to Bluetooth. In other words, even if sequences defined by protocols of WiFi and Bluetooth are performed, user authentication or the like in an application after establishing communication can be preferably omitted. An output may be changed without switching the communication methods, and, for example, during communication using Bluetooth, a class (output) may be changed to a class in which power consumption is lower.

The sound recognition unit 114 extracts features from digital audio data obtained by converting sound collected by the microphone 63 into digital data in the sound processing unit 190 which will be described later, and generates a model of the features. The sound recognition unit 114 extracts and models the features of sound, and thus recognizes a voice of each of a plurality of people, thereby performing talker recognition for specifying a talking person for each voice or performing text conversion for converting the voice into text. The sound recognition unit 114 may have a configuration in which the kind of language of audio data can be identified in the voice recognition process.

The control device 10 includes a first battery 131, a second battery 132, a first battery monitoring IC 133, a second battery monitoring IC 134, a battery control unit 135, and a power supply unit 137.

The first battery 131 is a main battery of the head mounted display 100. The first battery 131 is configured by using, for example, a secondary battery such as a lithium ion battery, a lithium polymer battery, or a nickel hydrogen battery, a storage capacitor such as an electric double-layer capacitor, or a primary battery.

The second battery 132 is a subsidiary battery of the head mounted display 100. The second battery 132 supplies power to the head mounted display 100 when the first battery 131 is replaced. The second battery 132 is a chargeable battery, and is charged by a new first battery 131 if the first battery 131 is replaced with the new first battery.

The second battery 132 may be constituted of a primary battery, but is preferably constituted of a chargeable battery, for example, a secondary battery such as a lithium ion battery, a lithium polymer battery, or a nickel hydrogen battery, a storage capacitor such as an electric double-layer capacitor, or a fuel cell. The second battery 132 may be charged through noncontact charging (wireless charging) using an electromagnetic induction method, an electric wave reception method, a resonance method, or the like. As the second battery 132, a solar cell may be used.

Battery capacities of the first battery 131 and the second battery 132 are arbitrary. For example, the first battery 131 may be used as a main battery, and the second battery 132 may be used as a subsidiary battery with a smaller capacity than that of the first battery 131. In this case, the head mounted display 100 is operated by the first battery 131 which is a main battery in a normal operation mode which will be described later. The head mounted display 100 is operated by the second battery 132 which is a subsidiary battery in a battery replacement mode which will be described later. Switching between the first battery 131 and the second battery 132 is performed by the control unit 140 as will be described later.

The head mounted display 100 may be operated by the first battery 131 and the second battery 132 which have the same capacity or which have the substantially same capacity regardless of capacities thereof. In this case, the head mounted display 100 does not perform control for determining one of the first battery 131 and the second battery 132 as a main battery and the other battery as a subsidiary battery. In other words, the head mounted display 100 may be operated by using either one as a power source, or may be supplied with power from both of the first battery 131 and the second battery 132, without determining a main battery and a subsidiary battery with respect to the first battery 131 and the second battery 132. In this case, the head mounted display 100 can be operated if a capacity of either one of the first battery 131 and the second battery 132 remains.

The first battery monitoring IC 133 is connected to the first battery 131 and the battery control unit 135 and calculates a residual capacity of the first battery 131. The first battery monitoring IC 133 measures, for example, a terminal voltage of the first battery 131, and calculates a residual capacity of the first battery 131 on the basis of the measured terminal voltage.

A method of calculating a residual capacity of the first battery 131 in the first battery monitoring IC 133 may be a method in which discharge currents of the first battery 131 are measured and are integrated, and a residual capacity of the first battery 131 may be calculated on the basis of an amount of the integrated discharge currents. The first battery monitoring IC 133 may calculate a residual capacity of the first battery 131 by measuring a change in impedance of the first battery 131. The first battery monitoring IC 133 outputs the measured terminal voltage of the first battery 131 and the calculated residual capacity of the first battery 131 to the battery control unit 135.

The first battery monitoring IC 133 may be built into an exterior of the first battery 131, and may be provided integrally with the first battery 131. The first battery 131 includes a battery main body (not illustrated) in which a secondary battery such as a lithium ion battery, a lithium polymer battery, or a nickel hydrogen battery, or a primary battery is sealed with a package, and an exterior which accommodates the battery main body. A terminal connected to an electrode inside the package is exposure to the exterior. The first battery monitoring IC 133 may be accommodated in the exterior along with the battery main body, and, in this case, the first battery monitoring IC 133 is connected to an electrode of the battery main body. A terminal of the exterior of the first battery 131 is connected to an output terminal of the first battery monitoring IC 133.

The second battery monitoring IC 134 is connected to the second battery 132 and the battery control unit 135, and calculates a residual capacity of the second battery 132. In the same manner as the first battery monitoring IC 133, the second battery monitoring IC 134 measures a terminal voltage of the second battery 132, and calculates a residual capacity of the second battery 132 on the basis of the measured terminal voltage.

A method of calculating a residual capacity of the second battery 132 in the second battery monitoring IC 134 may be a method in which discharge currents of the second battery 132 are measured and are integrated, and a residual capacity of the second battery 132 may be calculated on the basis of an amount of the integrated discharge currents. The second battery monitoring IC 134 may calculate a residual capacity of the second battery 132 by measuring a change in impedance of the second battery 132. The second battery monitoring IC 134 outputs the measured terminal voltage of the second battery 132 and the calculated residual capacity of the second battery 132 to the battery control unit 135.

The second battery monitoring IC 134 may be built into a main body of the second battery 132, or may be provided integrally with the second battery 132.

Figure 3:
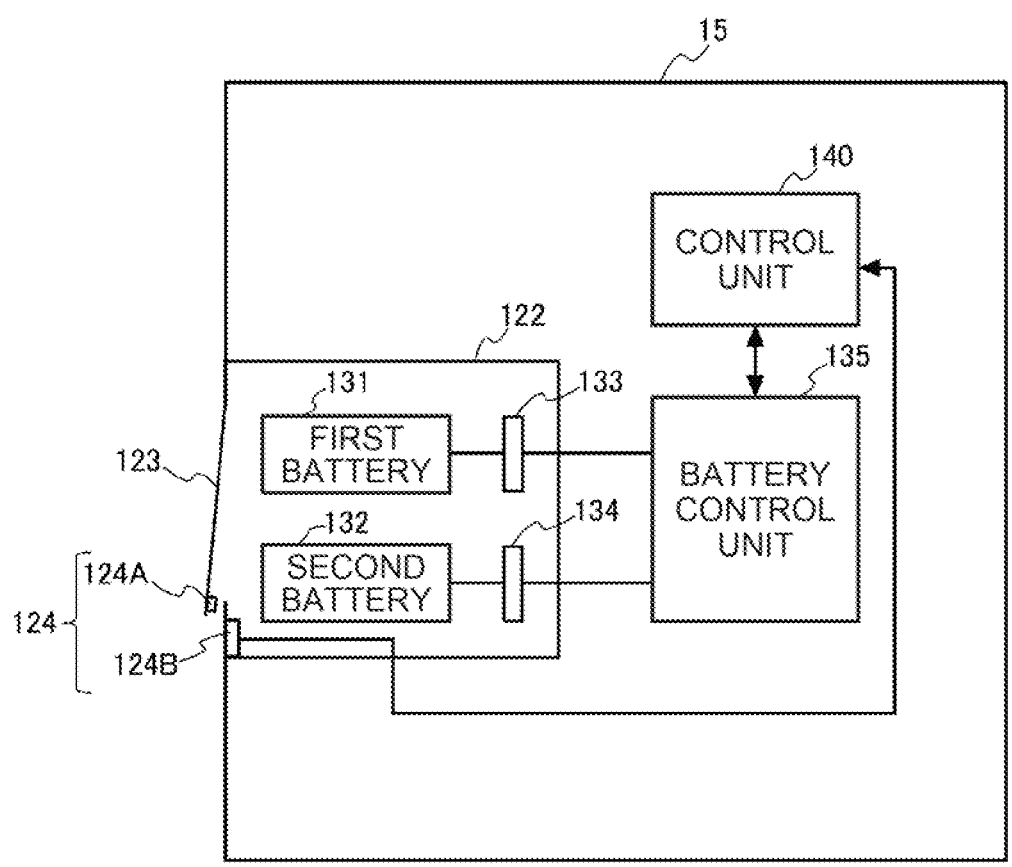
FIG. 3 is a diagram illustrating a configuration of a battery accommodation unit.

FIG. 3 is a diagram illustrating a configuration of a battery accommodation unit 122. The battery accommodation unit 122 is accommodated in a casing 145 in which the control device 10 is mounted.

The first battery 131, the second battery 132, the first battery monitoring IC 133, and the second battery monitoring IC 134 are accommodated in the battery accommodation unit 122. The first battery 131 is accommodated so as to be attachable to and detachable from the battery accommodation unit 122. In other words, the battery accommodation unit 122 includes a holding portion (not illustrated) which attachable and detachably holds the first battery 131.

The battery accommodation unit 122 includes a lid 123. If the lid 123 is opened, the first battery 131 can be drawn from the battery accommodation unit 122.

The battery accommodation unit 122 is provided with an opening/closing detection portion 124 which detects operation and closing of the lid 123. The opening/closing detection portion 124 employs various types, but employs a magnetic detection type opening/closing detection portion 124 in the present embodiment. The opening/closing detection portion 124 includes a magnet 124A provided on the lid 123 and a Hall element 124B provided on a main body side of the battery accommodation unit 122, and the Hall element 124B detects a magnetic force of the magnet 124A. If the lid 123 is opened, and thus the magnetic force of the magnet 124A cannot be detected by the Hall element 124B, the opening/closing detection portion 124 outputs a signal indicating that the lid 123 is open to the control unit 140.

A configuration of the opening/closing detection portion 124 is not limited to a magnetic detection type configuration including the magnet 124A and the Hall element 124B. For example, a switch type configuration may be used which includes a toggle switch or a lever switch which switches a conduction state and an open state of a contact point so as to correspond to opening and closing of the lid 123. Alternatively, the opening/closing detection portion 124 may have an optical detection type configuration in which opening and closing of the lid 123 are detected by using light such as infrared light or visible light, and may have a configuration in which opening and closing of the lid 123 are detected by detecting insertion and extraction of a protrusion into and from a recess.

The battery control unit 135 is connected to the control unit 140, the first battery 131, the second battery 132, and the power supply unit 137.

The battery control unit 135 performs switching of the supply of power of the head mounted display 100 under the control of the control unit 140. In other words, the battery control unit 135 switches a power supply battery to the head mounted display 100 between the first battery 131 and the second battery 132. The battery control unit 135 is supplied with power which is supplied from the first battery 131 or the second battery 132. The battery control unit 135 outputs the input power to the power supply unit 137. The battery control unit 135 controls a supply destination to which the power is supplied from the power supply unit 137 in response to an instruction from the control unit 140.

The power supply unit 137 is connected to the battery control unit 135. The power supply unit 137 supplies the power which is supplied from the first battery 131 or the second battery 132 to a supply destination for which an instruction is given by the battery control unit 135. For example, in the normal operation mode to be described later, the battery control unit 135 gives an instruction to the power supply unit 137 so that power is supplied to each unit of the head mounted display 100. For this reason, the power supply unit 137 supplies power to each unit of the head mounted display 100. In the battery replacement mode to be described later, the battery control unit 135 gives an instruction to the power supply unit 137 so that power is supplied to the control unit 140, the communication unit 117, and the right display driving unit 22 and the left display driving unit 24 of the image display section 20. In other words, the power supply unit 137 supplies power to the control unit 140, the communication unit 117, and the right display driving unit 22 and the left display driving unit 24 of the image display section 20.

Here, a description will be made of a configuration example of a power source section 300 which functions as a power source of the head mounted display 100. The power source section 300 includes the first battery 131, the second battery 132, and the battery control unit 135.

Figure 4:
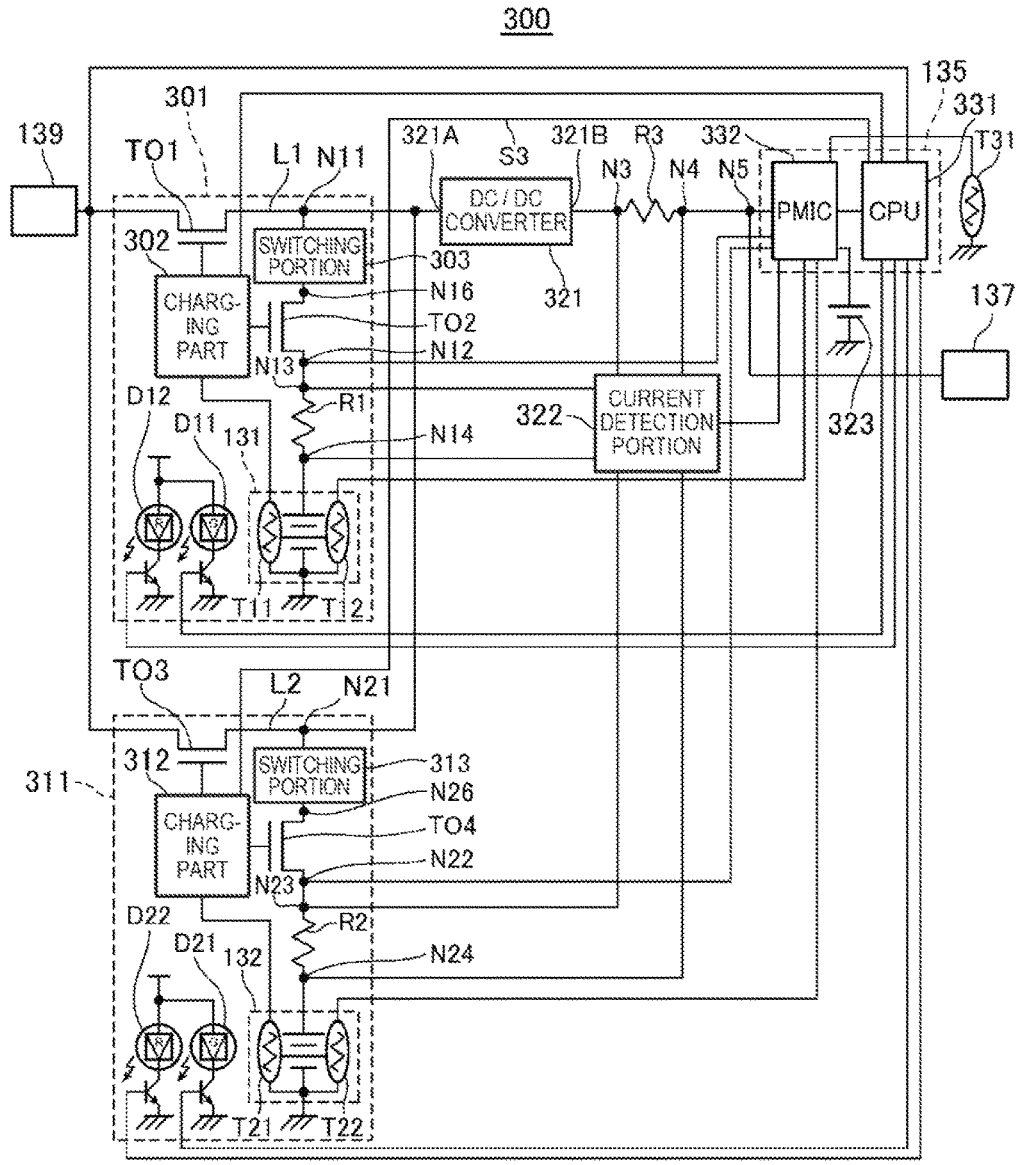
FIG. 4 is a circuit diagram illustrating a configuration example of a power source section.

FIG. 4 is a circuit diagram illustrating details of a configuration example of the power source section 300. The circuit diagram of FIG. 4 illustrates an example of a specific configuration of the power source section 300, and a part of or the entire circuit of FIG. 3 may be replaced with an equivalent circuit or a circuit having an equivalent function.

In the configuration example of FIG. 4, the power source section 300 includes a DC connector 139. The DC connector 139 can be connected to an external AC adaptor (not illustrated), and power for driving the head mounted display 100 and power for charging the first battery 131 and the second battery 132 can be supplied from the AC adaptor.

The power source section 300 includes a first power source portion 301 including the first battery 131 and a second power source portion 311 including the second battery 132. The power source section 300 includes a DC/DC converter 321, a current detection portion 322, and a subsidiary battery 323.

The battery control unit 135 includes a power management integrated circuit (PMIC) 332 which detects a state of each unit of the power source section 300, and a CPU 331 which controls each unit of the power source section 300. The CPU 331 is connected to the DC connector 139 and can detect a voltage of the DC connector 139.

The DC/DC converter 321 converts DC currents supplied from the DC connector 139, the first power source portion 301, and the second power source portion 311, into voltages which are then output to the power supply unit 137. Power supply lines L1 and L2 are connected to an input terminal 321A of the DC/DC converter 321. The power supply line L1 connects the DC connector 139 and the first power source portion 301 to the DC/DC converter 321. The power supply line L2 connects the DC connector 139 and the second power source portion 311 to the DC/DC converter 321.

The current detection portion 322 detects currents which flow through the first power source portion 301, the second power source portion 311, and the DC/DC converter 321 as will be described later. The current detection portion 322 transmits and receives a control signal to and from the PMIC 332, and transmits detection result to the PMIC 332.

The PMIC 332 acquires results of voltage and currents detected by the current detection portion 322. The PMIC 332 detects temperatures of the first battery 131 and the second battery 132, an output voltage from the DC/DC converter 321, and output voltages from the first battery 131 and the second battery 132. The PMIC 332 is connected to a thermistor T31 of a main board (not illustrated) on which the control unit 140 of the control device 10 is mounted, and the PMIC 332 detects a temperature of the main board. The PMIC 332 outputs a detection result of the temperature to the CPU 331. The PMIC 332 is connected to the subsidiary battery 323 which functions as a backup power source. In a case or the like where residual quantities of the first battery 131 and the second battery 132 are considerably low, the PMIC 332 is operated by the subsidiary battery 323 so as to supply power from the subsidiary battery 323 to the CPU 331.

The CPU 331 is connected to a charging part 302 included in the first power source portion 301 and a charging part 312 included in the second power source portion 311, and controls each of the charging parts 302 and 312.

The CPU 331 calculates residual quantities of the first battery 131 and the second battery 132 on the basis of output voltages from the first battery 131, the second battery 132, and the DC/DC converter 321, detected by the PMIC 332, and outputs the calculated residual quantities to the control unit 140.

The CPU 331 outputs a detection result of a temperature of each unit detected by the PMIC 332, or a determination result of whether or not the detected temperature exceeds a preset threshold value, to the control unit 140.

The first power source portion 301 includes the charging part 302 which is connected to an FET_T01 and an FET_T02 and switches turning-on and turning-off of the FET_T01 and the FET_T02.

The FET_T01 and the FET_T02 are switching elements constituted of field effect transistors (FETs). The FET_T02 is provided between the first battery 131 and a node N11 of the power supply line L1, and connects the first battery 131 to the power supply line L1. The FET_T01 is provided between the DC connector 139 and the node N11 of the power supply line L1, and connects the DC connector 139 to the first battery 131.

The charging part 302 turns on or turns off each of the FET_T01 and the FET_T02 in response to a control signal which is input from the CPU 331.

If the FET_T01 is turned on, the DC connector 139 is connected to the input terminal 321A of the DC/DC converter 321. If the DC connector 139 is connected to the AC adaptor (not illustrated), power can be supplied from the AC adaptor to the DC connector 139. Since power can be supplied from the AC adaptor to the first battery 131, if the FET_T02 is turned on in this state, the first battery 131 can be charged.

A switching portion 303 is provided between the first battery 131 and the node N11 of the power supply line L1. The switching portion 303 may be generally constituted of a power source control element which is known as an ORing controller. The switching portion 303 functions as a switch which is turned on and off depending on a potential difference between the node N11 and a node N16 of the first battery 131 side. Specifically, the switching portion 303 is turned on in a case where a potential of the node N11 is lower than the node N16 so as to connect the first battery 131 to the power supply line L1.

If the CPU 331 controls the charging part 302 to turn off the FET_T01 and turn on the FET_T02, the switching portion 303 is turned on in a case where a residual quantity of power of the first battery 131 is sufficient. Then, the first battery 131 is connected to the power supply line L1, and a DC current is input to the DC/DC converter 321 from the first battery 131. Consequently, power supplied from the first battery 131 is supplied to each unit of the head mounted display 100 via the power supply unit 137. In other words, the first battery 131 is a power source of the head mounted display 100.

The second power source portion 311 includes the charging part 312 which is connected to an FET_T03 and an FET_T04 and switches turning-on and turning-off of the FET_T03 and the FET_T04.

The FET_T03 and the FET_T04 are constituted of FETs in the same manner as the FET_T01 and the FET_T02. The FET_T04 is provided between the second battery 132 and a node N21 of the power supply line L2, and connects the second battery 132 to the power supply line L2. The FET_T03 is provided between the DC connector 139 and the node N21 of the power supply line L2, and connects the DC connector 139 to the second battery 132.

The charging part 312 turns on or turns off each of the FET_T03 and the FET_T04 in response to a control signal which is input from the CPU 331.

If the FET_T03 is turned on, the DC connector 139 is connected to the DC/DC converter 321. If the DC connector 139 is connected to the AC adaptor (not illustrated), power can be supplied from the AC adaptor to the DC connector 139. Since power can be supplied from the AC adaptor to the second battery 132, if the FET_T04 is turned on in this state, the second battery 132 can be charged.

A switching portion 313 is provided between the second battery 132 and the node N21 of the power supply line L2. The switching portion 313 may be constituted of an ORing controller in the same manner as the switching portion 303, and functions as a switch which is turned on and off depending on a potential difference between the node N21 and a node N26 of the second battery 132 side. Specifically, the switching portion 313 is turned on in a case where a potential of the node N21 is lower than the node N26 so as to connect the second battery 132 to the power supply line L2.

If the CPU 331 controls the charging part 312 to turn off the FET_T03 and turn on the FET_T04, the switching portion 313 is turned on in a case where a residual quantity of power of the second battery 132 is sufficient. Then, the second battery 132 is connected to the power supply line L2, and a DC current is input to the DC/DC converter 321 from the second battery 132. Consequently, power supplied from the second battery 132 is supplied to each unit of the head mounted display 100 via the power supply unit 137. In other words, the second battery 132 is a power source of the head mounted display 100.

Thermistors T11 and T12 are provided in the package of the first battery 131. The thermistor T11 is connected to the charging part 302, and the charging part 302 can monitor a temperature of the first battery 131. The thermistor T12 is connected to the PMIC 332, and the PMIC 332 can monitor a temperature of the first battery 131.

Thermistors T21 and T22 are provided in the package of the second battery 132. The thermistor T21 is connected to the charging part 312, and the charging part 312 can monitor a temperature of the second battery 132. The thermistor T22 is connected to the PMIC 332, and the PMIC 332 can monitor a temperature of the second battery 132.

The first power source portion 301 includes an LED_D11 which emits green light, and an LED_D12 which emits red light. The LED_D11 and the LED_D12 are turned on under the control of the CPU 331. The CPU 331 turns on, turns off, or causes each of the LED_D11 and the LED_D12 to blink according to a residual quantity state of the first battery 131 under the control of the control unit 140.

The second power source portion 311 includes an LED_D21 which emits green light, and an LED_D22 which emits red light. The LED_D21 and the LED_D22 are turned on under the control of the CPU 331. The CPU 331 turns on, turns off, or causes each of the LED_D21 and the LED_D22 to blink according to a residual quantity state of the second battery 132 under the control of the control unit 140.

A resistor R1 is connected between the first battery 131 and the FET_T02. Nodes N13 and N14 of both ends of the resistor R1 are connected to the current detection portion 322. The current detection portion 322 detects currents which are input to and output from the first battery 131 on the basis of a potential difference between the nodes N13 and N14.

A resistor R2 is connected between the second battery 132 and the FET_T04. Nodes N23 and N24 of both ends of the resistor R2 are connected to the current detection portion 322. The current detection portion 322 detects currents which are input to and output from the second battery 132 on the basis of a potential difference between the nodes N23 and N24.

A resistor R3 is connected between an output terminal 321B of the DC/DC converter 321 and the power supply unit 137, and nodes N3 and N4 of both ends of the resistor R3 are connected to the current detection portion 322. The current detection portion 322 detects a current output from the DC/DC converter 321 on the basis of a potential difference between the nodes N3 and N4.

A result of the current detection portion 322 detecting a current is output to the PMIC 332 and is used to control the CPU 331.

The PMIC 332 is connected to the node N12 located at the end of the resistor R1, the node N22 located at the end of the resistor R2, and a node N5 located at the end of the resistor R3. The PMIC 332 detects an output voltage from the first battery 131 at the node N12, detects an output voltage from the second battery 132 at the node N22, and detects an output voltage from the DC/DC converter 321 at the node N5.

In this configuration, it may be considerate that resistance values of the resistors R1 and R2 are the same as each other, and voltage drops of the FET_T02 and the FET_T04 are the same as each other, in the first power source portion 301 and the second power source portion 311.

In the power source section 300, the CPU 331 controls the charging parts 302 and 312 so that the first battery 131 and the second battery 132 can be separately connected to the DC/DC converter 321 and thus power can be supplied thereto. In a case where both of the first battery 131 and the second battery 132 are connected to the DC/DC converter 321, power is supplied from the battery having a larger residual quantity of the first battery 131 and the second battery 132.

In other words, in a state in which the FET_T02 and the FET_T04 are turned on, both of the first battery 131 and the second battery 132 are connected to the input terminal 321A of the DC/DC converter 321 via the power supply lines L1 and L2. Potentials of the power supply line L1 and the power supply line L2 are the same as each other, and the potential is defined by a higher voltage of output voltages from the first battery 131 and the second battery 132.

In a case where there is a difference between residual quantities of the first battery 131 and the second battery 132, output voltages from the first battery 131 and the second battery 132 are also different from each other. In a case where the first battery 131 has a larger residual quantity than that of the second battery 132, the switching portion 313 is turned off since a potential of the node N26 is lower than a potential of the power supply line L2. Thus, power is supplied from the first battery 131 to the DC/DC converter 321. Similarly, in a case where a residual quantity of the second battery 132 is larger than that of the first battery 131, the switching portion 303 is turned off so that the first battery 131 is disconnected from the power supply line L1, and thus the second battery 132 supplies power.

As mentioned above, the power source section 300 can supply power from both of the first battery 131 and the second battery 132 and can supply power from as long as residual quantities of both the batteries 131 and 132 are not zero. The control unit 140 connected to the power source section 300 can separately acquire a residual quantity of the first battery 131 and a residual quantity of the second battery 132 from the CPU 331. Control regarding a temperature of the main board of the control device 10, a temperature of the first battery 131, and a temperature of the second battery 132 can be performed as necessary.

The control unit 140 operates the charging parts 302 and 312 under the control of the CPU 331, and thus the first battery 131 and the second battery 132 can be charged in a state in which the AC adaptor is connected to the DC connector 139.

Figure 5A:
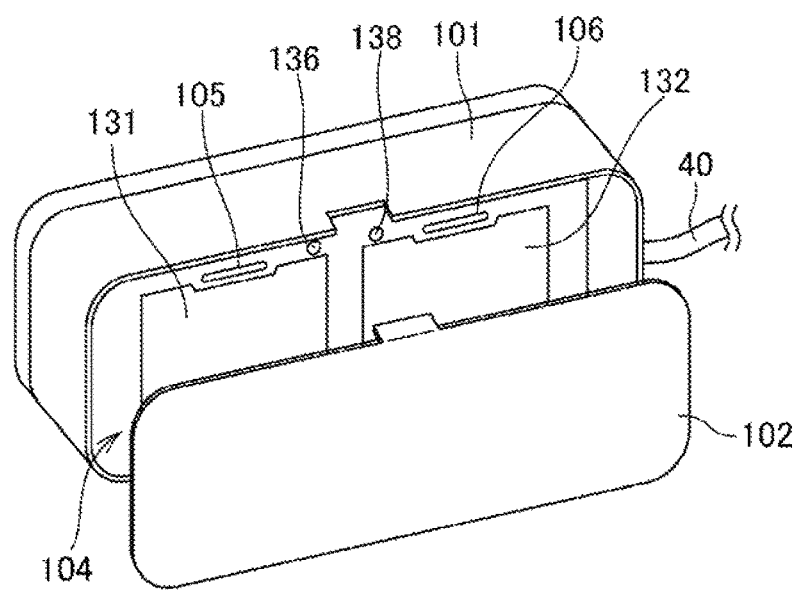
FIGS. 5A and 5B are exterior views of a control device main body.
Figure 5B:
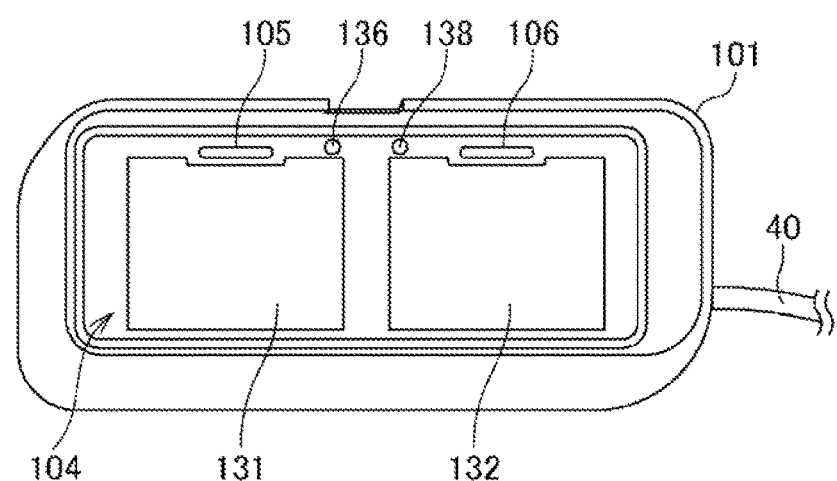

FIGS. 5A and 5B illustrate a configuration example of the control device 10, and are exterior views of a control device main body 101. FIGS. 5A and 5B particularly illustrate an accommodated state of the first battery 131 and the second battery 132 in the control device main body 101. FIG. 5A illustrates a state in which a battery cover 102 is attached, and FIG. 5B illustrates a state in which the battery cover 102 is removed.

The control device main body 101 is a substantially box-like case which accommodates the respective units of the control device 10. As illustrated in FIG. 1, the determination key 11, the lighting unit 12, the display change key 13, the track pad 14, the luminance change key 15, the direction key 16, the menu key 17, and the power switch 18 are disposed on a surface of the control device main body 101. FIGS. 5A and 5B illustrate a rear surface side of the control device main body 101.

The rear surface of the control device main body 101 is covered with the battery cover 102. The battery cover 102 corresponds to the above-described lid 123. If the battery cover 102 is detached, as illustrated in FIG. 5A, a battery accommodation unit 104 is exposed, and thus the first battery 131 and the second battery 132 can be accessed.

As illustrated in FIGS. 5A and 5B, the first battery 131 and the second battery 132 are accommodated in parallel to each other in the battery accommodation unit 104. The first battery 131 is engaged with an engagement portion 105, and the second battery 132 is engaged with an engagement portion 106. The first battery 131 and the second battery 132 can be extracted from the battery accommodation unit 104 through an operation such as pressing of the engagement portions 105 and 106.

An LED display portion 136 is disposed near the engagement portion 105. The LED display portion 136 includes the LED_D11 and the LED_D12 of the power source section 300 (FIG. 4) and transmits light emitted from the LED_D11 and the LED_D12 therethrough. An LED display portion 138 is disposed near the engagement portion 106. The LED display portion 138 includes the LED_D21 and the LED_D22 of the power source section 300 and transmits light emitted from the LED_D21 and the LED_D22 therethrough.

As described above, the LED_D11 and the LED_D12 are turned on and are caused to blink under the control of the CPU 331. The LED_D21 and the LED_D22 are turned on and are caused to blink under the control of the CPU 331. The LED display portions 136 and 138 function as a display portion which guide a user, for example, when the first battery 131 and the second battery 132 are replaced.

Referring to FIG. 1 again, the control unit 140 includes a CPU, a ROM, and a RAM (not illustrated) as hardware. The control unit 140 functions as an operating system (OS) 150, an image processing unit 160, a display control unit 170, a power saving control unit 180, and the sound processing unit 190 by executing a computer program stored in the storage unit 120.

The head mounted display 100 has the normal operation mode and the battery replacement mode as operation modes. Switching between the operation modes of the head mounted display 100 is performed by the power saving control unit 180.

The normal operation mode is an operation mode in which power is supplied to each functional block of the head mounted display 100, and power of the first battery 131 is supplied to at least the control unit 140, the communication unit 117, and the right display driving unit 22 and the left display driving unit 24 of the image display section 20. In the normal operation mode, power can be supplied to all the functional blocks of the head mounted display 100 illustrated in FIG. 2. However, power is not necessarily supplied to all the functional blocks at the same time.

For example, in a case where a residual capacity of the first battery 131 is equal to or less than a predefined value, or in a case where the lid 123 of the battery accommodation unit 122 is opened as will be described later, the control unit 140 causes the operation mode of the head mounted display 100 to transition from the normal operation mode to the battery replacement mode.

In the normal operation mode, the first battery 131 supplies power to each unit of the head mounted display 100, and, in the battery replacement mode, the second battery 132 supplies power to each unit of the head mounted display 100. In the battery replacement mode, a supply destination of power of the second battery 132 may be restricted under the control of the control unit 140 so that an amount of power consumption of the head mounted display 100 is lower than that in the normal operation mode. In other words, under the control of the control unit 140, power may be supplied to restricted blocks such as the control unit 140, the communication unit 117, and the right display driving unit 22 and the left display driving unit 24 of the image display section 20.

For example, in a case where a residual capacity of the first battery 131 is equal to or less than a predefined value, or the lid 123 of the battery accommodation unit 122 is opened as will be described later, the control unit 140 causes the operation mode of the head mounted display 100 to transition from the normal operation mode to the battery replacement mode.

When the transition occurs from the normal operation mode to the battery replacement mode, system information may be stored in the storage unit 120 under the control of the control unit 140. The system information is, for example, data for returning the head mounted display 100 to the normal operation mode before transition to the battery replacement mode, and is data related to a control operation of the control unit 140. The system information may include, for example, data regarding an operation of the head mounted display 100, such as a display position or a display size of an image displayed on the image display section 20.

The image processing unit 160 acquires an image signal included in the content. The image processing unit 160 separates a synchronization signal such as the vertical synchronization signal VSync or the horizontal synchronization signal HSync from the acquired image signal. The image processing unit 160 generates a clock signal PCLK through the use of a PLL circuit or the like (not illustrated) on the basis of a cycle of the separated vertical synchronization signal VSync or horizontal synchronization signal HSync. The image processing unit 160 converts an analog image signal from which the synchronization signal is separated into a digital image signal by the use of an A/D conversion circuit or the like (not illustrated). The image processing unit 160 stores the converted digital image signal as image data (Data in FIG. 2) of a target image in the DRAM of the storage unit 120 for each frame. The image data is, for example, RGB data.

The image processing unit 160 may perform various image processes such as a resolution conversion process, various color correction processes such as adjustment of luminance and chroma, and a keystone correction process on the image data as necessary.

In a case where an instruction for converting a frame rate of an image signal is input from the power saving control unit 180, the image processing unit 160 performs a conversion process of converting the frame rate of the image signal.

If the instruction for converting a frame rate is input, the image processing unit 160 converts the vertical synchronization signal VSync and the horizontal synchronization signal HSync so that a frame rate of an image signal is lower than a frame rate during the normal operation mode.

The frame rate of the image signal converted by the image processing unit 160 may be a frame rate which is set in advance, and may be changed in response to an instruction from the power saving control unit 180. For example, the power saving control unit 180 may give an instruction for a frame rate corresponding to a residual capacity of the second battery 132 to the image processing unit 160. Specifically, there may be a configuration in which a frame rate of a conversion destination is set in a plurality of stages in advance, a residual capacity of the second battery 132 is divided into a plurality of stages, and the frame rate is correlated with the stages of the residual capacity of the second battery 132. In this configuration, the power saving control unit 180 selects a frame rate corresponding to a capacity of the second battery 132 as a frame rate of a conversion destination.

The image processing unit 160 transmits the generated clock signal PCLK, vertical synchronization signal VSync, and horizontal synchronization signal HSync and the image data Data stored in the DRAM of the storage unit 120 via the transmission units 51 and 52. The image data Data transmitted via the transmission unit 51 is also referred to as "right eye image data" and the image data Data transmitted via the transmission unit 52 is also referred to as "left eye image data". The transmission units 51 and 52 serve as transceivers for serial transmission between the control device 10 and the image display section 20.

The display control unit 170 generates a control signal for controlling the right display driving unit 22 and the left display driving unit 24. Specifically, the display control unit 170 separately controls a right LCD control unit 211 to control ON and OFF of driving of a right LCD 241 and controls a right backlight control unit 201 to control ON and OFF of driving of a right backlight 221. The display control unit 170 separately controls a left LCD control unit 212 to control ON and OFF of driving of a left LCD 242 and controls a left backlight control unit 202 to control ON and OFF of driving of a left backlight 222. Consequently, the display control unit 170 controls generation and emission of image light of each of the right display driving unit 22 and the left display driving unit 24. For example, the display control unit 170 controls both the right display driving unit 22 and the left display driving unit 24 so that both of the right display driving unit 22 and the left display driving unit 24 generate image light or only one thereof unit generates image light by using the control signal. The display control unit 170 controls the right display driving unit 22 and the left display driving unit 24 by using the control signal so that neither of the right display driving unit 22 and the left display driving unit 24 generate image light.

The display control unit 170 transmits control signals for the right LCD control unit 211 and the left LCD control unit 212 via the transmission units 51 and 52. The display control unit 170 transmits the control signal for the right backlight control unit 201 to the right backlight control unit 201, and transmits a control signal for the left backlight control unit 202 to the left backlight control unit 202.

The display control unit 170 reduces the luminance of the right backlight 221 and the left backlight 222 in a case where an operation is switched to the battery replacement mode by the power saving control unit 180. The display control unit 170 controls the right backlight control unit 201 and the left backlight control unit 202 by using the control signals so as to reduce the luminance of the right backlight 221 and the left backlight 222 more than that in the normal operation mode. The display control unit 170 may reduce the luminance of one of the right backlight 221 and the left backlight 222 more than that in the normal operation mode. The luminance of at least one of the right backlight 221 and the left backlight 222 is reduced more than that in the normal operation mode, and thus power consumption of the head mounted display 100 is reduced.

In a case where the operation mode is switched from the normal operation mode to the battery replacement mode by the power saving control unit 180, the display control unit 170 may reduce display regions of the right LCD 241 and the left LCD 242. The display control unit 170 controls the right LCD control unit 211 and the left LCD control unit 212 by using the control signals so as to reduce the display regions of the right LCD 241 and the left LCD 242 more than in the normal operation mode. The regions of the right LCD 241 and the left LCD 242 on which images are displayed are reduced, and thus power consumption of the head mounted display 100 is reduced. The display control unit 170 may reduce at least one of the display regions of the right LCD 241 and the left LCD 242 more than a display region in the normal operation mode.

In a case where the operation mode is switched to the battery replacement mode, the display control unit 170 may stop the right display driving unit 22 or the left display driving unit 24 from performing display. In other words, the display control unit 170 stops outputting of the control signal to the right display driving unit 22 or the left display driving unit 24 so as to stop the image light in the right display driving unit 22 or the left display driving unit 24 from generating image light. The display control unit 170 may control the right display driving unit 22 or the left display driving unit 24 by using the control signal so as to stop the image light in the right display driving unit 22 or the left display driving unit 24 from generating image light. The clock signal PCLK, the vertical synchronization signal VSync, the horizontal synchronization signal HSync, and the image data Data may stop being transmitted from the image processing unit 160 to the transmission unit 51 or 52, so as to stop the right display driving unit 22 or the left display driving unit 24 from generating image light.

The display control unit 170 may reduce power consumption of the image display section 20 by combining the reduction of the luminance of the backlights 221 and 222 and the display regions of the LCDs 241 and 242, and the stoppage of the display preformed by the display driving unit 22 or 24 with each other.

The power saving control unit 180 selects a mode number for designating a display mode of the image display section 20 depending on a residual capacity of the second battery 132, and notifies the display control unit 170 of the selected mode number.

For example, if a residual capacity of the second battery 132 is equal to or less than, for example, 80%, the power saving control unit 180 notifies the display control unit 170 of the mode number "1". The display control unit 170 which is notified of the mode number "1" controls the right backlight control unit 201 and the left backlight control unit 202 by using the control signals so as to reduce the luminance of the right backlight 221 and the left backlight 222 more than that in the normal operation mode.

For example, if a residual capacity of the second battery 132 is equal to or less than, for example, 60%, the power saving control unit 180 notifies the display control unit 170 of the mode number "2". The display control unit 170 which is notified of the mode number "2" controls the right LCD control unit 211 and the left LCD control unit 212 by using the control signals so as to reduce the display regions of the right LCD 241 and the left LCD 242 more than display regions in the normal operation mode.

For example, if a residual capacity of the second battery 132 is equal to or less than, for example, 40%, the power saving control unit 180 notifies the display control unit 170 of the mode number "3". The display control unit 170 which is notified of the mode number "3" stops outputting of the control signal to the right display driving unit 22 or the left display driving unit 24 so as to stop the right display driving unit 22 or the left display driving unit 24 from performing display.

Thus, one of the right display driving unit 22 and the left display driving unit 24 is stopped from displaying a display image. The other of the right display driving unit 22 and the left display driving unit 24 reduces the luminance of the backlight 221 (222) so as to reduce the display region of the LCD 241 (242).

The power saving control unit 180 has a function of detecting residual quantities of the first battery 131 and the second battery 132 in accordance with a function of the battery control unit 135.

The power saving control unit 180 changes the operation mode of the head mounted display 100.

In a case where a detection signal indicating that the lid 123 is opened is input from the opening/closing detection portion 124, the power saving control unit 180 causes the operation mode of the head mounted display 100 to transition from the normal operation mode to the battery replacement mode. In a case where a residual capacity of the first battery 131 detected by the first battery monitoring IC 133 decreases to a threshold value or less, the power saving control unit 180 causes the operation mode of the head mounted display 100 to transition from the normal operation mode to the battery replacement mode.

In a case where the detection signal indicating that the lid 123 is opened is input from the opening/closing detection portion 124, and thus the transition to the battery replacement mode occurs, the power saving control unit 180 notifies the display control unit 170 that the lid 123 is opened. The display control unit 170 displays predetermined messages on the image display section 20. These messages include a message for performing a notification of opening of the lid 123 and a message for making a request for waiting for the first battery 131 to be detached until preparation is completed.

In a case where it is detected that the residual capacity of the first battery 131 decreases to the threshold value or less, and thus the transition to the battery replacement mode occurs, the power saving control unit 180 notifies the display control unit 170 that the residual capacity of the first battery 131 decreases to the threshold value or less. The display control unit 170 displays predetermined messages on the image display section 20. These messages include a message for performing a notification indicating that the residual capacity of the first battery 131 decreases to the threshold value or less and a message for making a request for waiting for the first battery 131 to be detached until preparation is completed.

If the transition to the battery replacement mode occurs, the power saving control unit 180 stores system information in the storage unit 120. As described above, the system information is data for returning the head mounted display 100 to the normal operation mode before transition to the battery replacement mode.

If the system information is stored in the storage unit 120, the power saving control unit 180 outputs an instruction for switching a power source from the first battery 131 to the second battery 132, to the battery control unit 135. The battery control unit 135 changes a power supply battery from the first battery 131 to the second battery 132, in response to the instruction from the power saving control unit 180. If the battery is changed to the second battery 132, the power saving control unit 180 notifies the battery control unit 135 of an instruction for restricting power supply destinations to the control unit 140, the communication unit 117, and the right display driving unit 22 and the left display driving unit 24 of the image display section 20. The battery control unit 135 controls the power supply unit 137 in response to the instruction from the power saving control unit 180 so as to change supply destinations to which power is supplied by the power supply unit 137 to the control unit 140, the communication unit 117, and the right display driving unit 22 and the left display driving unit 24 of the image display section 20.

Since power is supplied to the communication unit 117 even after the transition to the battery replacement mode, the communication unit 117 maintains connection to a network which is being connected thereto even after the transition to the battery replacement mode occurs. When transition occurs from the battery replacement mode to the normal operation mode, the communication unit 117 maintains the connection to the network in the battery replacement mode so that communication is started without performing authentication of the user. For this reason, after the normal operation mode returns from the battery replacement mode, it is unnecessary to perform an operation such as re-inputting of authentication information such as a password in order to perform reconnection to the network. Therefore, it is possible to reduce time and effort of the user due to battery exchange.

In a case where the communication unit 117 is connected to the network, for example, via a wireless LAN, the power saving control unit 180 changes a communication mode of the communication unit 117 to a power save mode when transition to the battery replacement mode occurs, and thus power consumption of the communication unit 117 is reduced.

In a case where the communication unit 117 performs communication by using Bluetooth in the normal operation mode, the power saving control unit 180 may switch a communication mode of the communication unit 117 to communication using Bluetooth Low Energy when transition to the battery replacement mode occurs.

In a case where near field communication based on the standard such as RFID or Felica can be performed when transition to the battery replacement mode occurs, the power saving control unit 180 may switch communication of the communication unit 117 from the wireless LAN communication to the near field communication.

In a case where the power source is switched from the first battery 131 to the second battery 132, the power saving control unit 180 detects replacement of the first battery 131. In other words, the power saving control unit 180 detects that the first battery 131 is detached, and detects that the first battery 131 is attached again.

The power saving control unit 180 determines whether or not the first battery 131 is replaced on the basis of a terminal voltage of the first battery 131 detected by the first battery monitoring IC 133. If the first battery 131 is disconnected from the battery control unit 135, the terminal voltage of the first battery 131 measured by the first battery monitoring IC 133 enters a low level or high impedance. If the measured terminal voltage of the first battery 131 enters a low level or high impedance, the power saving control unit 180 determines that the first battery 131 is detached from the battery accommodation unit 122. This determination is performed by the power saving control unit 180 comparing a voltage value detected by the first battery monitoring IC 133 with a preset voltage reference value and determining a magnitude relationship therebetween.

If the new first battery 131 is accommodated in the battery accommodation unit 122, and the first battery 131 is connected to the battery control unit 135, a terminal voltage of the first battery 131 detected by the first battery monitoring IC 133 is a voltage within a predetermined range. If the terminal voltage of the first battery 131 detected by the first battery monitoring IC 133 is a voltage within a predetermined range, the power saving control unit 180 determines that the first battery 131 is replaced. Here, the power saving control unit 180 compares a voltage value detected by the first battery monitoring IC 133 with a preset voltage reference value and determines a magnitude relationship therebetween.

If the replacement with the first battery 131 is detected, the power saving control unit 180 determines whether or not the new first battery 131 is in an insufficient capacity state on the basis of a residual capacity of the first battery 131 calculated by the first battery monitoring IC 133. In a case where a battery with an insufficient capacity is not replaced but is connected to the battery control unit 135 again, the head mounted display 100 cannot be returned to the normal operation mode. For this reason, the power saving control unit 180 determines whether or not the new first battery 131 is in an insufficient capacity state.

The power saving control unit 180 compares a residual capacity of the first battery 131 with a threshold value so as to determine whether or not the first battery 131 is in an insufficient capacity state. If it is determined that the first battery 131 is in an insufficient capacity state, the power saving control unit 180 notifies the display control unit 170 of the fact that the first battery 131 is in an insufficient capacity state. The display control unit 170 displays a message for prompting the first battery 131 to be replaced on the image display section 20. The display control unit 170 may display a message based on a residual capacity of the new first battery 131, on the image display section 20. The power saving control unit 180 calculates time (driving possible time) for which the head mounted display 100 can be driven on the basis of the residual capacity of the new first battery 131. The power saving control unit 180 notifies the display control unit 170 of the calculated driving possible time which is then displayed on the image display section 20.

If it is determined that the first battery 131 is not in an insufficient capacity state, the power saving control unit 180 instructs the battery control unit 135 to change a power supply battery from the second battery 132 to the first battery 131. The battery control unit 135 changes the battery from the second battery 132 to the first battery 131 in response to the instruction from the power saving control unit 180. The power saving control unit 180 instructs the battery control unit 135 to supply power to each unit of the head mounted display 100. The battery control unit 135 controls the power supply unit 137 to supply power of the first battery 131 to each unit of the head mounted display 100 in response to the instruction from the power saving control unit 180. Consequently, the operation mode of the head mounted display 100 is changed from the battery replacement mode to the normal operation mode.

The power saving control unit 180 develops the system information stored in the storage unit 120 on a work memory such as the RAM so as to restore the system information. Thereafter, the control unit 140 performs a process based on the data developed on the RAM. Thus, the head mounted display 100 returns to a state before transition to the battery replacement mode.

If it is determined that the first battery 131 is not in an insufficient capacity state, the power saving control unit 180 instructs the battery control unit 135 to calculate a residual capacity of the second battery 132. The battery control unit 135 causes the second battery monitoring IC 134 to calculate a residual capacity of the second battery 132, and outputs information regarding the calculated residual capacity of the second battery 132 to the power saving control unit 180. The power saving control unit 180 determines whether or not the second battery 132 is in a full charge state on the basis of the input residual capacity of the second battery 132. If it is determined that the second battery 132 is not in a full charge state but in a chargeable state, the power saving control unit 180 instructs the battery control unit 135 to cause the first battery 131 to charge the second battery 132.

The sound processing unit 190 acquires a sound signal included in the content, amplifies the acquired sound signal, and supplies the amplified sound signal to a speaker (not illustrated) in the right earphone 32 connected to the connecting member 46 and a speaker (not illustrated) in the left earphone 34 connected to the connecting member. For example, when a Dolby (registered trademark) system is employed, the sound signal is processed and different sounds having, for example, changed frequencies are output from the right earphone 32 and the left earphone 34.

The image display section 20 includes an interface 25, the right display driving unit 22, the left display driving unit 24, the right light guide plate 261 as the right optical image display unit 26, the left light guide plate 262 as the left optical image display unit 28, the camera 61, a vibration sensor 65, and a nine-axis sensor 66.

The vibration sensor 65 is constituted by using an acceleration sensor, and is disposed inside the image display section 20 as illustrated in FIG. 1. In the example illustrated in FIG. 1, the vibration sensor 65 is disposed near the other end part ER of the right optical image display unit 26 in the right holding unit 21. In a case where the user performs an operation (knock operation) of knocking the other end part ER, the vibration sensor 65 detects vibration caused by the operation and outputs a detection result to the control unit 140. The control unit 140 detects the knock operation performed by the user on the basis of the detection result from the vibration sensor 65.

The nine-axis sensor 66 is a motion sensor which detects acceleration (in three axes), angular velocity (in three axes), and geomagnetism (in three axes). Since the nine-axis sensor 66 is provided in the image display section 20, the control unit 140 can detect a motion of the head of the user on the basis of a detection value from the nine-axis sensor 66 when the image display section 20 is mounted on the user's head. Since a direction of the image display section 20 can be identified on the basis of the detected motion of the user's head, the control unit 140 can estimate a visual line direction of the user.

The interface 25 includes a connector to which the right cord 42 and the left cord 44 are connected. The interface 25 outputs the clock signal PCLK, the vertical synchronization signal VSync, the horizontal synchronization signal HSync, and the image data Data transmitted from the transmission unit 51, to corresponding reception units (Rx) 53 and 54. The interface 25 outputs the control signal transmitted from the display control unit 170 to the corresponding reception units 53 and 54, and the right backlight control unit 201 or the left backlight control unit 202.

The interface 25 is an interface of the camera 61, the vibration sensor 65, and the nine-axis sensor 66. A detection result of vibration in the vibration sensor 65 or detection results of acceleration (in three axes), angular velocity (in three axes), and geomagnetism (in three axes) in the nine-axis sensor 66 are sent to the control unit 140 of the control device 10 via the interface 25.

The right display driving unit 22 includes the reception unit 53, the right backlight (BL) control unit 201, the right backlight (BL) 221, the right LCD control unit 211, the right LCD 241, and a right projection optical system 251. The right backlight control unit 201 and the right backlight 221 function as a light source. The right LCD control unit 211 and the right LCD 241 function as a display element. The right backlight control unit 201, the right LCD control unit 211, the right backlight 221, and the right LCD 241 are collectively referred to as an "image light generation unit".

The reception portion 53 functions as a receiver which performs serial transmission between the control device 10 and the image display section 20. The right backlight control unit 201 drives the right backlight 221 on the basis of an input control signal. The right backlight 221 is a light emitting body such as a light emitting diode (LED) or an electroluminescence element (EL). The right LCD control unit 211 drives the right LCD 241 on the basis of the clock signal PCLK, the vertical synchronization signal VSync, the horizontal synchronization signal HSync, and the right eye image data Data, which are input via the reception unit 53. The right LCD 241 is a transmissive liquid crystal panel in which a plurality of pixels are arranged in a matrix.

The right projection optical system 251 is constituted of a collimator lens which converts image light emitted from the right LCD 241 into parallel light beams. The right light guide plate 261 as the right optical image display unit 26 guides image light output from the right projection optical system 251 to the right eye RE of the user while reflecting the light along a predetermined light path.

The left display driving unit 24 has the same configuration as that of the right display driving unit 22. The left display driving unit 24 includes the reception unit 54, the left backlight (BL) control unit 202, the left backlight (EL) 222, the left LCD control unit 212, the left LCD 242 and a left projection optical system 252. The left backlight control unit 202 and the left backlight 222 function as a light source. The left LCD control unit 212 and the left LCD 242 function as a display element. The left projection optical system 252 is constituted of a collimator lens which converts image light emitted from the left LCD 242 into parallel light beams. The left light guide plate 262 as the left optical image display unit 28 guides image light output from the left projection optical system 252 to the left eye LE of the user while reflecting the light along a predetermined light path.

Figure 6:
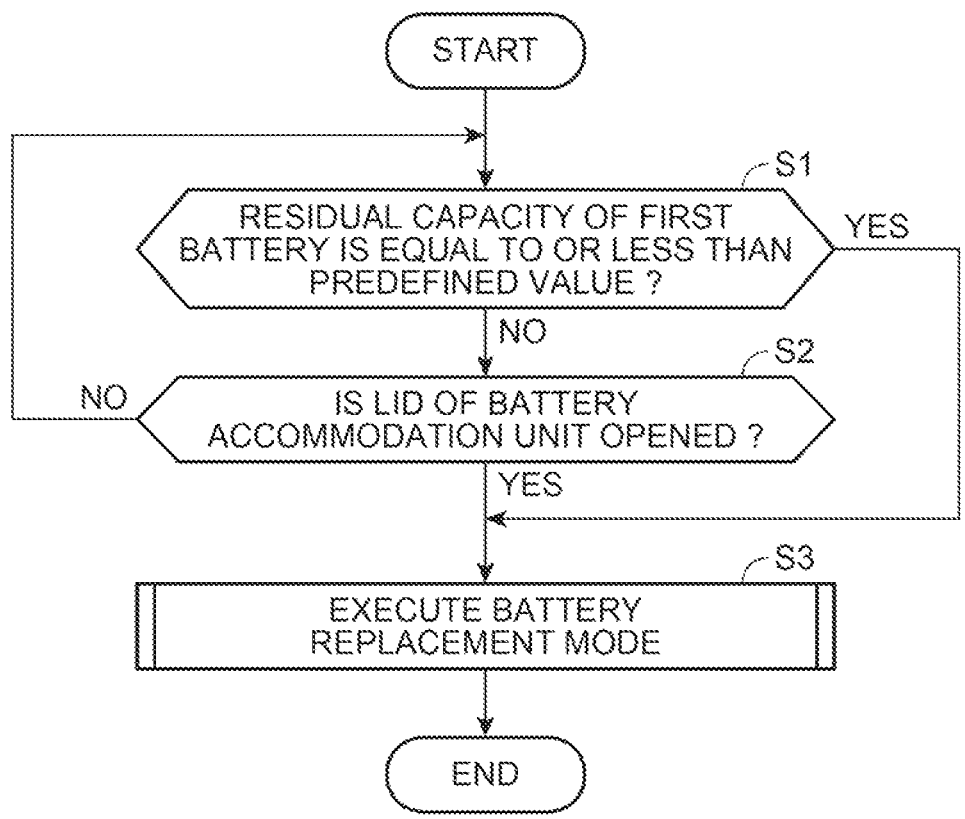
FIG. 6 is a flowchart illustrating processing procedures performed by a control unit.

FIG. 6 is a flowchart illustrating processing procedures performed by the control unit 140.

The power saving control unit 180 determines whether or not a residual capacity of the first battery 131 which is input from the battery control unit 135 is equal to or less than a predefined value (reference value) (step S1).

The reference value (predefined value) may be set to, for example, a value corresponding to a residual capacity of the first battery 131 obtained by adding a predetermined margin to a residual capacity of the first battery 131 which can supply the lowest operation voltage of the head mounted display 100. The reference value may be a value in which the control unit 140 stores in the storage unit 120 in advance, and, for example, the CPU may read the value from the storage unit 120 and may store the value in the RAM when power is supplied. In this case, the power saving control unit 180 may determine whether or not the operation mode is switched from the normal operation mode to the battery replacement mode by comparing a residual capacity of the first battery 131 with the reference value stored in the RAM. The residual capacity of the first battery 131 is calculated by the first battery monitoring IC 133 and is input to the power saving control unit 180 via the battery control unit 135. If the determination result in step S1 is affirmative (YES in step S1), the power saving control unit 180 executes the battery replacement mode (step S3).

If the determination result in step S1 is negative (NO in step S1), the power saving control unit 180 determines whether or not the lid 123 of the battery accommodation unit 122 is opened on the basis of a signal output from the opening/closing detection portion 124 (step S2). If the opening/closing detection portion 124 detects that the lid 123 is opened, a signal indicating that the lid 123 is opened is output to the control unit 140. If the signal is input from the opening/closing detection portion 124 and it is determined that the lid 123 is opened (YES in step S2), the power saving control unit 180 executes the battery replacement mode (step S3).

If the signal is not input from the opening/closing detection portion 124 and it is determined that the lid 123 is closed (NO in step S2), the power saving control unit 180 returns to the determination in step S1. The power saving control unit 180 waits for a measurement result of a residual capacity of the first battery 131 to be input from the battery control unit 135.

In the present embodiment, as indicated in step S2 of FIG. 6, a description is made of an operation in which the power saving control unit 180 detects a signal from the opening/closing detection portion 124 through flow control, but this is only for convenience of description, and the invention is not limited to the flow control. For example, in a case where the opening/closing detection portion 124 detects opening of the lid 123, an output signal (voltage value) may be input to the control unit 140 as an interruption signal. In this case, the control unit 140 (the power saving control unit 180) may perform interruption control on an input signal to the opening/closing detection portion 124, and may determine that a result in step S2 is affirmative even during execution of other processes.

Figure 7:
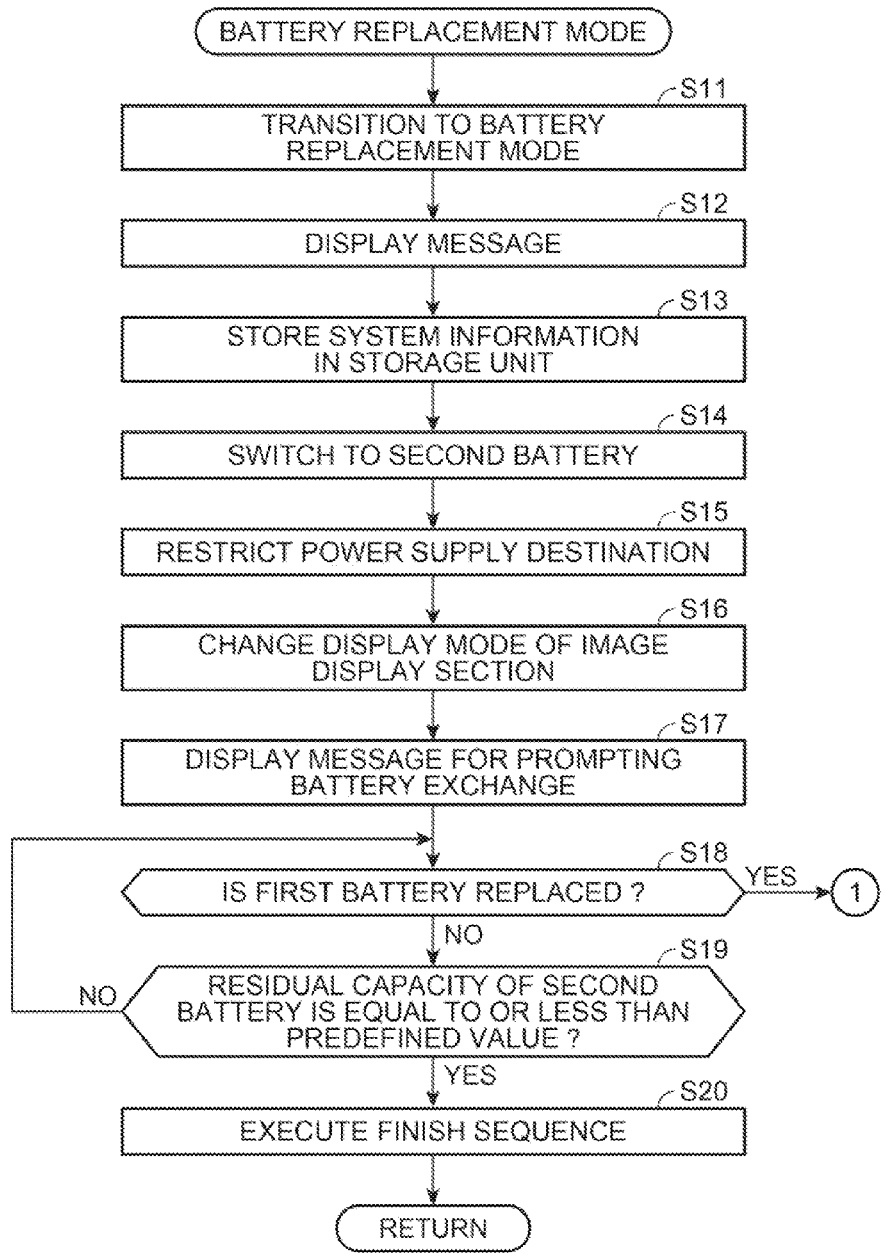
FIG. 7 is a flowchart illustrating specific procedures of a battery replacement mode according to a first embodiment.
Figure 8:
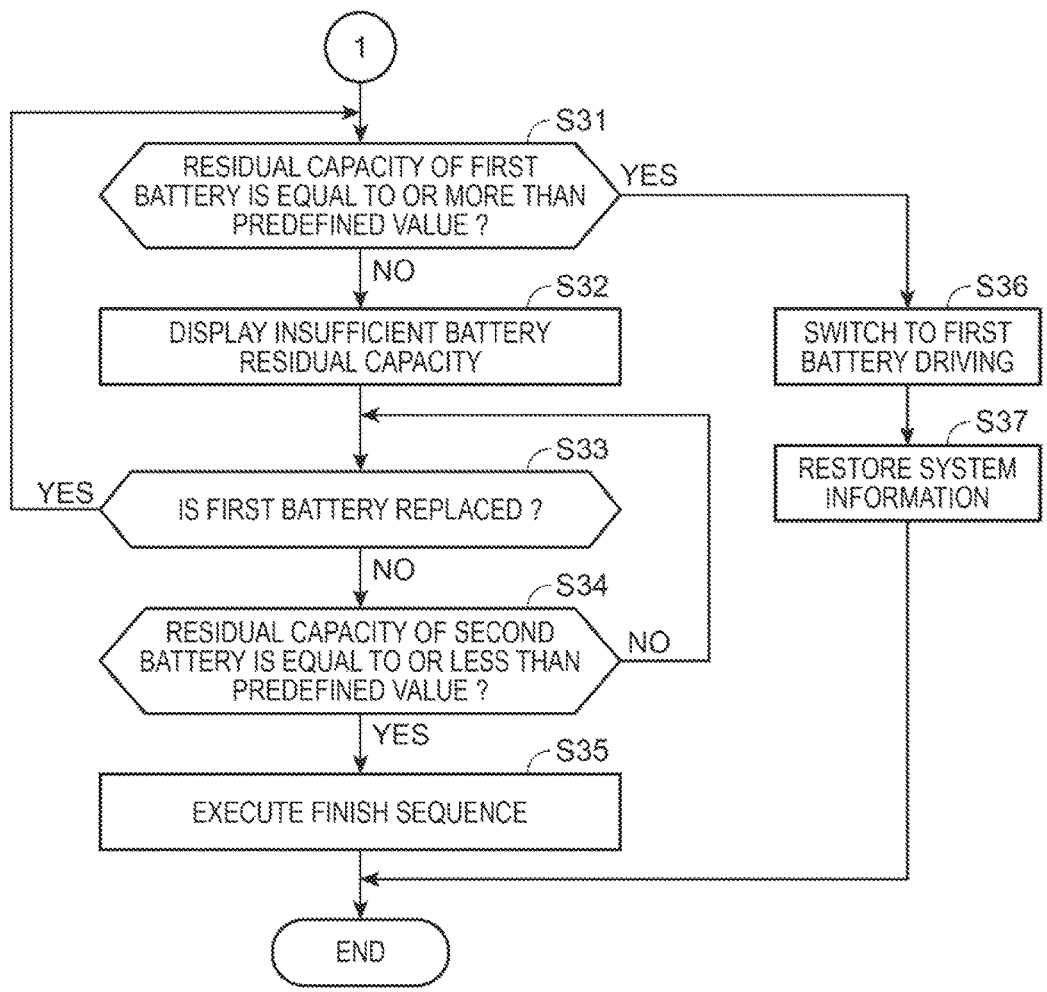
FIG. 8 is a flowchart illustrating specific procedures of the battery replacement mode according to the first embodiment.

FIGS. 7 and 8 are flowcharts illustrating specific procedures of the battery replacement mode.

If transition to the battery replacement mode occurs (step S11), the power saving control unit 180 notifies the display control unit 170 the fact that the transition to the battery replacement mode occurs. The notified display control unit 170 displays a predetermined message on the image display section 20 (step S12). This message is a message for performing a notification indicating that the lid 123 of the battery accommodation unit 122 is opened. The display control unit 170 may display not only the message but also other messages. For example, a message for giving an instruction for waiting for replacement of the first battery 131 until a state occurs in which the battery can be replaced may be displayed on the image display section 20.

Next, the power saving control unit 180 stores system information in the storage unit 120 (step S13). The system information includes, for example, data indicating a situation of processing display image data which is acquired from the external apparatuses OA and is displayed on the image display section 20, or data which is required to restart display of display image data on the image display section 20.

Next, the power saving control unit 180 outputs an instruction for changing a power supply battery, that is, a power source from the first battery 131 to the second battery 132, to the battery control unit 135. The battery control unit 135 switches the power supply battery, from the first battery 131 to the second battery 132 in response to the instruction from the power saving control unit 180 (step S14).

The power saving control unit 180 instructs the battery control unit 135 to restrict power supply destinations to the control unit 140, the communication unit 117, and the right display driving unit 22 and the left display driving unit 24 of the image display section 20. The battery control unit 135 controls the power supply unit 137 so as to restrict the supply of power to the control device 10, to the control unit 140, the communication unit 117, and the right display driving unit 22 and the left display driving unit 24 of the image display section 20 (step S15). Since power is supplied to the communication unit 117 even after the transition to the battery replacement mode, for example, in a case where the communication unit 117 is connected to a network, the communication unit 117 can maintain the connection to the network.

Next, the power saving control unit 180 instructs the display control unit 170 to change a display mode of the image display section 20 to a mode for reducing power consumption, and the display control unit 170 changes the display mode of the image display section 20 (step S16). For example, the display control unit 170 stops display of the right display driving unit 22 or the left display driving unit 24 in response to a control signal. The power saving control unit 180 may cause the battery control unit 135 to stop the supply of power to one of the right display driving unit 22 and the left display driving unit 24 so as to stop the display. Thus, only one of the right display driving unit 22 and the left display driving unit 24 performs display, and thus an amount of power consumption is reduced more than in a case where both of the units perform display. The display control unit 170 may set the luminance of the right backlight 221 and the left backlight 222 to luminance lower than that in the normal operation mode in response to a control signal. In a case where the operation mode is changed to the battery replacement mode, the display control unit 170 may reduce the display regions of the right LCD 241 and the left LCD 242 more than display regions in the normal operation mode by using a control signal.

In a case where transition to the battery replacement mode occurs, the power saving control unit 180 instructs the image processing unit 160 to reduce a frame rate of an image signal more than that in the normal operation mode. The image processing unit 160 instructed by the power saving control unit 180 converts the image signal, the vertical synchronization signal VSync, and the horizontal synchronization signal HSync so that the frame rate of the image signal is lower than a frame rate in the normal operation mode. The image signal whose frame rate is converted by the image processing unit 160 is stored in the DRAM of the storage unit 120 for each frame. The image processing unit 160 transmits the generated clock signal PCLK, vertical synchronization signal VSync, and horizontal synchronization signal HSync, and the image data Data stored in the DRAM of the storage unit 120 via the transmission units 51 and 52. Consequently, an image with a frame rate lower than that in the normal operation mode is displayed on the image display section 20.

In a case where transition to the battery replacement mode occurs, the power saving control unit 180 may instruct the image processing unit 160 to reduce a resolution of an image signal more than a resolution in the normal operation mode. The image processing unit 160 instructed by the power saving control unit 180 converts the image signal, the vertical synchronization signal VSync, and the horizontal synchronization signal HSync so that the resolution of the image signal is lower than a resolution in the normal operation mode. In this case, the image signal with the resolution lower than that in the normal operation mode is input to the right display driving unit 22 and the left display driving unit 24. The right display driving unit 22 and the left display driving unit 24 perform drawing in some regions conforming to the input resolution among regions in which drawing can be performed in the right LCD 241 and the left LCD 242. In this case, the number of pixels used for drawing performed by the right display driving unit 22 and the left display driving unit 24 is smaller than that in the normal operation mode. Pixels which are not used for the drawing performed by the right LCD 241 and the left LCD 242 may be fixed to, for example, black display. Therefore, it is possible to save power. In this case, the right backlight control unit 201 and the left backlight control unit 202 may reduce regions in which the right backlight 221 and the left backlight 222 emit light so as to match the regions drawn by the right display driving unit 22 and the left display driving unit 24.

The power saving control unit 180 may control the image processing unit 160 to perform a process of adjusting a grayscale value of image data of a displayed image, or may control the right display driving unit 22 and the left display driving unit 24 so that the luminance of an image displayed on the image display section 20 is lower than that in the normal operation mode. In this case, for example, the luminance may be adjusted within a range in which visibility of an image displayed on the image display section 20 can be ensured according to the intensity or an amount of external light detected by the camera 61 provided in the image display section 20. In this case, an illuminance sensor (not illustrated) may be provided in the image display section 20, and a detection value from the illuminance sensor may be used. Adjustment to a preset luminance may be performed. In a case where the luminance in the image display section 20 is reduced, a color tone of a displayed image may be changed so that visibility is improved even at the low luminance. For example, processes may be performed, such as a process of increasing contrast of a displayed image in a case where an intensity (amount) of external light is great, a process of performing a sharpness process or an edge process, and a process of shifting a frequency spectrum of an image to a long wavelength side.

As mentioned above, the frame rate, the display luminance, the resolution, the color tone, and the like are made to be put in states which are different from those in the normal operation mode, and thus there is an effect in which power consumption can be minimized even in a case where both of the right display driving unit 22 and the left display driving unit 24 are operated.

The display control unit 170 may change a display mode of the image display section 20 on the basis of a mode number of which a notification is sent from the power saving control unit 180. The power saving control unit 180 selects a mode number for designating a display mode of the image display section 20 according to a residual capacity of the second battery 132, and notifies the display control unit 170 of the selected mode number.

If the display control unit 170 is notified of the mode number "1" indicating that a residual capacity of the second battery 132 decreases to 80% or less by the power saving control unit 180, the luminance of the right backlight 221 and the left backlight 222 is reduced more than that in the normal operation mode. If the display control unit 170 is notified of the mode number "2" indicating that a residual capacity of the second battery 132 decreases to 60% or less by the power saving control unit 180, the display regions of the right LCD 241 and the left LCD 242 are reduced more than those in the normal operation mode. If the display control unit 170 is notified of the mode number "3" indicating that a residual capacity of the second battery 132 decreases to 40% or less by the power saving control unit 180, the right display driving unit 22 or the left display driving unit 24 is stopped from performing display.

As mentioned above, the power saving control unit 180 reduces an amount of power consumption of power supply destinations other than the communication unit 117, for example, the right display driving unit 22 and the left display driving unit 24, so as to reduce an amount of power consumption of the head mounted display 100. Therefore, the supply of power to the communication unit 117 can be maintained in a state in which capacities of the first battery 131 and the second battery 132 decrease, and thus the communication unit 117 can be maintained in a communicable state for a long period of time. Therefore, it is possible to prevent disruption, disconnection, and interruption caused by stoppage of the communication unit 117. If communication is stopped, the communication unit 117 is activated after a power source capacity is recovered through replacement of the first battery 131 or the second battery 132, and then a sequence for establishing communication with an apparatus of a communication partner is required to be executed. In this case, since transmission and reception of data for establishing communication based on a predetermined communication protocol with the apparatus of the communication partner, selection of the apparatus of the communication partner, authentication using a user ID or a password, and the like are required, time is taken. Since such a sequence is not required to be executed, it is possible to reduce downtime of work using the head mounted display 100 and to perform the work efficiently.

After transition to the battery replacement mode occurs, the power saving control unit 180 may perform control for reducing power consumption of the communication unit 117.

Figure 13:
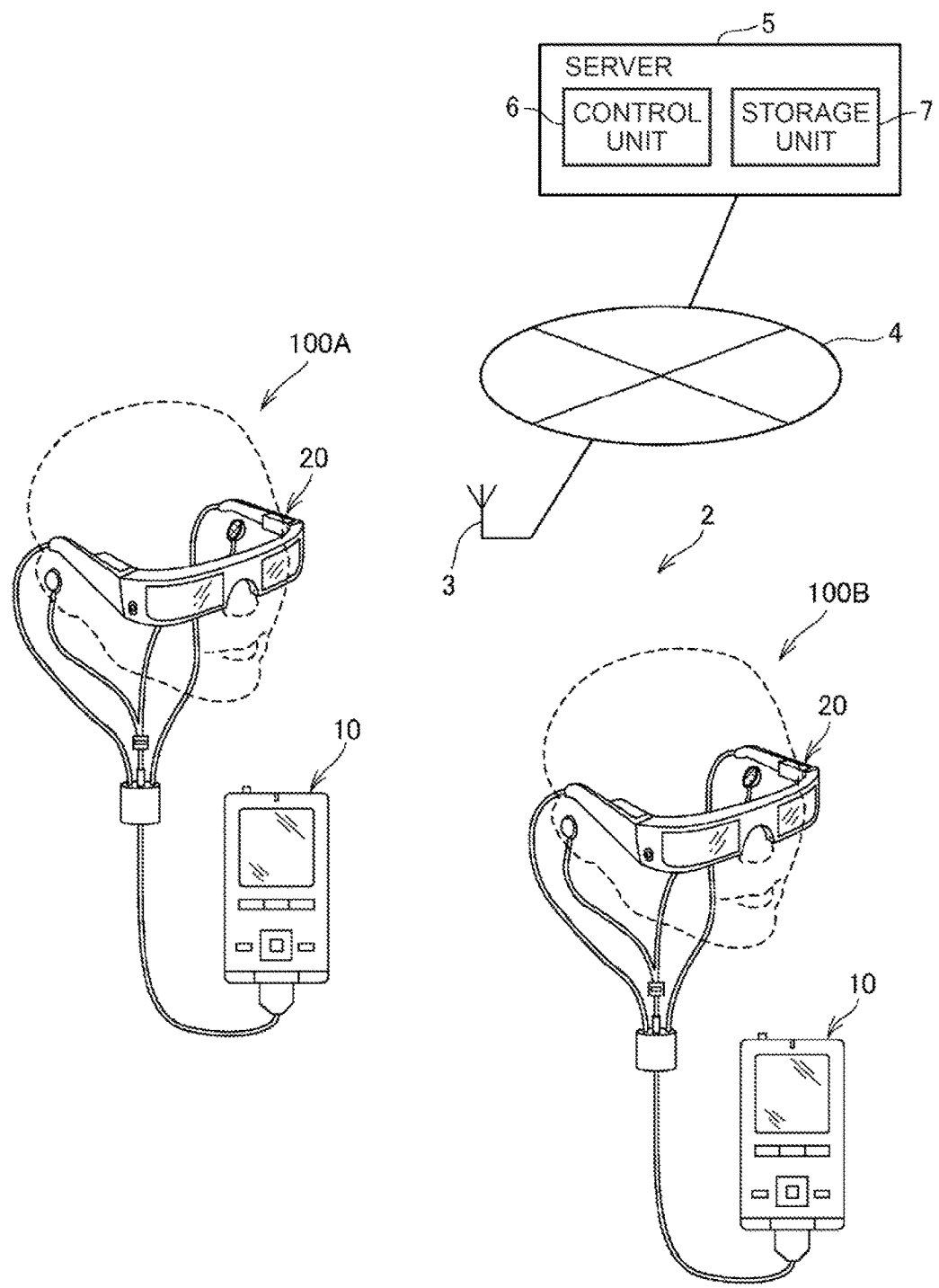
FIG. 13 is a schematic configuration diagram illustrating a configuration of a communication system according to a third embodiment.

In other words, while power is being supplied to the communication unit 117 after transition to the battery replacement mode occurs, the control unit 140 may perform control for minimizing an amount of power consumption of the communication unit 117 on the communication unit 117. For example, the control unit 140 may cause polling between an apparatus of a connection destination to which the communication unit 117 is connected and the communication unit 117, or a scan operation of searching for an apparatus to which the communication unit 117 can be connected to be performed intermittently. A frequency of the polling or the scan operation may be reduced more than that in the normal operation mode. The control unit 140 may transmit data indicating that the battery replacement mode is being executed to other communicable apparatuses so as to perform a notification thereof. For example, as will be described later, a notification may be sent to another head mounted display 100 or a server 5 (FIG. 13). In this case, a battery residual quantity or transition to the battery replacement mode in the head mounted display 100 may be managed by another apparatus.

In a case where the communication unit 117 is connected to the network, for example, via a wireless LAN, the power saving control unit 180 may change a communication mode of the communication unit 117 to a power save mode when transition to the battery replacement mode occurs, and thus power consumption of the communication unit 117 may be reduced.

In a case where the communication unit 117 performs communication by using Bluetooth in the normal operation mode, the power saving control unit 180 may switch a communication mode of the communication unit 117 to communication using Bluetooth Low Energy or Bluetooth Smart when transition to the battery replacement mode occurs. A communication output may be reduced without switching a communication method, and, for example, a class of an electric wave intensity may be changed during communication using Bluetooth.

As another example in which the communication unit 117 is maintained in a communicable state, the power saving control unit 180 may temporarily stop communication in the communication unit 117 when the first battery 131 or the second battery 132 is replaced. In this case, if an operation of receiving content data from the external apparatuses OA is temporarily stopped, the power saving control unit 180 may stop outputting of content display performed by the display control unit 170. During the temporary stoppage, a minimum of communication establishment is preferably maintained with an apparatus of a communication partner (for example, the external apparatuses OA) so as to resume communication from a state before the stoppage after the first battery 131 or the second battery 132 is replaced. In other words the temporary stoppage is preferably a state in which data communication of content data is not performed, and control data for maintaining connection is transmitted and received intermittently. In a case where communication is completely stopped, data obtained when authentication or communication setting is performed in the communication before being stopped is preserved, and communication is preferably rapidly re-established on the basis of the preserved data.

Next, the power saving control unit 180 instructs the display control unit 170 to display a message for prompting battery exchange on the image display section 20. In a case where one of the right display driving unit 22 and the left display driving unit 24 is stopped from performing display, the display control unit 170 causes the display driving unit 22 (24) in which display of an image is not stopped, to display the message for prompting battery exchange (step S17).

Next, the power saving control unit 180 determines whether or not the first battery 131 is replaced (step S18). The power saving control unit 180 determines whether or not the first battery 131 is replaced on the basis of a terminal voltage of the first battery 131 which is measured by the first battery monitoring IC 133 and is input from the battery control unit 135 (step S18). If it is determined that the first battery 131 is not replaced (NO in step S18), the power saving control unit 180 determines whether or not a residual capacity of the second battery 132 is equal to or less than a predefined value (step S19). The residual capacity of the second battery 132 is calculated by the second battery monitoring IC 134, and is input to the control unit 140 via the battery control unit 135. The power saving control unit 180 compares the residual capacity of the second battery 132 input from the battery control unit 135 with the preset predefined value so as to determine whether or not the residual capacity of the second battery 132 is equal to or less than the predefined value (step S19). If the residual capacity of the second battery 132 is not equal to or less than the predefined value (NO in step S19), the power saving control unit 180 returns to the determination in step S18. If the residual capacity of the second battery 132 is equal to or less than the predefined value (YES in step S19), the power saving control unit 180 executes a finish sequence (step S20). If the finish sequence is started, the power saving control unit 180 stores a log regarding an operation state of the control device 10, such as a battery residual quantity and the date and time, in the storage unit 120, and shuts down the OS 150.

If it is determined that the first battery 131 is replaced (YES in step S18), the power saving control unit 180 receives a residual capacity of the new first battery 131 from the battery control unit 135. The residual capacity of the first battery 131 is calculated by the first battery monitoring IC 133. The power saving control unit 180 compares the received residual capacity of the first battery 131 with a predefined value which is set in advance, and determines whether or not the residual capacity of the first battery 131 is equal to or more than the predefined value (step S31 of FIG. 8). If it is determined that the residual capacity of the first battery 131 is equal to or more than the predefined value (YES in step S31), the power saving control unit 180 instructs the battery control unit 135 to switch a power supply battery from the second battery 132 to the first battery 131. The battery control unit 135 changes the power supply battery, that is, a power source from the second battery 132 to the first battery 131 in response to the instruction from the power saving control unit 180 (step S36).

The power saving control unit 180 develops the system information stored in the storage unit 120 in step S13 on a work memory such as the RAM so as to restore the system information (step S37). Thereafter, the control unit 140 performs a process based on the data developed on the RAM. Thus, the head mounted display 100 returns to a state before transition to the battery replacement mode.

If it is determined that the residual capacity of the first battery 131 is less than the predefined value (NO in step S31), the power saving control unit 180 controls the display control unit 170 to display a message on the image display section 20 (step S32). The message is a message indicating that the residual capacity of the first battery 131 is deficient. Here, in a case where one of the right display driving unit 22 and the left display driving unit 24 is stopped from performing display, the display control unit 170 causes the other unit to display the message.

Next, the power saving control unit 180 determines whether or not the first battery 131 is replaced (step S33). Here, in the same manner as in step S18, the power saving control unit 180 determines whether or not the first battery 131 is replaced on the basis of a terminal voltage of the first battery 131 which is input from the battery control unit 135. If it is determined that the first battery 131 is replaced (YES in step S33), the power saving control unit 180 returns to step S31 and determines whether or not a residual capacity of the first battery 131 is equal to or more than the predefined value (step S31).

If it is determined that the first battery 131 is not replaced (NO in step S33), the power saving control unit 180 determines whether or not a residual capacity of the second battery 132 is equal to or less than a predefined value (step S34). Here, the power saving control unit 180 compares the residual capacity of the second battery 132 input from the battery control unit 135 with the preset predefined value so as to determine whether or not the residual capacity of the second battery 132 is equal to or less than the predefined value. If the residual capacity of the second battery 132 is not equal to or less than the predefined value (NO in step S34), the power saving control unit 180 returns to the determination in step S33. If the residual capacity of the second battery 132 is equal to or less than the predefined value (YES in step S34), the power saving control unit 180 executes a finish sequence (step S35). If the finish sequence is started, the power saving control unit 180 stores a log regarding an operation state of the control device 10, such as a battery residual quantity and the date and time, in the storage unit 120, and shuts down the OS 150.

As a countermeasure for a case where the residual capacity of the first battery 131 is more than the predefined value in step S1, or the lid 123 is wrongly opened, the flow may proceeds to step S31 when the lid 123 is closed. In this case, the power saving control unit 180 may determine the residual capacity of the first battery 131.

The power saving control unit 180 may determine residual capacities of the first battery 131 and the second battery 132 in stages, and may determine the type of control performed in the battery replacement mode. For example, in a case where a battery residual quantity (details thereof will be described later) is equal to or higher than 15% and is equal to or lower than 100%, the normal operation mode is executed. In a case where the battery residual quantity is equal to or higher than 5% and is lower than 15%, a process related to at least one of a frame rate, a resolution, and display luminance is performed. In a case where the battery residual quantity is higher than 0% and is lower than 5%, control for switching to display is performed. If the battery residual quantity is 0%, a shutdown sequence may be performed. In a case where power is supplied to the head mounted display 100 from both of the first battery 131 and the second battery 132, the power saving control unit 180 may detect a sum of capacities of the first battery 131 and the second battery 132 as a battery residual quantity. In a case where the first battery 131 is used as a main battery, and the second battery 132 is used as a subsidiary battery, the power saving control unit 180 may set a residual capacity of the first battery 131 as a battery residual quantity of the head mounted display 100.

In the description of FIGS. 6 to 8, the description will be made of a case where the first battery 131 is used as a main battery, the second battery 132 is used as a subsidiary battery, and the first battery 131 mainly supplies power to each unit of the head mounted display 100. The invention is not limited thereto, and power may be supplied to each unit of the head mounted display 100 by using both of the first battery 131 and the second battery 132 as power sources in the normal operation mode without differentiating the first battery 131 and the second battery 132 from each other. In this case, in step S1 of FIG. 6, an affirmative result is determined if a sum of capacities of the first battery 131 and the second battery 132 is equal to or less than a predefined value (reference value), and the flow proceeds to step S3.

In a case where the residual quantities of the first battery 131 and the second battery 132 are small, the power saving control unit 180 may guide replacement of the first battery 131 and/or the second battery 132 by using display on the image display section 20 and lighting states of the LED display portions 136 and 138. Specifically, the power saving control unit 180 may perform a notification operation depending on residual quantities of the first battery 131 and the second battery 132. A specific example of the notification operation will be described later with reference to FIGS. 9 and 10. In this notification operation, battery exchange is prompted so as to correspond to a decrease in a capacity of one of the first battery 131 and the second battery 132 or decreases in capacities of both of the first battery 131 and the second battery 132.

As conditions for performing the notification operation of prompting battery exchange, the power saving control unit 180 uses two values such as a preset warning value and a threshold value. The warning value is a value of a battery residual quantity which is used as a reference for warning a decrease in a residual quantity and sending a notification thereof, and the threshold value is a value of a battery residual quantity which is used as a reference for starting a shutdown sequence. The warning value and the threshold value may be values which are compared with a sum of residual quantities of the first battery 131 and the second battery 132, and may be values for defining respective residual quantities of the first battery 131 and the second battery 132. The warning value and the threshold value are stored in the storage unit 120 as set data 121.

In the notification operation, the power saving control unit 180 reads the content data (not illustrated) stored in the storage unit 120, and controls the image processing unit 160 and the display control unit 170 to display an AR display image on the image display section 20. In a case where the content data includes audio data, the power saving control unit 180 controls the sound processing unit 190 to output sound of the content from the right earphone 32 and the left earphone 34.

AR content displayed by the power saving control unit 180 is text or an image for prompting battery exchange by performing a notification of a decrease in a battery residual quantity. The power saving control unit 180 displays the AR content in a state in which the user sees a target object through the image display section 20. The power saving control unit 180 performs AR display for displaying an image or text at a position corresponding to the target object so as to provide information regarding the target object, or so as to change the way of viewing a shape of the target object which is seen through the image display section 20. The AR content includes data regarding an image or text displayed at the position corresponding to the target object. The AR content may include data for specifying a target object, data regarding a display position of an image or text, and the like. The display position of the AR content may be a position where the AR content overlaps the target object, and may be the vicinity of the target object. The target object may be an object, and, in the present embodiment, includes the first battery 131 and the second battery 132 which are replacement targets. A method of the power saving control unit 180 detecting a target object is arbitrary, but, in the present embodiment, the power saving control unit 180 detects a target object located in a visual field of the user from image data captured by the camera 61. The power saving control unit 180 determines a display position of AR content corresponding to the detected target object, and displays the AR content at the position.

The AR content is preferably displayed so as to overlap a position where the user visually recognizes a target object, or so as to match the position where the user visually recognize the target object. For this reason, power saving control unit 180 detects an image of the target object from the image data captured by the camera 61, and specifies a position of the target object in an imaging region of the camera 61 on the basis of a positional relationship between the detected image of the target object and the entire captured image. The power saving control unit 180 determines a display position of the AR content corresponding to the position of the target object on the basis of a positional relationship between the imaging region of the camera 61 and a display region of the image display section 20.

Here, the power source section 300 (FIG. 4) has a configuration in which power is supplied from a battery having a larger residual quantity of the first battery 131 and the second battery 132. Thus, power of the first battery 131 and power of the second battery 132 are substantially uniformly consumed, and thus a state is unlikely to occur in which a residual quantity one of the first battery 131 and the second battery 132 is small, and a residual quantity of the other battery is large.

Therefore, in the following description, as an example, a description will be made of a case where residual quantities of both of the first battery 131 and the second battery 132 are reduced. The head mounted display 100 can separately detect a residual quantity of the first battery 131 and a residual quantity of the second battery 132 by using the battery control unit 135, and thus the above-described guide may be performed in a case where the residual quantity of one of the first battery 131 and the second battery 132 may be reduced.

Figure 10A:
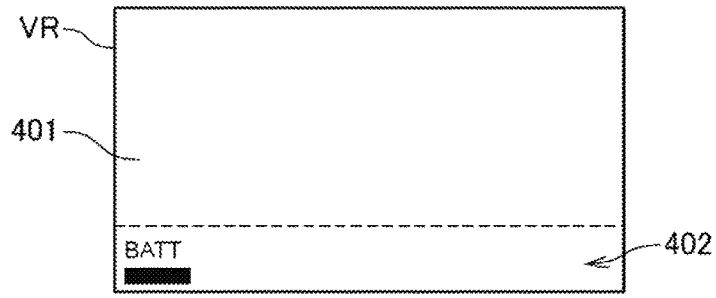
FIGS. 10A to 10D are diagrams illustrating a display example related to replacement of a battery.
Figure 10B:
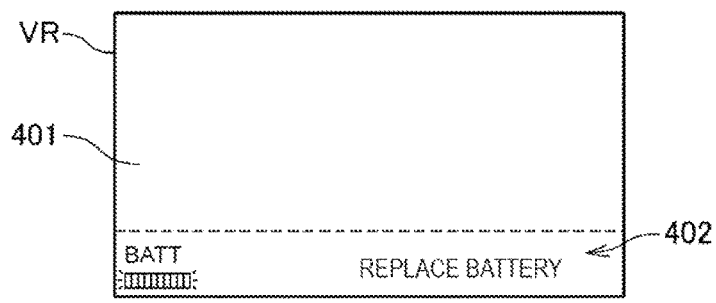
Figure 10C:
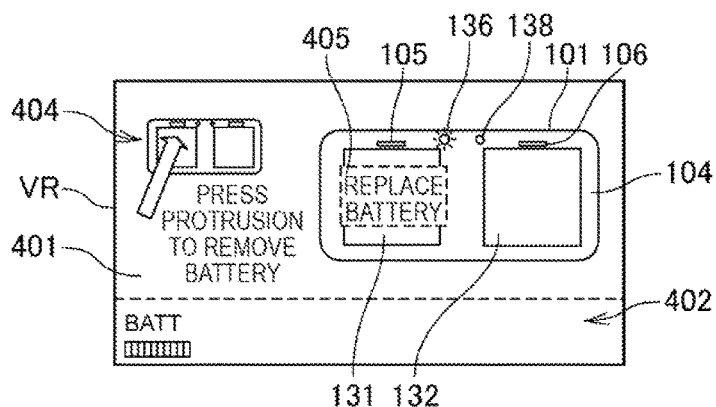
Figure 10D:
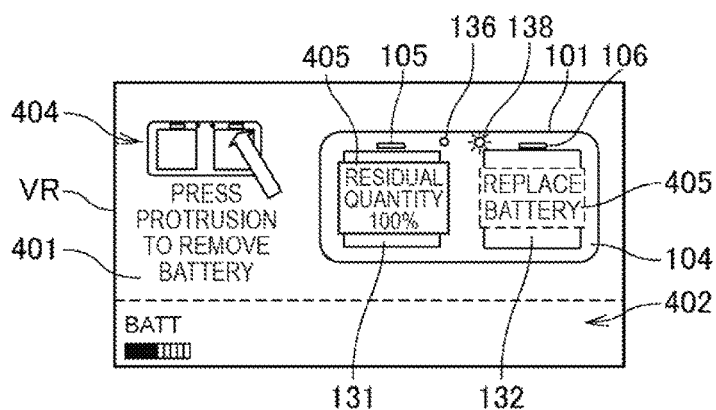

FIGS. 9 to 10D illustrate display of residual quantities of the first battery 131 and the second battery 132, and display examples of guide of replacement thereof.

FIG. 9 is a diagram illustrating examples of state transition of the head mounted display 100, and illustrates changes in residual quantities of the first battery 131 and the second battery 132 and changes in states and operations of the head mounted display 100 in correlation with each other. FIGS. 10A to 10D are diagrams display examples of the image display section 20 and illustrate a visual field VR of the user.

In FIG. 9, an operation performed by the user of the head mounted display 100 is referred to as a "user's operation", and a display aspect of a battery residual quantity on the image display section 20 is referred to as "battery residual quantity display". The image display section 20 functions as a residual quantity display unit in the operation of displaying a battery residual quantity. A residual capacity of the first battery 131 is referred to as a "battery (1) residual quantity", and a residual capacity of the second battery 132 is referred to as a "battery (2) residual quantity". A turned-on state of the LED display portion 136 is referred to as "LED (1)", a turned-on state of the LED display portion 138 is referred to as "LED (2)", an operation of the head mounted display 100 is referred to as an "operation of the system side", and AR display on the image display section 20 is referred to as "AR display".

FIG. 9 illustrates an example of state transition with a state (state 1) in which residual quantities of the first battery 131 and the second battery 132 are 100% as a start state. In this example, a procedure in which the residual quantities of the first battery 131 and the second battery 132 are reduced is shown, and the progress up to a state (state 9) in which the first battery 131 and the second battery 132 are replaced is also shown. A vertical direction of FIG. 9 corresponds to the passage of time (changes in the states).

The state 1 is a state in which the first battery 131 and the second battery 132 are substantially fully charged, and residual quantities thereof are 100%. In the state 1, the head mounted display 100 performs a normal operation such as displaying an image so as to correspond to an operation in the control device 10.

As illustrated in FIG. 10A, an information display portion 402 is provided in a display region 401 which is disposed in the visual field VR of the user. The information display portion 402 is a region in which a mark, an icon, a text message, or the like of a battery residual quantity is displayed, and is disposed on a lower part of the display region 401 so as not to impede visibility of the visual field VR. A battery mark indicating residual quantities of the first battery 131 and the second battery 132 is disposed at a left end of the information display portion 402. The battery mark is a display portion indicating a battery residual quantity in stages (for example, ten stages), and, in the state 1, indicates the level 10 (in which all indicators are displayed in colors) corresponding to the residual quantity 100% as illustrated in FIG. 10A.

A single mark indicating a sum of residual quantities of the first battery 131 and the second battery 132 may be disposed in the information display portion 402. A battery mark indicating a residual quantity of the first battery 131 and a battery mark indicating a residual quantity of the second battery 132 may be disposed in the information display portion 402.

The battery mark indicates the entire battery residual quantity of the head mounted display 100, and indicates a sum total of residual quantities of the first battery 131 and the second battery 132. In the present embodiment, a capacity of the first battery 131 is assumed to be substantially the same as a capacity of the second battery 132.

In states 2 and 3, the display of the battery mark in the information display portion 402 changes due to a decrease in the residual quantities of the first battery 131 and the second battery 132, but the head mounted display 100 performs a normal operation. The battery mark is displayed as a result of the power saving control unit 180 controlling the image processing unit 160, and the power saving control unit 180 controls a change in the display of the battery mark.

In a state 4, both of the residual quantities of the first battery 131 and the second battery 132 become 20%, and thus the power saving control unit 180 performs the notification operation. The power saving control unit 180 displays the battery mark in the information display portion 402 in the level 1. The power saving control unit 180 also causes the battery mark in the information display portion 402 to blink.

If the battery residual quantity further decreases, transition to a state 5 occurs. Also in the state 5, normal work can be performed.

In the state 5, each of the residual quantities of the first battery 131 and the second battery 132 becomes 10%, and the power saving control unit 180 performs the notification operation. In this notification operation, the battery mark in the information display portion 402 is set to the level 0. The blinking display of the battery mark is continuously performed, and guidance for prompting battery exchange is displayed in the information display portion 402. The LED display portion 136 enters a red blinking state, and the LED display portion 138 enters a red lighting state.

In the state 5, since both of the residual quantities of the first battery 131 and the second battery 132 are 10%, either of the batteries is preferably replaced. However, if the first battery 131 and the second battery 132 are detached together, there is a concern that an operation of the head mounted display 100 may be disrupted. For this reason, in a case where battery exchange is guided, the power saving control unit 180 guides replacement of the other battery by excluding one or more batteries of the first battery 131 and the second battery 132. For example, in the first battery 131 and the second battery 132, it is shown that replacement of one battery is guided, and replacement of the other battery is not guided, or the urgency the battery of which replacement is guided is high. In the state 5, since the power saving control unit 180 causes the LED display portion 136 to blink in red, if the user opens the battery cover 102 (FIG. 4A), it is possible to give guidance on the first battery 131 being more preferentially replaced than the second battery 132.

FIG. 10B illustrates a display example in the state 5. In the information display portion 402, the battery mark blinks, and a text message for prompting battery exchange is displayed.

In the state 5, if the user operates the control device 10 so as to give an instruction for transition to the battery replacement mode for performing battery exchange, the head mounted display 100 transitions to a state 6.

In the state 6, as illustrated in FIG. 10C, animation for explaining an operation of replacing the first battery 131 is displayed in the display region 401. A procedure from the detachment of the first battery 131 to the attachment of the new first battery 131 can be explained through a change in the display of the animation, and thus it is possible to guide the operation in an easily understandable manner.

If it is detected that the user detaches the information display portion 402 and views the rear surface of the control device main body 101, the power saving control unit 180 performs AR display. In this AR display, the power saving control unit 180 displays a message so that the message overlaps the first battery 131 and the second battery 132 viewed in the visual field VR.

In FIG. 10C, the battery accommodation unit 104 can be visually recognized in the visual field VR, and thus a blinking state of the LED display portion 136 is visually recognized. The power saving control unit 180 disposes an AR display portion 405 so that the AR display portion 405 overlaps the first battery 131 on the basis of correlation between a position of the display region 401 and a position where the battery accommodation unit 104 is visually recognized. The AR display portion 405 is a region where text or an image is AR displayed, and a text message for guiding exchange is displayed in FIG. 10C.

Here, if the first battery 131 is replaced by the user, the head mounted display 100 transitions to a state 7. In the state 7, since a residual quantity of the first battery 131 is recovered, the residual quantity display of the battery mark and the display of the LED display portion 136 change. Particularly, the LED display portion 136 indicates that a residual quantity of the new first battery 131 is normal, and is thus turned on in green.

In the state 7, as the notification operation of prompting replacement of the second battery 132, the power saving control unit 180 causes the LED display portion 138 to enter a red blinking state and displays animation for explaining an operation of replacing the second battery 132 as illustrated in FIG. 10D.

A message for prompting replacement of the second battery 132 is AR displayed so as to overlap the battery accommodation unit 104 which is visually recognized in the visual field VR. A message indicating that replacement of the first battery 131 has been completed may be displayed.

Then, if the second battery 132 is replaced, the head mounted display 100 transitions to a state 8, and the power saving control unit 180 turns on the LED display portion 136 and the LED display portion 138 in green. The power saving control unit 180 AR displays a message indicating that replacement of the first battery 131 and the second battery 132 has been completed. Here, the power saving control unit 180 finishes the battery replacement mode and returns to a normal operation, and the head mounted display 100 transitions to a state 10.

In a case where the power source section 300 consumes power of the first battery 131 and the second battery 132 nonuniformly, the power saving control unit 180 may perform the operations described in the states 5 to 7 when a residual quantity of one of the batteries decreases.

As mentioned above, the power saving control unit 180 may display guidance on the image display section 20 so as to correspond to a decrease in a residual quantity of one of the first battery 131 and the second battery 132 or decreases in residual quantities of both of the batteries. The guidance display may include a text message or an image, and may be performed as AR display so as to overlap external scenery which is visually recognized through the right optical image display unit 26 and the left optical image display unit 28. The power saving control unit 180 displays a message based on AR display in synchronization with lighting or blinking of the LED display portions 136 and 138, so as to perform a more effective notification.

According to the information displayed in the states 5 to 8, the control unit 140 can guide replacement procedures without detaching both of the first battery 131 and the second battery 132, for example. In this case, even if all of a plurality of batteries (the first battery 131 and the second battery 132) provided in the head mounted display 100 are required to be replaced, the user can perform the replacement without turning off the power source of the head mounted display 100, that is, without stopping the head mounted display 100. Consequently, even if the user is not familiar with the replacement procedures of the batteries, the head mounted display 100 is not stopped.

Display for guiding the replacement procedures and an order of battery replacement of the first battery 131 and the second battery 132 is performed so as to correspond to respective capacities of the first battery 131 and the second battery 132, and thus the replacement can be completed without stopping the head mounted display 100 even in a case where the time for the user to replace the batteries is lengthened.

As a display aspect of displaying a residual quantity on the image display section 20, a residual quantity of at least one of the first battery 131 and the second battery 132 may be displayed, and display based on an average of residual quantities of the first battery 131 and the second battery 132 may be performed.

The information displayed in the above-described states 5 to 7 may be guidance information for guiding necessity for replacement or replacement procedures of the first battery 131 and the second battery 132, a replacement procedure method, time for which each of the first battery 131 and the second battery 132 can be continuously used, or the like. For example, the information may be internal information including state information such as residual quantities (a residual quantity) of the first battery 131 and/or the second battery 132.

A menu image for selecting display may be displayed prior to display of such guidance information and internal information, and, in a case where an item included in the menu image is selected through an operation on the operation unit 111, the selected information may be displayed.

In the state 5, before selecting the replacement mode is selected, residual time for which the head mounted display 100 can be operated may be displayed for each of the first battery 131 and the second battery 132 or for both of the batteries. The residual operable time (usable time) may be continuously displayed until replacement of the first battery 131 and the second battery 132 is completed, that is, the state 9 occurs and the replacement mode is completed.

As mentioned above, in a case where a residual quantity of one of the batteries becomes a residual quantity requiring replacement, the power saving control unit 180 maintains a display state of the head mounted display 100, and the guidance information regarding the head mounted display 100 is displayed so as to overlap at least a part of the control device 10 which is visually recognized as external scenery while maintaining a power source of the head mounted display 100. For this reason, the user can easily understand that the battery is required to be replaced through the display on the image display section 20. Therefore, it is possible to rapidly provide information regarding battery exchange to the user.

The guidance information may be, for example, state information such as a residual quantity of at least some of the first battery 131 and the second battery 132. The guidance information may be guidance display for guiding necessity for replacement or replacement procedures of the first battery 131 and the second battery 132, a replacement operation method, time for which each of the first battery 131 and the second battery 132 can be continuously used, or the like, but may be other information. A configuration is employed in which a display state of the head mounted display 100 is maintained during replacement of the first battery 131 and/or the second battery 132, but other configurations are also employed.

As described above, the head mounted display 100 of the first embodiment to which the invention is applied includes the image display section 20, the first battery 131, the second battery 132, the communication unit 117, and the control unit 140. The image display section 20 enables the user to visually recognize an image and transmits external scenery therethrough. The control unit 140 switches a power source between the first battery 131 and the second battery 132. In a case where the power source is switched from the first battery 131 to the second battery 132, the control unit 140 causes the operation mode of the head mounted display 100 to transition from the normal operation mode to the battery replacement mode in which an amount of power consumption of the image display section 20 and the communication unit 117 is smaller than that in the normal operation mode. The communication unit 117 is maintained in a communicable state in the battery replacement mode. Therefore, it is possible to replace the batteries without stopping an operation of the apparatus by efficiently using the plurality of batteries.

The image display section 20 includes the right display driving unit 22 which displays an image so as to correspond to the right eye of the user and the left display driving unit 24 which displays an image so as to correspond to the left eye of the user. The control unit 140 stops display performed by one of the right display driving unit 22 and the left display driving unit 24 in the battery replacement mode. Therefore, power consumption of the image display section 20 can be reduced, and sufficient power can be supplied from the second battery 132 during replacement of the first battery 131.

The control unit 140 reduces a frame rate of an image displayed on the image display section 20 in the battery replacement mode more than a frame rate of an image displayed on the image display section 20 in the normal operation mode. Therefore, power consumption can be further reduced during replacement of the first battery 131, and power can be supplied from the second battery 132.

The control unit 140 reduces a display region of the image display section 20 in the battery replacement mode more than a display region of the image display section 20 in the normal operation mode. Therefore, power consumption can be further reduced during replacement of the first battery 131, and power can be supplied from the second battery 132. The guidance image including the AR display portion 405 or the like exemplified in FIG. 10D may be disposed so as to avoid the center of the visual field VR in such a way of not hindering visibility during replacement of the first battery 131 and the second battery 132. For example, the guidance image may be disposed on the periphery of the display region 401 so as to be located at horizontal and vertical ends of the visual field VR.

In relation to an image displayed on the AR display portion 405, in a case where one of the first battery 131 and the second battery 132 is required to be replaced, an AR image may be displayed so that the battery which is required to be replaced is visually recognized in an emphasized manner. For example, the battery which is required to be replaced may be displayed so as to be viewed in a fluorescent color or the like.

The communication unit 117 is maintained in a communicable state in the battery replacement mode so as to start communication without performing authentication when the operation mode of the head mounted display 100 transitions from the battery replacement mode to the normal operation mode. Therefore, it is possible to start communication without performing authentication when the operation mode transitions to the normal operation mode.

The head mounted display 100 includes the nonvolatile storage unit 120. The control unit 140 stores data related to an operation of the control unit 140 in the storage unit 120 when the operation mode transitions to the battery replacement mode, and performs a process based on the data stored in the storage unit 120 when the operation mode transitions from the battery replacement mode to the normal operation mode. Therefore, the control unit 140 can return to a state before transition to the battery replacement mode when the operation mode transitions from the battery replacement mode to the normal operation mode.

In a case where the first battery 131 is replaced, the control unit 140 performs display based on a residual capacity of the new first battery 131 by using the image display section 20. Therefore, after the first battery 131 is replaced with a new first battery 131, the user can check a residual capacity of the new first battery 131.

In a case where a residual capacity of the first battery 131 is equal to or more than a threshold value, the control unit 140 charges the second battery 132 with power of the first battery 131. Therefore, it is possible to maintain a residual capacity of the second battery 132 in a favorable state.

In a case where a residual capacity of the first battery 131 is equal to or less than a threshold value, the control unit 140 displays a message for prompting replacement of the first battery 131 on the image display section 20. Therefore, it is possible to prevent inconvenience caused by an insufficient residual capacity of the first battery 131 by notifying the user that the residual capacity of the first battery 131 is low.

The head mounted display 100 includes the lid 123 which opens and closes the battery accommodation unit 122 accommodating the first battery 131 in an attachable and detachable manner, and the opening/closing detection portion 124 which detects opening and closing of the lid 123. In a case where the opening/closing detection portion 124 detects opening of the lid 123, the control unit 140 switches a power source from the first battery 131 to the second battery 132. Therefore, the power source can be rapidly switched to the second battery 132 in response to an operation of replacing the first battery 131.

The power saving control unit 180 may display a residual capacity of a battery of an external apparatus connected to the head mounted display 100 in the display region 401.

For example, the control unit 140 performs wireless communication with external apparatuses such as a printer (printing apparatus), a mobile phone including a smart phone, and a scanner via the communication unit 117. In a case where a battery is mounted in the external apparatus, the control unit 140 receives data regarding a battery residual quantity of the external apparatus or a charging or discharging state via the communication unit 117. The control unit 140 may display the external battery information regarding the battery residual quantity or the charging or discharging state received from the external apparatus in the display region 401. For example, the battery residual quantity of the external apparatus may be displayed on the information display portion 402 in a form of being capable of being differentiated from a battery residual quantity of the head mounted display 100. A notification indicating that the battery residual quantity of the external apparatus is equal to or less than a preset predefined value may be performed through display in the display region 401. At this time, the notification may be performed by outputting sound from the sound processing unit 190. A notification of the start and finish of charging of the battery of the external apparatus may be performed through display in the display region 401, and sound may be output at this time.

Second Embodiment

Next, a second embodiment to which the invention is applied will be described.

A configuration of the head mounted display 100 of the second embodiment is the same as described in the first embodiment, and common constituent units will not be illustrated or described.

In the second embodiment, the power saving control unit 180 switches an operation mode of the head mounted display 100 from the normal operation mode to the battery replacement mode on the basis of a residual capacity of the first battery 131 or a signal input from the opening/closing detection portion 124.

In a case where replacement of the first battery 131 is detected, the power saving control unit 180 switches the operation mode of the head mounted display 100 from the normal operation mode to the battery replacement mode on the basis of a residual capacity of the first battery 131.

The power saving control unit 180 monitors a residual capacity of the second battery 132 after switching the operation mode to the battery replacement mode. The residual capacity of the second battery 132 is calculated by the second battery monitoring IC 134, and is input from the battery control unit 135 to the power saving control unit 180.

The power saving control unit 180 compares the residual capacity of the second battery 132 with a first reference value, and changes a display mode of the image display section 20 to a mode for reducing power consumption of the head mounted display 100 in a case where the residual capacity of the second battery 132 decreases to the first reference value or less. The power saving control unit 180 controls at least one of the image processing unit 160 and the display control unit 170 so as to change the display mode of the image display section 20. The first reference value is set to a value corresponding to a full charging capacity of the second battery 132, or a capacity which is equal to or lower than the full charging capacity. For example, in a case where the first reference value is set to a value corresponding to a full charging capacity of the second battery 132, and the second battery 132 is fully charged during switching of a power source, the power saving control unit 180 changes a display mode of the image display section 20 when switching the power source to the second battery 132. For example, in a case where the first reference value is set to a value corresponding to 80% of the full charging capacity of the second battery 132, the power saving control unit 180 does not change the display mode of the image display section 20 until a residual capacity of the second battery 132 decreases to 80%. The power saving control unit 180 detects that the residual capacity of the second battery 132 decreases to 80% and changes the display mode of the image display section 20.

The display mode of the image display section 20 is one of display settings regarding the image display section 20, and the power saving control unit 180 gives an instruction for changing the display image to a display image in which power consumption of the head mounted display 100 can be reduced. The power saving control unit 180 controls the display control unit 170 so as to change the display mode of the image display section 20, and, thus, for example, the luminance of the image display section 20 or a size of a display region of the image display section 20 is changed. The power saving control unit 180 controls the image processing unit 160 so as to change the display mode of the image display section 20, and thus a frame rate of an image displayed on the image display section 20 is changed. The power saving control unit 180 controls the display control unit 170 so as to change the display mode of the image display section 20, and thus the display driving units 22 and 24 which perform display of an image are changed. For example, the display control unit 170 causes one of the right display driving unit 22 and the left display driving unit 24 to display an image in response to an instruction from the power saving control unit 180.

In a case where the residual capacity of the second battery 132 decreases to the first reference value or less, the power saving control unit 180 performs display based on the residual capacity of the second battery 132 on the image display section 20. The display based on the residual capacity of the second battery 132 is, for example, display regarding the residual capacity of the second battery 132, or display of an operation time for which the head mounted display 100 can be operated and which is calculated on the basis of the residual capacity of the second battery 132.

The power saving control unit 180 executes a finish sequence in a case where a monitored residual capacity of the second battery 132 correspond to a preset condition. The power saving control unit 180 compares the residual capacity of the second battery 132 with a second reference value which is set in advance so as to determine whether or not the residual capacity of the second battery 132 corresponds to the preset condition. The second reference value is smaller than the first reference value. The second reference value is set to, for example, a value corresponding to a residual capacity of the second battery 132 obtained by adding a predetermined margin to a residual capacity of the second battery 132 required to execute the finish sequence. The second reference value is a value stored in the storage unit 120 in advance, and, for example, the CPU reads the value from the storage unit 120 and stores the value in the RAM when power is supplied to the head mounted display 100. The power saving control unit 180 determines that the finish sequence will be executed in a case where the residual capacity of the second battery 132 decreases to the second reference value or less.

The power saving control unit 180 may determine whether or not the finish sequence will be executed, on the basis of a signal input from the battery control unit 135. The battery control unit 135 detects the lowest operation voltage of the head mounted display 100 on the basis of a terminal voltage of the second battery 132 measured by the second battery monitoring IC 134. The battery control unit 135 which has detected the lowest operation voltage outputs a signal indicating that the lowest operation voltage has been detected to the power saving control unit 180. The power saving control unit 180 having received the signal from the battery control unit 135 executes the finish sequence.

If the finish sequence is started, in a case where the communication unit 117 is connected to a network, the power saving control unit 180 cancels the connection of the communication unit 117 to the network, and stores a log regarding an operation state (information regarding the operation state) of the control device 10 in the storage unit 120. Thereafter, the power saving control unit 180 stops the supply of power from the second battery 132 and shuts down the OS. The log regarding the operation state includes information such as ESSID which is required for connection to an access point, or connection setting information such as information which is required for authentication with a server apparatus which is being connected. The log regarding the operation state includes information indicating a residual capacity of the second battery 132, or a progress situation of work which is input by the user of the head mounted display 100 operating the direction key 16 or the track pad 14 of the operation unit 111.

Figure 11:
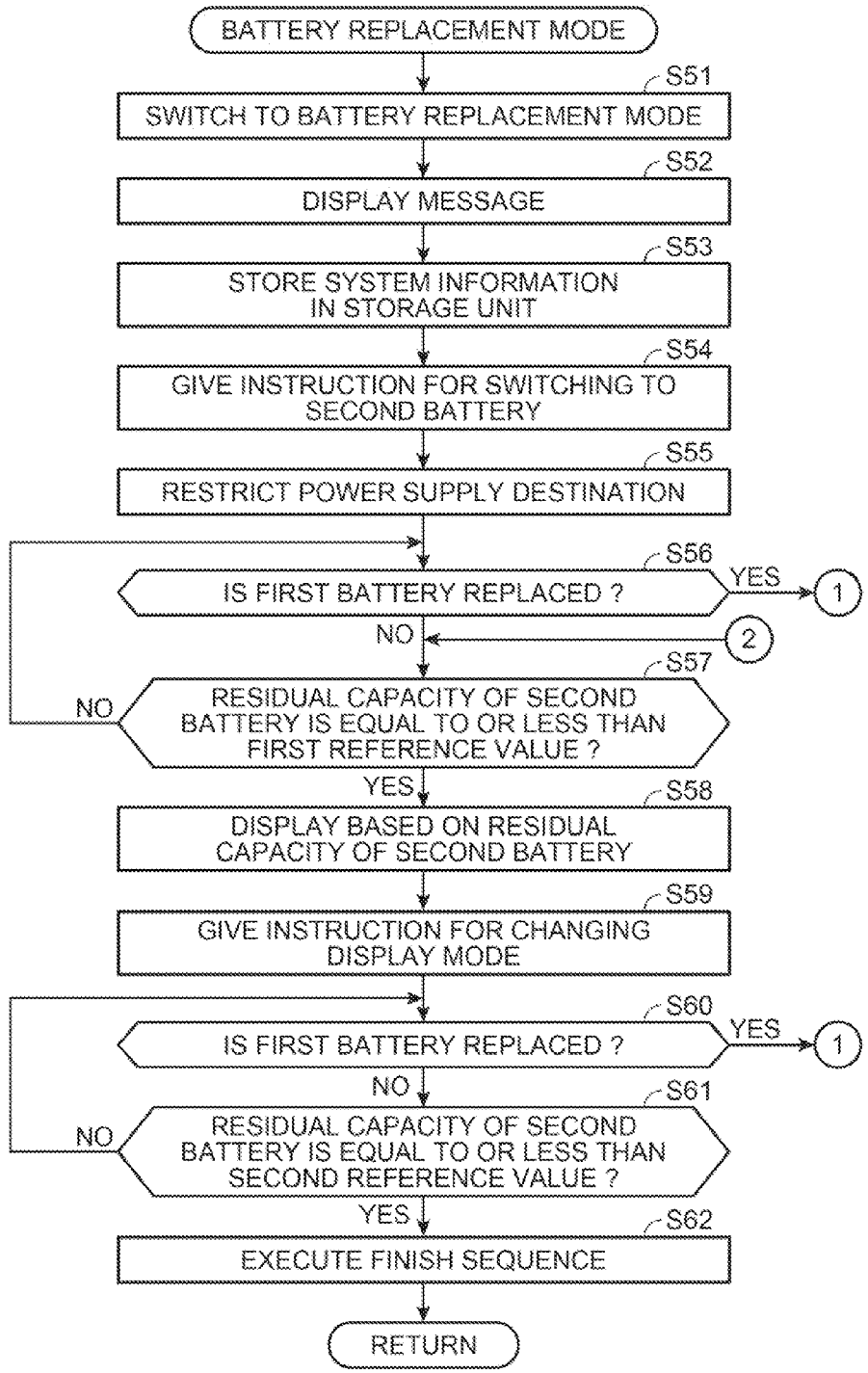
FIG. 11 is a flowchart illustrating specific procedures of a battery replacement mode according to a second embodiment.
Figure 12:
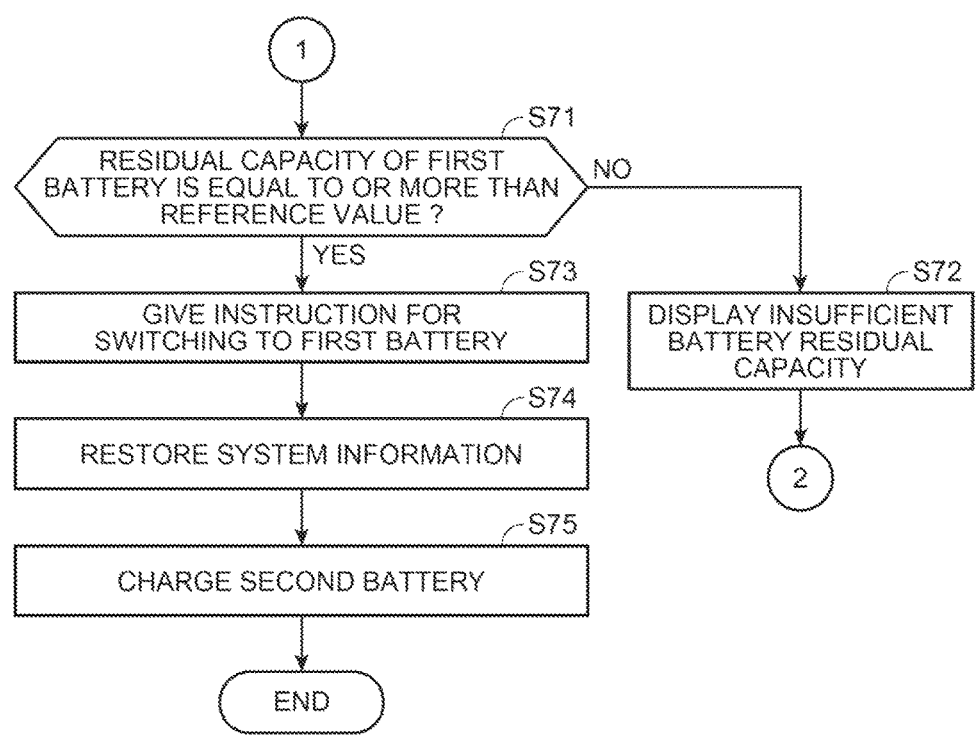
FIG. 12 is a flowchart illustrating specific procedures of the battery replacement mode according to the second embodiment.

FIGS. 11 and 12 are flowcharts illustrating an operation of the head mounted display 100 of the second embodiment, and are flowcharts illustrating, especially, specific procedures of the battery replacement mode.

The power saving control unit 180 switches the operation mode to the battery replacement mode (step S51). If the operation mode is switched to the battery replacement mode, the power saving control unit 180 outputs a signal for sending a notification of switching to the battery replacement mode to the display control unit 170. The display control unit 170 having received the signal from the power saving control unit 180 displays a message on the image display section 20 (step S52). This message is a message for a notification indicating that the operation mode of the head mounted display 100 has been switched to the battery replacement mode. The display control unit 170 may also display a message for a notification indicating that the lid 123 of the battery accommodation unit 122 is in an open state, or a message for requesting the user to wait for replacement of the first battery 131 until a state occurs in which the battery can be replaced.

Next, the power saving control unit 180 stores system information in the storage unit 120 (step S53). The system information is data for returning the head mounted display 100 whose operation mode is switched to the battery replacement mode, to the normal operation mode, and is data related to an operation of the control unit 140. The system information includes, for example, data regarding an operation of the head mounted display 100, such as a display position or a display size of an image displayed on the image display section 20. The system information stored in the storage unit 120 may be selected depending on a residual capacity of the second battery 132. For example, the importance is set in the system information in advance. The power saving control unit 180 selects system information to be stored in the storage unit 120 on the basis of the importance set in the system information and the residual capacity of the second battery 132. For example, in a case where the residual capacity of the second battery 132 is small after the power source is switched from the first battery 131 to the second battery 132, system information with high importance is stored in the storage unit 120.

Next, the power saving control unit 180 outputs a signal for an instruction for switching the battery to the battery control unit 135, so as to give an instruction for switching to the second battery 132 (step S54). The battery control unit 135 having received the signal switches a power supply battery, that is, a power source from the first battery 131 to the second battery 132.

Next, the power saving control unit 180 outputs a signal for restricting power supply destinations to the battery control unit 135 (step S55). The battery control unit 135 having received the signal from the power saving control unit 180 restricts power supply destinations to the control unit 140, the communication unit 117, and the right display driving unit 22 and the left display driving unit 24 of the image display section 20. Since power is supplied to the communication unit 117 even after the switching to the battery replacement mode, for example, in a case where the communication unit 117 is connected to a network, the communication unit 117 can maintain the connection to the network. Therefore, after the operation mode of the head mounted display 100 returns to the normal operation mode, the user is not required to perform an operation for connecting the communication unit 117 to the network.

Since power is supplied to the communication unit 117 even after the transition to the battery replacement mode, the communication unit 117 maintains connection to a network which is being connected thereto even after the transition to the battery replacement mode occurs. When transition occurs from the battery replacement mode to the normal operation mode, the communication unit 117 maintains the connection to the network in the battery replacement mode so that communication is started without performing authentication of the user. For this reason, after the normal operation mode returns from the battery replacement mode, it is unnecessary to perform an operation such as re-inputting of authentication information such as a password in order to perform reconnection to the network. Therefore, it is possible to reduce time and effort of the user due to battery exchange.

As mentioned above, the power saving control unit 180 reduces an amount of power consumption of power supply destinations other than the communication unit 117, for example, the right display driving unit 22 and the left display driving unit 24, so as to reduce an amount of power consumption of the head mounted display 100. Therefore, the supply of power to the communication unit 117 can be maintained in a state in which capacities of the first battery 131 and the second battery 132 are reduced, and thus a communicable state of the communication unit 117 can be maintained for a long period of time. Therefore, it is possible to prevent disruption, disconnection, and interruption caused by stoppage of the communication unit 117. If communication is stopped, the communication unit 117 is activated after a power source capacity is recovered through replacement of the first battery 131 or the second battery 132, and then a sequence for establishing communication with an apparatus of a communication partner is required to be executed. In this case, since transmission and reception of data for establishing communication based on a predetermined communication protocol with the apparatus of the communication partner, selection of the apparatus of the communication partner, authentication using a user ID or a password, and the like are required, time is taken. Since such a sequence is not required to be executed, it is possible to reduce downtime of work using the head mounted display 100 and to perform the work efficiently.

While power is being supplied to the communication unit 117 after transition to the battery replacement mode occurs, the control unit 140 may perform control for minimizing an amount of power consumption of the communication unit 117 on the communication unit 117. For example, the control unit 140 may cause polling between an apparatus of a connection destination to which the communication unit 117 is connected and the communication unit 117, or a scan operation of searching for an apparatus to which the communication unit 117 can be connected to be performed intermittently. A frequency of the polling or the scan operation may be reduced more than that in the normal operation mode. The control unit 140 may transmit data indicating that the battery replacement mode is being executed to other communicable apparatuses so as to perform a notification thereof. For example, as will be described later, a notification may be sent to another head mounted display 100 or the server 5 (FIG. 13). In this case, a battery residual quantity or transition to the battery replacement mode in the head mounted display 100 may be managed by another apparatus.

In a case where the communication unit 117 is connected to the network, for example, via a wireless LAN, the power saving control unit 180 may change a communication mode of the communication unit 117 to a power save mode when transition to the battery replacement mode occurs, and thus power consumption of the communication unit 117 may be reduced.

In a case where the communication unit 117 performs communication by using Bluetooth in the normal operation mode, the power saving control unit 180 may switch a communication mode of the communication unit 117 to communication using Bluetooth Low Energy or Bluetooth Smart when transition to the battery replacement mode occurs. A communication output may be reduced without switching a communication method, and, for example, a class of an electric wave intensity may be changed during communication using Bluetooth.

In a case where near field communication based on the standard such as RFID or Felica can be performed, the power saving control unit 180 may switch communication of the communication unit 117 from the wireless LAN communication to the near field communication when transition to the battery replacement mode occurs.

The power saving control unit 180 may control the battery control unit 135 on the basis of a residual capacity of the second battery 132 so as to control a functional block to be supplied with power. For example, in a case where the residual capacity of the second battery 132 decreases to 70% or less, the power saving control unit 180 outputs a signal for stopping the supply of power to the right display driving unit 22, to the battery control unit 135. For example, in a case where the residual capacity of the second battery 132 decreases to 50% or less, the power saving control unit 180 outputs a signal for stopping the supply of power to the left display driving unit 24, to the battery control unit 135. For example, in a case where the residual capacity of the second battery 132 decreases to 40% or less, the power saving control unit 180 outputs a signal for stopping the supply of power to the communication unit 117, to the battery control unit 135.

As another example in which the communication unit 117 is maintained in a communicable state, the power saving control unit 180 may temporarily stop communication in the communication unit 117 when the first battery 131 or the second battery 132 is replaced. In this case, if an operation of receiving content data from the external apparatuses OA is temporarily stopped, the power saving control unit 180 may stop outputting of content display performed by the display control unit 170. During the temporary stoppage, a minimum of communication establishment is preferably maintained with an apparatus of a communication partner (for example, the external apparatuses OA) so as to resume communication from a state before the stoppage after the first battery 131 or the second battery 132 is replaced. In other words the temporary stoppage is preferably a state in which data communication of content data is not performed, and control data for maintaining connection is transmitted and received intermittently. In a case where communication is completely stopped, data obtained when authentication or communication setting is performed in the communication before being stopped is preserved, and communication is preferably rapidly re-established on the basis of the preserved data.

Next, the power saving control unit 180 determines whether or not the first battery 131 is replaced (step S56). The power saving control unit 180 detects that the first battery 131 is detached, and detects that the first battery 131 is attached again.

The power saving control unit 180 determines whether or not the first battery 131 is replaced on the basis of a terminal voltage of the first battery 131 detected by the first battery monitoring IC 133. If the first battery 131 is disconnected from the battery control unit 135, the terminal voltage of the first battery 131 measured by the first battery monitoring IC 133 enters a low level or high impedance. If the terminal voltage of the first battery 131 input by the first battery monitoring IC 133 enters a low level or high impedance, the power saving control unit 180 determines that the first battery 131 is detached from the battery accommodation unit 122. This determination is performed by the power saving control unit 180 comparing a voltage value detected by the first battery monitoring IC 133 with a preset voltage reference value and determining a magnitude relationship therebetween.

If the new first battery 131 is accommodated in the battery accommodation unit 122, and the first battery 131 is connected to the battery control unit 135, a terminal voltage of the first battery 131 detected by the first battery monitoring IC 133 is a voltage within a predetermined range. If the terminal voltage of the first battery 131 detected by the first battery monitoring IC 133 is a voltage within a predetermined range, the power saving control unit 180 determines that the first battery 131 is replaced. Here, the power saving control unit 180 compares a voltage value detected by the first battery monitoring IC 133 with a preset voltage reference value and determines a magnitude relationship therebetween.

If the determination result in step S56 is negative (NO in step S56), the power saving control unit 180 determines whether or not the residual capacity of the second battery 132 is equal to or less than the first reference value (step S57). In a case where the first reference value is set to a value indicating a full charging capacity of the second battery 132, the power saving control unit 180 starts the processes insteps S58 and S59 when the power source is switched to the second battery 132.

If the determination result in step S57 is negative (NO in step S57), the power saving control unit 180 returns to step S56 and determines whether or not the first battery 131 is replaced (step S56). If the determination result in step S57 is affirmative (YES in step S57), the power saving control unit 180 outputs a signal indicating that the residual capacity of the second battery 132 decreases to the first reference value or less, to the display control unit 170. The display control unit 170 having received the signal from the power saving control unit 180 performs display based on the residual capacity of the second battery 132 on the image display section 20 (step S58). The display is display regarding the residual capacity of the second battery 132, or display of a residual time for which the head mounted display 100 can be operated and which is calculated on the basis of the residual capacity of the second battery 132.

Next, the power saving control unit 180 outputs a signal for an instruction for changing the display mode to the display control unit 170 (step S59). The display control unit 170 having received the signal for an instruction for changing the display mode adjusts, for example, the luminance of the image display section 20. The display control unit 170 controls at least one of the right backlight control unit 201 and the left backlight control unit 202 by using a control signal so as to reduce the luminance of at least one of the right backlight 221 and the left backlight 222 more than that in the normal operation mode. In other words, the display control unit 170 may reduce the luminance of the right backlight 221 and the left backlight 222 more than that in the normal operation mode, and may reduce the luminance of right backlight 221 or the left backlight 222 more than that in the normal operation mode. Since the luminance of at least one of the right backlight 221 and the left backlight 222 is lower than that in the normal operation mode, it is possible to reduce power consumption of the head mounted display 100.

The display control unit 170 having received the signal for an instruction for changing the display mode may change a display region of the image display section 20. The display region of the image display section 20 includes display regions of the right LCD 241 and the left LCD 242.

The display control unit 170 controls at least one of the right LCD control unit 211 and the left LCD control unit 212 by using a control signal so as to reduce the display region of at least one of the right LCD 241 and the left LCD 242 more than a display region in the normal operation mode. In other words, the display control unit 170 may reduce the display regions of the right LCD 241 and the left LCD 242 more than those in the normal operation mode, and may reduce the display region of the right LCD 241 or the left LCD 242 more than that in the normal operation mode. Since the display region of at least one of the right LCD 241 and the left LCD 242 is reduced more than a display region in the normal operation mode, it is possible to reduce power consumption of the head mounted display 100.

The display control unit 170 having received the signal for an instruction for changing a display mode may stop display performed by at least one of the right display driving unit 22 and the left display driving unit 24 of the image display section 20.

The display control unit 170 may stop outputting of a control signal to one of the right display driving unit 22 and the left display driving unit 24 so as to stop one of the right display driving unit 22 and the left display driving unit 24 from generating image light. The display control unit 170 controls one of the right display driving unit 22 and the left display driving unit 24 by using a control signal so as to stop one of the right display driving unit 22 and the left display driving unit 24 from generating image light. The clock signal PCLK, the vertical synchronization signal VSync, the horizontal synchronization signal HSync, and the image data Data which are output from the image processing unit 160 to the transmission unit 51 or 52 may stop being transmitted under the control of the power saving control unit 180. The power saving control unit 180 may control the battery control unit 135 so as to stop the supply of power to one of the right display driving unit 22 and the left display driving unit 24, thereby stopping display. Thus, only one of the right display driving unit 22 and the left display driving unit 24 performs display, and thus amount of power consumption is smaller than in a case where both of the right display driving unit 22 and the left display driving unit 24 display images.

The display control unit 170 may reduce power consumption of the image display section 20 by combining the adjustment of the luminance of the backlights 221 and 222, the reduction of the display regions of the LCDs 241 and 242, and the stoppage of display performed by the display driving unit 22 or 24 with each other.

The power saving control unit 180 selects a mode number for designating a display mode of the image display section 20 on the basis of a residual capacity of the second battery 132, and notifies the display control unit 170 of the selected mode number.

For example, if the residual capacity of the second battery 132 is equal to or less than, for example, 80%, the power saving control unit 180 notifies the display control unit 170 of the mode number "1". The display control unit 170 which has been notified of the mode number "1" controls the right backlight control unit 201 and the left backlight control unit 202 so as to reduce the luminance of the right backlight 221 and the left backlight 222 more than that in the normal operation mode.

For example, if the residual capacity of the second battery 132 is equal to or less than, for example, 60%, the power saving control unit 180 notifies the display control unit 170 of the mode number "2". The display control unit 170 which has been notified of the mode number "2" controls the right LCD control unit 211 and the left LCD control unit 212 so as to reduce the display regions of the right LCD 241 and the left LCD 242 more than display regions in the normal operation mode.

For example, if the residual capacity of the second battery 132 is equal to or less than, for example, 40%, the power saving control unit 180 notifies the display control unit 170 of the mode number "3". The display control unit 170 which has been notified of the mode number "3" stops outputting of a control signal to one of the right display driving unit 22 and the left display driving unit 24 so as to stop the right display driving unit 22 or the left display driving unit 24 from performing display.

Thus, one of the right display driving unit 22 and the left display driving unit 24 is stopped from displaying a display image. The other of the right display driving unit 22 and the left display driving unit 24 reduces the luminance of the backlight 221 (222) so as to reduce the display region of the LCD 241 (242).

The power saving control unit 180 may output, to the image processing unit 160, a signal for an instruction for reducing a frame rate of an image signal more than that in the normal operation mode. The image processing unit 160 having received the signal from the power saving control unit 180 converts the vertical synchronization signal VSync and the horizontal synchronization signal HSync so that the frame rate of the image signal is lower than a frame rate in the normal operation mode. The frame rate of the image signal converted by the image processing unit 160 may be a frame rate which is set in advance, and may be changed in response to an instruction from the power saving control unit 180. For example, a residual capacity of the second battery 132 and a converted frame rate may be set in a plurality of stages, and the power saving control unit 180 may select a frame rate corresponding to the residual capacity of the second battery 132 as a frame rate of a conversion destination.

The power saving control unit 180 may output a signal for an instruction for performing thinning-out process on an image signal to the image processing unit 160. The image processing unit 160 having received the signal from the power saving control unit 180 thins out a digital image signal which is digitally converted at a thinning-out ratio which is set in advance, and stores a thinned-out image signal in the RAM of the storage unit 120 as image data.

When the image signal stored in the RAM of the storage unit 120 is transmitted to the image display section 20 via the transmission units 51 and 52, a thinning-out process may be performed by reading the image signal from the RAM at a thinning-out ratio which is set in advance.

The right LCD control unit 211 may thin out pixels of the right LCD 241 used to display right eye image data, and the left LCD control unit 212 may thin out pixels of the left LCD 242 used to display left eye image data, thereby reducing power consumption of the image display section 20.

In the battery replacement mode, the display control unit 170 may display images on peripheral parts of the display regions of the right LCD 241 and the left LCD 242. For example, in the battery replacement mode, the image processing unit 160 reduces sizes of image data items displayed on the right LCD 241 and the left LCD 242 more than those in the normal operation mode. The reduced images are displayed on the peripheral parts of the display regions of the right LCD 241 and the left LCD 242 under the control of the display control unit 170. In other words, since the images are displayed on the peripheral parts of the display regions so as to avoid the center of the visual field, it is possible to improve visibility of external scenery during replacement of power using the second battery 132. Therefore, it is possible to efficiently perform battery replacement work.

Next, the power saving control unit 180 determines whether or not the first battery 131 is replaced (step S60). The power saving control unit 180 detects detachment of the first battery 131 and reattachment of the first battery 131 on the basis of a terminal voltage of the first battery 131 detected by the first battery monitoring IC 133 in the same manner as in step S56. The power saving control unit 180 detects detachment of the first battery 131 and attachment of the first battery 131 so as to determine whether or not the first battery 131 is replaced.

If the determination result in step S60 is negative (NO in step S60), the power saving control unit 180 determines whether or not the residual capacity of the second battery 132 is equal to or less than the second reference value (step S61).

If the determination result in step S61 is negative (NO in step S61), the power saving control unit 180 returns to step S60 and determines whether or not the first battery 131 is replaced (step S60). If the determination result in step S61 is affirmative (YES in step S61), the power saving control unit 180 executes a finish sequence (step S62). The power saving control unit 180 stores the log regarding the operation state of the control device 10, such as a battery residual capacity and the date and time, stored in the RAM of the control unit 140, in the storage unit 120, and shuts down the OS.

If it is determined that the first battery 131 is replaced in the determination of step S56 or step S60 (YES in step S56 or step S60), the power saving control unit 180 determines whether or not a residual capacity of the first battery 131 is equal to or more than a reference value (step S71). The reference value is different from the reference value of step S51 used to determine whether or not the operation mode will be switched from the normal operation mode to the battery replacement mode. The reference value is set to a value corresponding to a residual capacity of the first battery 131 with which the head mounted display 100 can be continuously operated for a preset period of time even if the head mounted display 100 is operated in the normal operation mode.

If the determination result in step S71 is negative (NO in step S71), the power saving control unit 180 outputs a signal indicating that the residual capacity of the first battery 131 is insufficient, to the display control unit 170. The display control unit 170 having received the signal from the power saving control unit 180 displays a message indicating that the residual capacity of the first battery 131 is insufficient, on the image display section 20 (step S72). In a case where the first battery 131 whose residual capacity is insufficient is not replaced or charged but is connected to the battery control unit 135 again, the head mounted display 100 cannot be return to the normal operation mode. If the first battery 131 whose residual capacity is insufficient is connected to the battery control unit 135, an operation voltage cannot be provided to the head mounted display 100, and thus an operation of the head mounted display 100 becomes abnormal or unstable. In order to prevent such a situation, in step S71, the power saving control unit 180 determines whether or not the residual capacity of the first battery 131 is equal to or more than the reference value.

If the determination result in step S71 is affirmative (YES in step S71), the power saving control unit 180 outputs an instruction signal to the battery control unit 135 so as to give an instruction for switching to the first battery 131 (step S73). The battery control unit 135 having received the instruction signal switches a power supply battery, that is, the power source from the second battery 132 to the first battery 131.

The power saving control unit 180 develops the system information stored in the storage unit 120 on a work memory such as the RAM so as to restore the system information (step S74). Thereafter, the control unit 140 performs a process based on the data developed on the RAM. Thus, the head mounted display 100 returns to a state before switching to the battery replacement mode.

Next, the power saving control unit 180 outputs an instruction signal to the battery control unit 135 so that the battery control unit 135 charges the second battery 132 with power of the first battery 131 (step S75). If it is determined that the residual capacity of the first battery 131 is equal to or more than the reference value in step S71, the power saving control unit 180 outputs an instruction signal to the battery control unit 135 so as to give an instruction for charging the second battery 132.

The battery control unit 135 receives a residual capacity of the second battery 132 which is calculated by the second battery monitoring IC 134, and determines whether or not the second battery 132 is in a full charge state on the basis of the received residual capacity of the second battery 132. If it is determined that the second battery 132 is not in a full charge state but in a chargeable state, the battery control unit 135 outputs power of the first battery 131 to the second battery 132 so as to charge the second battery 132. In other words, a condition for charging the second battery 132 is a case where a residual capacity of the new first battery 131 is equal to or more than the reference value, and a residual capacity of the second battery 132 is not in a full charge state. If this condition is satisfied, the power saving control unit 180 outputs a signal for instructing the battery control unit 135 to charge the second battery 132 with power of the first battery 131.

As a countermeasure for a case where the residual capacity of the first battery 131 is more than the reference value in step S51, or the lid 123 is wrongly opened, the flow may proceeds to step S71 when the lid 123 is closed. In this case, the power saving control unit 180 may determine the residual capacity of the first battery 131.

The battery control unit 135 may determine residual capacities of the first battery 131 and the second battery 132. For example, in a case where a residual capacity of the first battery 131 decreases to a predefined value or less, the battery control unit 135 outputs a signal indicating the fact to the control unit 140. If a signal for permitting battery exchange is input from the control unit 140, the power source is changed from the first battery 131 to the second battery 132.

The battery control unit 135 detects detachment of the first battery 131 and reattachment of the first battery 131 on the basis of a terminal voltage of the first battery 131 detected by the first battery monitoring IC 133. A method of detecting detachment of the first battery 131 and reattachment of the first battery 131 in the battery control unit 135 is the same as the detection method in the power saving control unit 180.

In the display mode change in step S59, the display control unit 170 may stop the right display driving unit 22 and the left display driving unit 24 of the image display section 20 from performing display.

For example, in a case where a residual capacity of the second battery 132 decreases to the first reference value or less, the display control unit 170 stops one of the right display driving unit 22 and the left display driving unit 24 from performing display. In a case where the residual capacity of the second battery 132 decreases to a third reference value or less, the display control unit 170 stops the right display driving unit 22 and the left display driving unit 24 from performing display. The third reference value is set to a value between the first reference value and the second reference value.

After outputting a signal for an instruction for switching to the second battery 132 to the battery control unit 135, the power saving control unit 180 may control the display control unit 170 to display a content moving image for explaining a method of replacing the first battery 131 on the image display section 20. In a case of a user who is unfamiliar with a method of replacing the first battery 131, the user performs work while watching the content moving image, and can thus efficiently perform the replacement work for the first battery 131. In a case of a user who is familiar with the replacement work for the first battery 131, the content moving image is not reproduced in order to reduce power consumption of the second battery 132. For example, in a case where the number of times of performing replacement work for the first battery 131 is recorded, and reaches a predetermined number of times, the content moving image may not be reproduced.

As described above, the head mounted display 100 of the second embodiment to which the invention is applied includes the image display section 20, the first battery 131, the second battery 132, and the control unit 140. The image display section 20 enables the user to visually recognize an image and transmits external scenery therethrough. The control unit 140 switches the operation mode of the head mounted display 100 between the normal operation mode in which power is supplied from the first battery 131 and the battery replacement mode in which power is supplied from the second battery 132. After switching the operation mode from the battery replacement mode to the normal operation mode, the control unit 140 charges the second battery 132 with power of the first battery 131. Therefore, the battery can be replaced without stopping an operation of the head mounted display 100 which is driven by the battery, and thus it is possible to prevent the occurrence of a situation in which the battery replacement mode cannot be executed due to an insufficient capacity of the second battery 132.

In a case where replacement of the first battery 131 is detected, the control unit 140 switches the operation mode to the normal operation mode when a residual capacity of the new first battery 131 is equal to or more than a preset reference value. Therefore, it is possible to prevent the occurrence of inconvenience in the head mounted display 100 due to an insufficient residual capacity of the new first battery 131.

The control unit 140 executes the finish sequence in a case where a residual capacity of the second battery 132 corresponds to a preset condition during execution of the battery replacement mode. Therefore, according to the invention, for example, in a case where a capacity of the second battery 132 is insufficient, it is possible to prevent data from being lost by executing the finish sequence.

The control unit 140 stores information regarding an operation state of the head mounted display 100 in the storage unit 120 and then turns off the power source as the finish sequence. Therefore, it is possible to prevent the information regarding an operation state of the head mounted display 100 from being lost.

In a case where a residual capacity of the second battery 132 decreases to the preset first reference value or less during execution of the battery replacement mode, the control unit 140 changes the display mode of the image display section 20 to a mode for reducing power consumption of the head mounted display 100. After changing the display mode to the mode for reducing power consumption of the head mounted display 100, the control unit 140 executes the finish sequence in a case where the residual capacity of the second battery 132 decreases to the second reference value or less. Therefore, it is possible to reduce power consumption of the head mounted display 100 by changing the display mode when the residual capacity of the second battery 132 decreases. In a case where the residual capacity of the second battery 132 further decreases, it is possible to prevent data of the head mounted display 100 from being lost by executing the finish sequence.

In a case where the residual capacity of the second battery 132 decreases to the first reference value or less during execution of the battery replacement mode, the control unit 140 performs display based on the residual capacity of the second battery 132 on the image display section 20. Therefore, in a case where the residual capacity of the second battery 132 decreases, the user is caused to recognize a message regarding the residual capacity of the second battery 132, and thus it is possible to notify the user of a state of the head mounted display 100.

The image display section 20 includes the right display driving unit 22 which displays an image so as to correspond to the right eye of the user and the left display driving unit 24 which displays an image so as to correspond to the left eye of the user. The control unit 140 stops display performed by one of the right display driving unit 22 and the left display driving unit 24 in the battery replacement mode. Therefore, power consumption of the image display section 20 can be reduced, and sufficient power can be supplied from the second battery 132 during replacement of the first battery 131.

The control unit 140 reduces a frame rate of an image displayed on the image display section 20 in the battery replacement mode more than a frame rate of an image displayed on the image display section 20 in the normal operation mode. Therefore, power consumption can be further reduced during replacement of the first battery 131, and power can be supplied from the second battery 132.

The control unit 140 reduces a display region of the image display section 20 in the battery replacement mode more than a display region of the image display section 20 in the normal operation mode. Therefore, power consumption can be still further reduced during replacement of the first battery 131, and power can be supplied from the second battery 132.

In the battery replacement mode, the control unit 140 thins out image data which is displayed on the image display section 20 and displays thinned-out image data on the image display section 20, or gives an instruction for thinning out pixels used for display on the image display section 20, to the image display section 20. Therefore, it is possible to still further reduce power consumption while power is supplied from the second battery 132.

In the battery replacement mode, the control unit 140 displays images on the peripheral parts of the image display section 20. Therefore, it is possible to improve visibility of external scenery during replacement of power using the second battery 132 and thus to efficiently perform battery replacement work.

The head mounted display 100 includes the communication unit 117. In the battery replacement mode, the control unit 140 supplies power of the second battery 132 to the communication unit 117 so as to maintain the communication unit 117 in a communicable state in the battery replacement mode. Therefore, when the operation mode is switched from the battery replacement mode to the normal operation mode, it is possible to save time and effort to set communication of the communication unit 117 again.

The communication unit 117 is maintained in a communicable state in the battery replacement mode so as to start communication without performing authentication when the operation mode transitions from the battery replacement mode to the normal operation mode. Therefore, it is possible to start communication without performing authentication when the operation mode transitions from the battery replacement mode to the normal operation mode.

Third Embodiment

FIG. 13 is a schematic configuration diagram illustrating a configuration of a communication system 1 of a third embodiment. The communication system 1 is a system in which a display system 2 including a plurality of head mounted displays 100 is connected to a server 5 via a communication network 4. In the third embodiment, a plurality of head mounted displays 100 included in the display system 2 are assumed to be head mounted displays 100A and 100B. Hereinafter, in a case where the head mounted displays 100A and 100B are not required to be differentiated from each other, the head mounted displays are referred to as a head mounted display 100.

The communication network 4 is realized by various communication lines such as a public line network, a dedicated line, wireless communication lines including a portable telephone line, and backbone communication lines of these lines, or combinations thereof, and a specific configuration thereof is not limited. The communication network 4 may be a wide communication line network which can connect remote locations to each other, and may be a local area network (LAN) is installed in a specific facility or building. The communication network 4 may include a network apparatus such as a server apparatus, a gateway apparatus, or a router apparatus, which can connect the various communication lines to each other. The communication network 4 may be constituted of a plurality of communication lines.

The display system 2 is configured by using a LAN or the like installed in a building. The display system 2 includes a wireless access point 3 which performs wireless communication, and a plurality of head mounted displays 100A and 100B. The wireless access point 3 is a communication apparatus such as an access point or a router, and relays data communication between the head mounted display 100A and the head mounted display 100B, and data communication between the head mounted displays 100A and 100B and the communication network 4.

The head mounted display 100A can perform data communication with the other head mounted display 100B via the wireless access point 3. The head mounted displays 100A and 100B performs data communication with the server 5 via the wireless access point 3. The head mounted display 100A may directly perform wireless communication with the other head mounted display 100B, for example, in an ad hoc mode. The head mounted displays 100A and 100B may be connected to each other via a wired communication line. In other words, a configuration of the display system 2 is not particularly limited as long as the head mounted display 100A can perform communication with the head mounted display 100B. The communication system 1 may have a configuration in which the head mounted displays 100A and 100B included in the display system 2 can perform communication with the server 5.

The third embodiment is an embodiment in which the head mounted display 100 described in the first and second embodiments is applied for use in an industry. In other words, as each of the head mounted displays 100A and 100B, the head mounted display 100 described in the first embodiment and/or the second embodiment may be used.

In a factory in which a plurality of apparatuses are installed, a user wears the head mounted display 100 and performs work by using the apparatus. In this case, the image display section 20 of the head mounted display 100 displays work supporting information such as a manual of the apparatus used by the user and precautions in using the apparatus, as display data. The display data may be provided to the head mounted display 100 from the server 5, and the display data stored in the storage unit 120 of the head mounted display 100 may be used. The user can operate the apparatus while visually recognizing the work supporting information and can thus safely and reliably operate the apparatus.

As the work supporting information, an image (hereinafter, referred to as an operation image) in which another user operates an apparatus may be used. A user who provides the operation image wears, for example, the head mounted display 100A, and captures an image in which the user operates the apparatus by using the camera 61 of the head mounted display 100A. The head mounted display 100A transmits the operation image captured by the camera 61 to the head mounted display 100B worn by a user who receives the operation image. The user of the head mounted display 100B can operate the apparatus while visually recognizing the operation image displayed on the image display section 20 of the head mounted display 100B. Therefore, it is possible to safely and reliably operate the apparatus.

The operation image may be directly transmitted from the head mounted display 100A to the head mounted display 100B. The head mounted display 100A may upload the operation image to the server 5 and register the operation image in the server 5, and the head mounted display 100B may download the operation image.

The server 5 is provided with a control unit 6 which includes a CPU, a ROM, a RAM, and the like as hardware, and a storage unit 7. The storage unit 7 is a nonvolatile storage device, and may employ, for example, semiconductor memories such as a flash memory and an EEPROM, or portable media such as a flexible disc, a magnetic disk, a magneto-optical disc, a semiconductor storage device, a ROM, and a CD-ROM.

The storage unit 7 stores manuals, precautions, data regarding repair guides, operation images, and the like as display data which is displayed on the head mounted display 100. The repair guide records checking items for specifying failure causes, countermeasures corresponding to the failure causes, and the like in a case where a failure occurs in an apparatus.

The storage unit 7 stores system information transmitted from the head mounted display 100. The head mounted display 100 transmits the system information to the server 5 and preserves the system information in the server 5 in a case where a residual capacity of the first battery 131 decreases to a predefined value or less.

FIG. 14 illustrates a management table stored in the storage unit 7.

An apparatus ID, an account name, authentication information, progress information, and a battery residual capacity are registered in the management table. The apparatus ID is information for identifying the head mounted displays 100A and 100B. The account name is an account name which is set by a user who is permitted to use the head mounted display 100 indicated by the apparatus ID. The authentication information is information such as a password for authenticating the user associated with the account name. The progress information is information indicating a progress situation of work of the user associated with the account name. In a case where a plurality of user use a single head mounted display 100, a plurality of account names, authentication information pieces, and progress information pieces are registered in the same apparatus ID.

The battery residual capacity is a residual capacity of the first battery 131 of the head mounted display 100 indicated by the apparatus ID. The head mounted display 100 notifies the server 5 of the residual capacity of the first battery 131 at preset time intervals. The server 5 registers the residual capacity of the first battery 131 of which the notification is sent from the head mounted display 100 in the management table in correlation with the apparatus ID.

Figure 15:
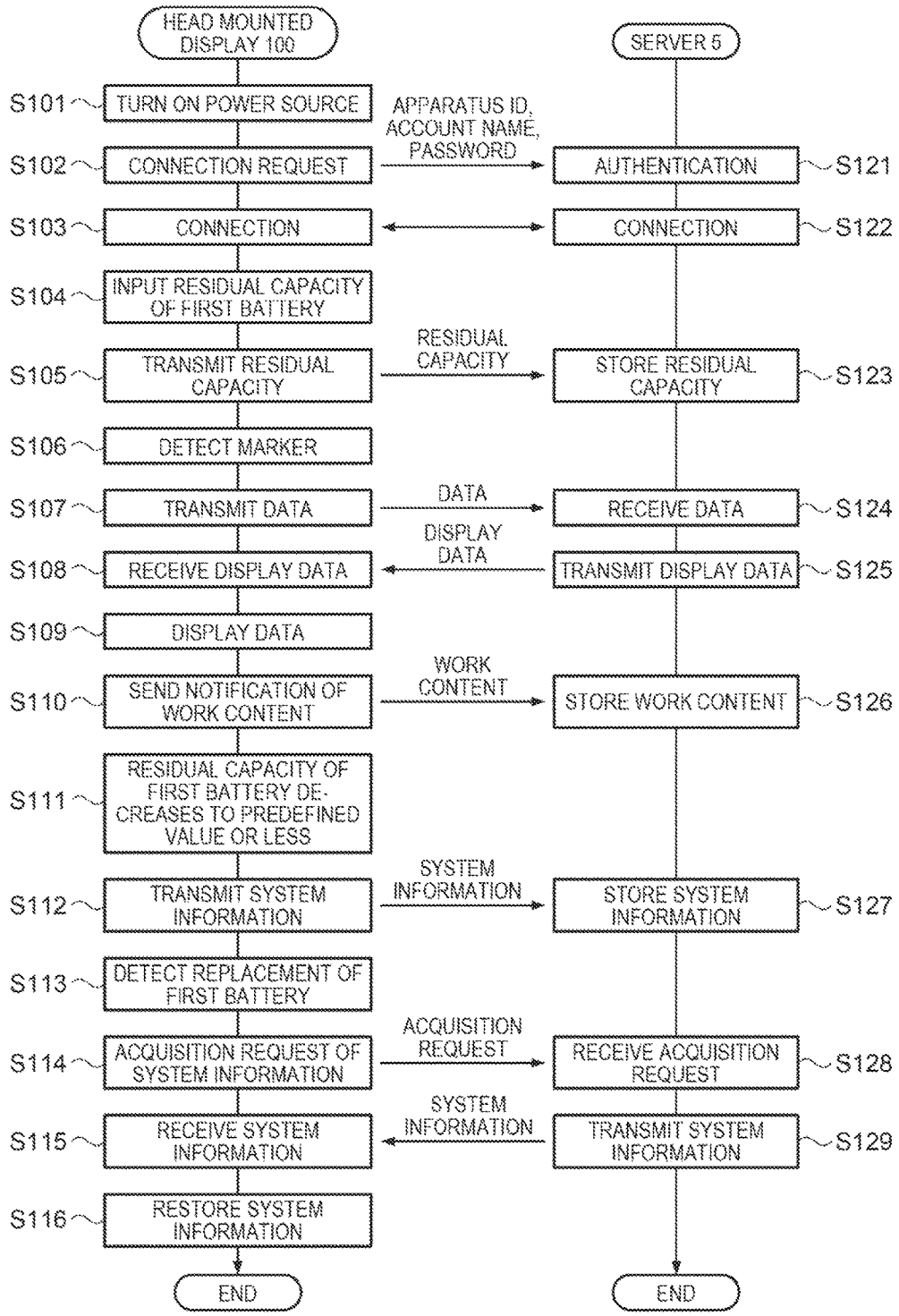
FIG. 15 is a diagram illustrating a communication sequence between a head mounted display and a server.

FIG. 15 is a diagram illustrating a communication sequence between the head mounted display 100 and the server 5.

The control unit 140 of the head mounted display 100 is activated if the power source is turned on (step S101), and transmits a connection request (step S102) to the server 5 through wireless communication of the communication unit 117. If the control unit 6 of the server 5 receives the connection request from the head mounted display 100, the control unit 6 requests the head mounted display 100 to transmit authentication information so as to authenticate the head mounted display 100 (step S121). The head mounted display 100 transmits an account name, a password, and an apparatus ID to the server 5 in response to the request from the server 5. The control unit 6 authenticates the user by using the account name and the password received from the head mounted display 100. If the authentication of the user is successful, the control unit 6 performs connection to the head mounted display 100 (steps S103 and S122).

Next, the power saving control unit 180 receives a residual capacity of the first battery 131 from the battery control unit 135 (step S104). In a case where the residual capacity of the first battery 131 which is input from the battery control unit 135 is more than a predefined value, the power saving control unit 180 transmits the residual capacity of the first battery 131 to the server 5 (step S105). The control unit 6 stores the residual capacity of the first battery 131 transmitted from the head mounted display 100 in the storage unit 7 in correlation with the apparatus ID (step S123). In a case where the residual capacity of the first battery 131 which is input from the battery control unit 135 is equal to or less than the predefined value, the power saving control unit 180 proceeds to a process in step S111 which will be described later.

The power saving control unit 180 transmits the input residual capacity of the first battery 131 to the server 5 whenever the residual capacity of the first battery 131 is input from the battery control unit 135, and thus the residual capacity of the first battery 131 is updated.

Also in a case where the residual capacity of the first battery 131 decreases to the predefined value or less, the power saving control unit 180 may transmit the residual capacity of the first battery 131 to the server 5.

Next, the control unit 140 causes the camera 61 to capture an image, and detects a marker from the image captured by the camera 61 (step S106). The marker is, for example, a one-dimensional code such as a barcode, a two-dimensional code such as QR code (registered trademark), and a mechanically recognizable marker as an image. The marker is added to a work place such as a work desk, or in the vicinity thereof. Since the marker is required to be imaged by the camera 61, the user intentionally directs the image display section 20 toward the marker.

The control unit 140 analyzes the captured image which is output from the camera 61 so as to detect the marker. If the marker is detected, the control unit 140 transmits data recorded on the detected marker to the server 5 via the communication unit 117 (step S107). The data recorded on the marker is, for example, information for identifying an apparatus. If the data transmitted from the head mounted display 100 is received (step S124), the control unit 6 transmits display data corresponding to the received data to the head mounted display 100 (step S125).

The control unit 140 receives the display data transmitted from the server 5 via the communication unit 117 (step S108), and displays the display data on the image display section 20 (step S109). The user of the head mounted display 100 performs work while visually recognizing the manual of the apparatus as a work target, the precautions in operating the apparatus, or the like, displayed on the image display section 20. Thus, it is possible to reduce work errors.

If the work is completed, the user of the head mounted display 100 inputs work content of the completed work by operating the direction key 16 or the track pad 14 of the operation unit 111. The control unit 140 transmits the work content which is input via the operation unit 111 to the server 5 along with the account name of the user. The control unit 6 receives the work content and the account name transmitted from the head mounted display 100 and stores the work content in the storage unit 7 in correlation with the account name (step S126).

In a case where it is detected that the residual capacity of the first battery 131 which is input from the battery control unit 135 decreases to the predefined value or less (step S111), the power saving control unit 180 transmits a transmission request of the system information to the server 5. If information for permitting the system information to be transmitted is received from the server 5, the power saving control unit 180 transmits the system information to the server 5 (step S112). The control unit 6 stores the system information received from the head mounted display 100 in the storage unit 7 in correlation with the apparatus ID (step S126). If the transmission of the system information to the server 5 is completed, the power saving control unit 180 performs the same processes as those in steps S14 to S20 of FIG. 7, in steps S51 to S62 of FIG. 11, in steps S31 to S36 of FIG. 8, or in steps S71 to S75 of FIG. 12.

In a case where replacement of the first battery 131 is detected (step S113), the power saving control unit 180 determines whether or not a residual capacity of the new first battery 131 is equal to or more than the predefined value. If the residual capacity of the new first battery 131 is equal to or more than the predefined value, the power saving control unit 180 instructs the battery control unit 135 to switch a power supply battery from the second battery 132 to the first battery 131. If the power source is switched from the second battery 132 to the first battery 131, the power saving control unit 180 transmits an acquisition request of the system information to the server 5 (step S114). If the acquisition request is received (step S128), the control unit 6 transmits the system information of the corresponding apparatus ID to the head mounted display 100 (step S129). If the system information is received from the server 5 (step S115), the head mounted display 100 develops the received system information on a work memory such as the RAM so as to restore the system information (step S116). Thereafter, the control unit 140 performs a process based on the data developed on the RAM. Consequently, the head mounted display 100 returns to a state before transition to the battery replacement mode. Next, the head mounted display 100 and the server 5 finish the process illustrated in FIG. 15, and transition to a normal operation, that is, an operation in which the work supporting information is displayed by the head mounted display 100.

In the process illustrated in FIG. 15, a configuration in which the system information is transmitted from the head mounted display 100 to the server 5 has been exemplified, but, for example, the system information and the like may be transmitted and received between the head mounted display 100A and the head mounted display 100B. For example, in a case where the head mounted display 100A transmits the system information to the server 5 in step S112, the system information may also be transmitted to the head mounted display 100B.

Separately from the process illustrated in FIG. 15, the head mounted displays 100A and 100B may transmits the information to another head mounted display 100 in a case where a shutdown sequence is executed due to decreases in capacities of the first battery 131 and the second battery 132 as described above. For example, in a case where the head mounted display 100A executes the shutdown sequence, control content performed by the control unit 140 before the execution of the shutdown sequence, output content data, information indicating a portion which outputs the content data, and the like may be transmitted to the head mounted display 100B. Here, the content data may be transmitted, or information indicating the content data may be transmitted. In this case, if one head mounted display 100 is shut down due to a decrease in a battery residual quantity, the other head mounted display 100 can continuously output the content data. In other words, a process performed by the head mounted display 100 can be taken over by the other head mounted display 100. For example, it is assumed that display and/or sound output based on a work instruction or work supporting content data are (is) performed by the head mounted display 100 in a factory. In this case, if one head mounted display 100 is shut down due to a decrease in a battery residual quantity, the other head mounted display 100 can continuously output the content data. For this reason, in a case where a battery residual quantity of the head mounted display 100 decreases, a worker can continuously perform the work by replacing the head mounted display 100 with the other head mounted display 100.

In the factory, a work table for performing replacement work of the first battery 131 may be provided, and a device which supplies power to the second battery 132 may be installed in the work table. For example, a coil and a device which causes a current to flow through the coil are provided in the work table, and magnetic flux generated in the coil is coupled to a coil provided in the head mounted display 100, so that the second battery 132 is charged. A device which outputs an electric wave used to charge the second battery 132 may be provided in the work table. A resonance circuit using a coil or a capacitor may be provided in the work table, and the second battery 132 may be charged by causing an electric field or a magnetic field to resonate. In a case where a solar cell is used as the second battery 132, the second battery 132 may be charged with illumination of the factory during replacement work of the first battery 131.

The invention is not limited to the configurations of the above-described embodiments, and may be implemented in various aspects within the scope without departing from the spirit thereof.

For example, in the embodiments, a description has been made of a configuration in which the second battery 132 is accommodated in the battery accommodation unit 122 along with the first battery 131, but the invention is not limited thereto, and the second battery 132 management be accommodated at other positions inside the control device 10. The second battery 132 may be provided in the image display section 20, and may be externally connected to the control device 10. The second battery 132 may be attachably and detachably connected via a connector, and may be connected to the battery control unit 135 in a fixed manner so as not to be easily attached and detached. A specific mounting form of the second battery 132 is arbitrary.

For example, in the above-described respective embodiments, a description has been made of a configuration in which the power source section 300 includes the first battery 131 and the second battery 132, but the invention is not limited thereto, and the power source section 300 may include three or more batteries. In the configuration in which the power source section 300 includes a plurality of batteries, a primary battery and a secondary battery may be mixed, and, in this case, guidance display for prompting exchange is performed according to a residual quantity of the primary battery, and guidance display for prompting exchange is performed according to a residual quantity of the secondary battery. The necessity of AR display or animation display may be set by a user. A position where the first battery 131 and the second battery 132 are accommodated is not limited to the examples illustrated in FIGS. 5A and 5B. For example, the power source section 300 may be configured as a separate body from the control device 10. The residual quantity display unit according to the embodiments of the invention is not limited to the LED display portions 136 and 138. For example, a residual quantity may be displayed by providing a liquid crystal display panel in the control device 10, and a residual quantity may be displayed on the information display portion 402 of the image display section 20 in a form corresponding to the residual quantity display unit.

For example, instead of the image display section 20, other types of image display sections such as an image display section which is worn such as a cap, may be employed, and may include a display unit which displays an image so as to correspond to the user's left eye and a display unit which displays an image so as to correspond to the user's right eye. The display apparatus according to the embodiments of the invention may be configured as a head mounted display which is mounted in a vehicle such as an automobile or an airplane. For example, the display apparatus may be configured as a head mounted display which is built into a body protection tool such as a helmet, and may be a head-up display (HUD) used for a front glass of an automobile.

In the embodiments, as an example, a description has been made of a configuration in which the image display section 20 and the control device 10 are separated from each other and are connected to each other via the coupling unit 40, but the control device 10 and the image display section 20 may be integrally configured and may be mounted on the user's head.

In a case where the control device 10 and the image display section 20 are connected to each other via a longer cable, as the control device 10, a notebook computer, a tablet computer, or a desktop computer may be used. As the control device 10, a portable electronic apparatus such as a game machine, a mobile phone, a smart phone, or a portable media player, or other dedicated apparatuses may be used. Here, in a case where the control device 10 is provided with a display screen, the display screen of the control device 10 may be stopped in the battery replacement mode. In the battery replacement mode, among the display screens of the right display driving unit 22, the left display driving unit 24, and the control device 10, at least one thereof may display an image, and the others may be stopped from displaying an image.

For example, a configuration of generating image light in the image display section 20 may include an organic electroluminescence (EL) display and an organic EL controller. The configuration of generating image light may use liquid crystal on silicon (LCOS; LCoS is a registered trademark), a digital micromirror device, or the like. For example, the invention is also applicable to a laser retinal projective head mounted display. In other words, a configuration may be employed in which the image light generation unit includes a laser light source and an optical system which guides laser light to a user's eye, makes the laser light to be incident to the user's eye so that the retina is scanned with the laser light and thus an image is formed on the retina, and causes the user to visually recognize the image. In a case of employing the laser retinal projective head mounted display, a "region in which image light can be emitted in the image light generation unit" may be defined as an image region which is visually recognized by the user's eye.

The optical system which guides image light to the user's eye may employ a configuration in which an optical member which transmits external light incident to the apparatus from the outside therethrough is provided, and the external light is made to be incident to the user's eye along with the image light. An optical member may be used which is located in front of the user's eyes and partially or entirely overlaps a visual field of the user. A scanning type optical system may be employed which performs scanning with laser light or the like and uses the laser light as image light. The optical system is not limited to a configuration in which image light is guided inside the optical member, and may have only a function of guiding image light by diffracting and/or reflecting the image light toward the user's eye.

The invention is also applicable to a display apparatus which employs a scanning optical system using a MEMS mirror and uses a MEMS display technique. In other words, image display elements may be provided with a signal light forming unit, a scanning optical system including a MEMS mirror which performs scanning with light emitted by the signal light forming unit, and an optical member which forms a virtual image by using the light with which scanning is performed by the scanning optical system. In this configuration, the light which is emitted by the signal light forming unit is reflected by the MEMS mirror and is incident to the optical member, and the light is guided inside the optical member and reaches a virtual image formation surface. If the MEMS mirror performs scanning with the light, a virtual image is formed on the virtual image forming surface, and an image is recognized by identifying the virtual image with the user's eye. An optical component in this case may guide light through a plurality of number of times of reflection, such as the right light guide plate 261 and the left light guide plate 262 of the embodiments, and may employ a half mirror surface.

The display apparatus according to the embodiments of the invention is not limited to a head mounted display apparatus, and is applicable to various display apparatuses such as a flat panel display or a projector. The display apparatus according to the embodiments of the invention may be a display apparatus which causes an image to be visually recognized by using image light along with external light, and may have a configuration in which, for example, an optical member which transmits external light therethrough causes an image to be visually recognized by using image light. Specifically, the display apparatus is applicable not only to the above-described head mounted display including the optical member which transmits external light therethrough but also to a display apparatus which projects image light onto a transmissive plane or curved surface (glass, transparent plastic, or the like) which is provided at a position far from a user so as to be fixed or moved. As an example, there may be a configuration of a display apparatus in which image light is projected onto a glass window of a vehicle, and a riding user or a user outside the vehicle visually recognize scenery inside and outside the vehicle along with an image based on image light. For example, there may be a configuration of a display apparatus in which image light is projected onto a transparent, translucent, or colored transparent display surface provided in a fixed manner, such as a glass window of a building, and a user near the display surface visually recognizes scenery through the display surface along with an image based on the image light.

At least some of the respective functional blocks illustrated in FIG. 2 may be realized by hardware, may be realized in cooperation between hardware and software, and is not limited to the configuration in which the independent hardware resources are disposed as illustrated in FIG. 2. The program executed by the control unit 140 may be stored in the storage unit 120 or a storage unit of the control device 10. The program stored in an external device may be acquired via the communication unit 117 or the interface 125 and may be executed.

For example, the functions of the program executed by the control unit 140, that is, the respective processing units (the image processing unit 160, the display control unit 170, the power saving control unit 180, the sound processing unit 190, or other generation units, determination units, specifying units, and the like) included in the control unit 140 may be configured by using an application specific integrated circuit (ASIC) or a system on chip (SoC) which is designated to realize the functions. The functions may be realized by a programmable device such as a field-programmable gate array (FPGA).

Among the constituent elements provided in the control device 10, only the operation unit 111 may be provided as a separate user interface (UI). A constituent element provided in the control device 10 may also be provided in the image display section 20. For example, the control unit 140 illustrated in FIG. 2 may be provided in both of the control device 10 and the image display section 20, and functions realized by the control unit 140 provided in the control device 10 and the CPU provided in the image display section 20 may be are separated from each other.

The entire disclosure of Japanese Patent Application Nos. 2014-213602, filed Oct. 20, 2014 and 2014-218583, filed Oct. 27, 2014 and 2015-112029, filed Jun. 2, 2015 are expressly incorporated by reference herein.

What is claimed is:

1. A display apparatus comprising:
   a display unit that enables a user to visually recognize an image and transmits external scenery therethrough;
   a first battery and a second battery;
   a nonvolatile storage unit;
   a communication unit; and
   a control unit that controls the display unit and the communication unit,
   wherein the control unit can switch an operation mode of the display apparatus between a normal operation mode and a battery replacement mode for replacing at least one of the first battery and the second battery, and maintains the communication unit in a communicable state by using one of the first and second batteries as a power source in the battery replacement mode, wherein when the control unit switches to the battery replacement mode, the control unit first stores data related to an operation of the control unit in the storage unit and then reduces an amount of power consumption of a supply destination which consumes power of the first battery and/or the second battery, and maintains the supply of power to the communication unit, and wherein the control unit executes a finish sequence in a case where a residual capacity of the second battery corresponds to a condition which is set in advance during execution of the battery replacement mode.

2. The display apparatus according to claim 1, wherein, as the finish sequence, the control unit stores information regarding an operation of the display apparatus in a storage unit and then turns off the power source.

3. The display apparatus according to claim 1, wherein the control unit changes the display mode of the display unit to a mode for reducing power consumption of the display apparatus in a case where a residual capacity of the second battery decreases to a preset first reference value or less during execution of the battery replacement mode, and wherein the control unit executes the finish sequence in a case where the residual capacity of the second battery decreases to a second reference value or less after the display mode is changed to the mode for reducing power consumption of the display apparatus.

4. The display apparatus according to claim 3, wherein the control unit performs display on the display unit based on the residual capacity of the second battery in a case where the residual capacity of the second battery decreases to the first reference value or less during execution of the battery replacement mode.

5. The display apparatus according to claim 1, wherein the control unit maintains the supply of power to the communication unit by using the first battery and/or the second battery in the battery replacement mode.

6. The display apparatus according to claim 5, wherein the control unit can control switching of a power source between the first battery and the second battery, and causes the operation mode of the display apparatus to transition from the normal operation mode to the battery replacement mode in which power consumption of the display unit and the communication unit is lower than power consumption in the normal operation mode when the power source is switched from the first battery to the second battery.

7. The display apparatus according to claim 6, wherein the display unit includes a first display portion that displays an image so as to correspond to the left eye of the user; and a second display portion that displays an image so as to correspond to the right eye of the user, and wherein, in the battery replacement mode, the control unit stops one of the first display portion and the second display portion from performing display.

8. The display apparatus according to claim 6, wherein, the control unit reduces a frame rate of an image displayed on the display unit in the battery replacement mode more than a frame rate of an image displayed on the display unit in the normal operation mode.

9. The display apparatus according to claim 6, wherein the control unit reduces a display region of the display unit in the battery replacement mode more than a display region of the display unit in the normal operation mode.

10. The display apparatus according to claim 6, wherein the control unit maintains the communication unit in a communicable state in the battery replacement mode so that the communication unit can start communication without performing authentication when the operation mode of the display apparatus transitions from the battery replacement mode to the normal operation mode.

11. The display apparatus according to claim 10, wherein, in the battery replacement mode, the control unit causes an operation state of the communication unit to be switched to a state in which power consumption of the communication unit is lower than power consumption in the normal operation mode.

12. The display apparatus according to claim 6, wherein the control unit performs a process based on the data stored in the storage unit when the operation mode transitions from the battery replacement mode to the normal operation mode.

13. The display apparatus according to claim 6, wherein, in a case where the first battery is replaced with a new first battery, the control unit performs display based on a residual capacity of the new first battery.

14. The display apparatus according to claim 6, wherein, in a case where a residual capacity of the first battery is equal to or more than a threshold value, the control unit charges the second battery with power of the first battery.

15. The display apparatus according to claim 6, wherein, in a case where a residual capacity of the first battery is equal to or less than a threshold value, the control unit displays a message for prompting replacement of the first battery on the display unit.

16. The display apparatus according to claim 6, further comprising:

a lid that opens and closes a battery accommodation unit which attachably and detachably accommodates the first battery; and an opening/closing detection unit that detects opening and closing of the lid, wherein, in a case where the opening/closing detection unit detects opening of the lid, the control unit switches the power source from the first battery to the second battery.

17. The display apparatus according to claim 5, wherein the control unit charges the second battery with power of the first battery after switching the operation mode from the battery replacement mode to the normal operation mode.

18. The display apparatus according to claim 17, wherein, in a case where it is detected that the first battery is replaced with a new first battery, the control unit switches the operation mode to the normal operation mode when a residual capacity of the new first battery is equal to or more than a reference value which is set in advance.

19. The display apparatus according to claim 17, wherein the display unit includes a first display portion that displays an image so as to correspond to the left eye of the user; and a second display portion that displays an image so as to correspond to the right eye of the user, and wherein, in the battery replacement mode, the control unit stops one of the first display portion and the second display portion from performing display.

20. The display apparatus according to claim 17, wherein, the control unit reduces a frame rate of an image displayed on the display unit in the battery replacement mode more than a frame rate of an image displayed on the display unit in the normal operation mode.

21. The display apparatus according to claim 17, wherein the control unit reduces a display region of the display unit in the battery replacement mode more than a display region of the display unit in the normal operation mode.

22. The display apparatus according to claim 17, wherein, in the battery replacement mode, the control unit thins out image data which is displayed on the display unit and displays thinned-out image data on the display unit, or gives an instruction for thinning out pixels used for display on the display unit.

23. The display apparatus according to claim 17, wherein, in the battery replacement mode, the control unit displays an image on a peripheral part of the display region of the display unit.

24. The display apparatus according to claim 17, wherein the control unit maintains the communication unit in a communicable state in the battery replacement mode so that the communication unit can start communication without performing authentication when the operation mode of the display apparatus transitions from the battery replacement mode to the normal operation mode.

25. The display apparatus according to claim 24, wherein, in the battery replacement mode, the control unit causes an operation state of the communication unit to be switched to a state in which power consumption of the communication unit is lower than power consumption in the normal operation mode.

26. A control method for a display apparatus including a display unit that enables a user to visually recognize an image and transmits external scenery therethrough, and a communication unit, the method comprising:
  causing an operation mode of the display apparatus to transition from a normal operation mode to a battery replacement mode in which data related to an operation of a control unit is first stored in a storage unit and then power consumption of the display unit and the communication unit is made lower than power consumption in the normal operation mode in a case where a power source of the display apparatus is changed from a first battery to a second battery; and
  maintaining the communication unit in a communicable state in the battery replacement mode,
  wherein the control unit executes a finish sequence in a case where a residual capacity of the second battery corresponds to a condition which is set in advance during execution of the battery replacement mode.

27. A control method for a display apparatus including a display unit that enables a user to visually recognize an image and transmits external scenery therethrough, a first battery, and a second battery, the method comprising:
  switching the operation mode of the display apparatus from a normal operation mode in which power is supplied from the first battery to a battery replacement mode in which power is supplied from the second battery, wherein when switching to the battery replacement mode, a control unit first stores data related to an operation of the control unit in a storage unit and then an amount of power consumption of a supply destination which consumes power of the first battery and/or the second battery is reduced; and
  charging the second battery with power of the first battery after switching the operation mode from the battery replacement mode to the normal operation mode,
  wherein the control unit executes a finish sequence in a case where a residual capacity of the second battery corresponds to a condition which is set in advance during execution of the battery replacement mode.

28. A non-transitory storage medium that stores a program which can be executed by a computer controlling a display apparatus including a display unit that enables a user to visually recognize an image and transmits external scenery therethrough, a first battery, and a second battery, the program causing the computer to function as a control unit that:
  switches an operation mode of the display apparatus from a normal operation mode in which power is supplied from the first battery to a battery replacement mode in which power is supplied from the second battery, wherein when switching to the battery replacement mode, the control unit first stores data related to an operation of the control unit in a storage unit and then an amount of power consumption of a supply destination which consumes power of the first battery and/or the second battery is reduced; and
  charges the second battery with power of the first battery after switching the operation mode from the battery replacement mode to the normal operation mode,
  wherein the control unit executes a finish sequence in a case where a residual capacity of the second battery corresponds to a condition which is set in advance during execution of the battery replacement mode.

* * * * *